US010261969B2

(12) United States Patent
Budzienski et al.

(10) Patent No.: US 10,261,969 B2
(45) Date of Patent: Apr. 16, 2019

(54) SOURCING ABOUND CANDIDATES APPARATUSES, METHODS AND SYSTEMS

(71) Applicant: Monster Worldwide, Inc., New York, NY (US)

(72) Inventors: Joe Budzienski, Newton, MA (US); Venkat Naidu Janapareddy, Westford, MA (US); Elie Raad, Issy les Moulineaux (FR); Lakshman Tirlangi, Andhra Pradesh (IN)

(73) Assignee: Monster Worldwide Inc., Weston, MA (US)

( * ) Notice: Subject to any disclaimer, the term of this patent is extended or adjusted under 35 U.S.C. 154(b) by 625 days.

(21) Appl. No.: 14/463,570

(22) Filed: Aug. 19, 2014

(65) Prior Publication Data

US 2015/0169774 A1 Jun. 18, 2015

Related U.S. Application Data

(60) Provisional application No. 61/867,284, filed on Aug. 19, 2013.

(51) Int. Cl.

*G06F 16/9535* (2019.01)
*G06F 16/2457* (2019.01)
*G06Q 50/00* (2012.01)

(52) U.S. Cl.

CPC .... *G06F 16/9535* (2019.01); *G06F 16/24578* (2019.01); *G06Q 50/01* (2013.01)

(58) Field of Classification Search

None

See application file for complete search history.

(56) References Cited

U.S. PATENT DOCUMENTS

| | | | |
|---|---|---|---|
| 8,037,150 | B2 | 10/2011 | Weaver |
| 8,504,559 | B1 | 8/2013 | Elman et al. |
| 2003/0144862 | A1 | 7/2003 | Smith |
| 2006/0206448 | A1 | 9/2006 | Hyder et al. |

(Continued)

FOREIGN PATENT DOCUMENTS

| | | |
|---|---|---|
| JP | 2002-334147 | 11/2002 |
| KR | 10-2000-0024344 | 5/2000 |

(Continued)

OTHER PUBLICATIONS

European search report issued for EP application No. 14838557.8, dated Jan. 20, 2017.

(Continued)

*Primary Examiner* — Tuankhanh D Phan

(74) *Attorney, Agent, or Firm* — Hanchuk Kheit LLP; Walter G. Hanchuk

(57) ABSTRACT

The Sourcing Abound Candidates Apparatuses, Methods and Systems ("Abound") transforms data normalization support request and candidate criteria inputs via Abound components into criteria matching candidate indication outputs. An apparatus for sourcing active and passive jobseekers through jobseeker social media data, comprising a memory and a processor that issues instructions to: extract jobseeker data from a plurality of social media sources. That includes instructions to obtain jobseeker data from at least one of: various social media API's or crawl said social media sources and utilize extracted schemas to analyze said jobseeker data. Thereafter Abound may perform a link resolving and schema merging process to eliminate duplicates from the schemas and transform non-categorical schema data to conform with a master schema standard. Then Abound may reconcile variations in categorical schemas to said master schema standard and load jobseeker data into a master schema. After that, Abound may normalize said jobseeker data to develop initial user profiles and enrich said (Continued)

initial user profile with third party data to form enriched user profiles. Abound then may perform a complexity reduction process on said enriched user profiles to reduce comparisons of said enriched user profiles, evaluate and weight said enriched user profiles; and match said enriched user profiles to source available jobseekers.

3 Claims, 101 Drawing Sheets

(56) References Cited

U.S. PATENT DOCUMENTS

| | | | |
|---|---|---|---|
| 2009/0070126 | A1 | 3/2009 | MacDaniel et al. |
| 2010/0153290 | A1 | 6/2010 | Duggan |
| 2010/0274815 | A1 | 10/2010 | Vanasco |
| 2011/0099118 | A1 | 4/2011 | Rudloff |
| 2011/0276507 | A1 | 11/2011 | O'Malley |
| 2012/0023030 | A1 | 1/2012 | Jeffries |
| 2012/0110052 | A1 | 5/2012 | Smarr et al. |
| 2012/0290584 | A1 | 11/2012 | DeBona et al. |
| 2012/0330856 | A1 | 12/2012 | Hyder et al. |
| 2013/0325734 | A1 | 12/2013 | Bixler |
| 2014/0143163 | A1 | 5/2014 | Kamat et al. |
| 2015/0200899 | A1 | 7/2015 | Sanketi |

FOREIGN PATENT DOCUMENTS

| | | |
|---|---|---|
| KR | 10-2010-006681 | 6/2010 |
| WO | 2012178130 | 12/2012 |

OTHER PUBLICATIONS

International Search Report and Written Opinion issued for PCT application No. PCT/US14/044564 dated Oct. 24, 2014.
European search report issued for EP application No. 12803074.9, dated Jan. 22, 2015.
European search report for EP application No. 15793565, dated Sep. 25, 2017.
"Social Network Aggregation", internet article, Apr. 21, 2014.
"Mining the Social Web: Data Mining Facebook, Twitter, LinkedIn, Google+, GitHub, and More", Matthew A. Russell, Oct. 20, 2013, O'Reilly.
"Marden Enterprise Architekturen", Dieter Masak, Jan. 7, 2005, Springer.
U.S. Appl. No. 13/667,409, filed Nov. 2, 2012, Joe Budzienski.
U.S. Appl. No. 13/778,410, filed Feb. 27, 2013, Joe Budzienski.
U.S. Appl. No. 14/317,109, filed Jun. 27, 2014, Venkat Naidu Janapareddy.
U.S. Appl. No. 14/463,570, filed Aug. 19, 2014, Joe Budzienski.
U.S. Appl. No. 13/663,164, filed Oct. 29, 2012, Jason Heidema.
U.S. Appl. No. 14/711,336, filed May 13, 2015, Javid Muhammedali.

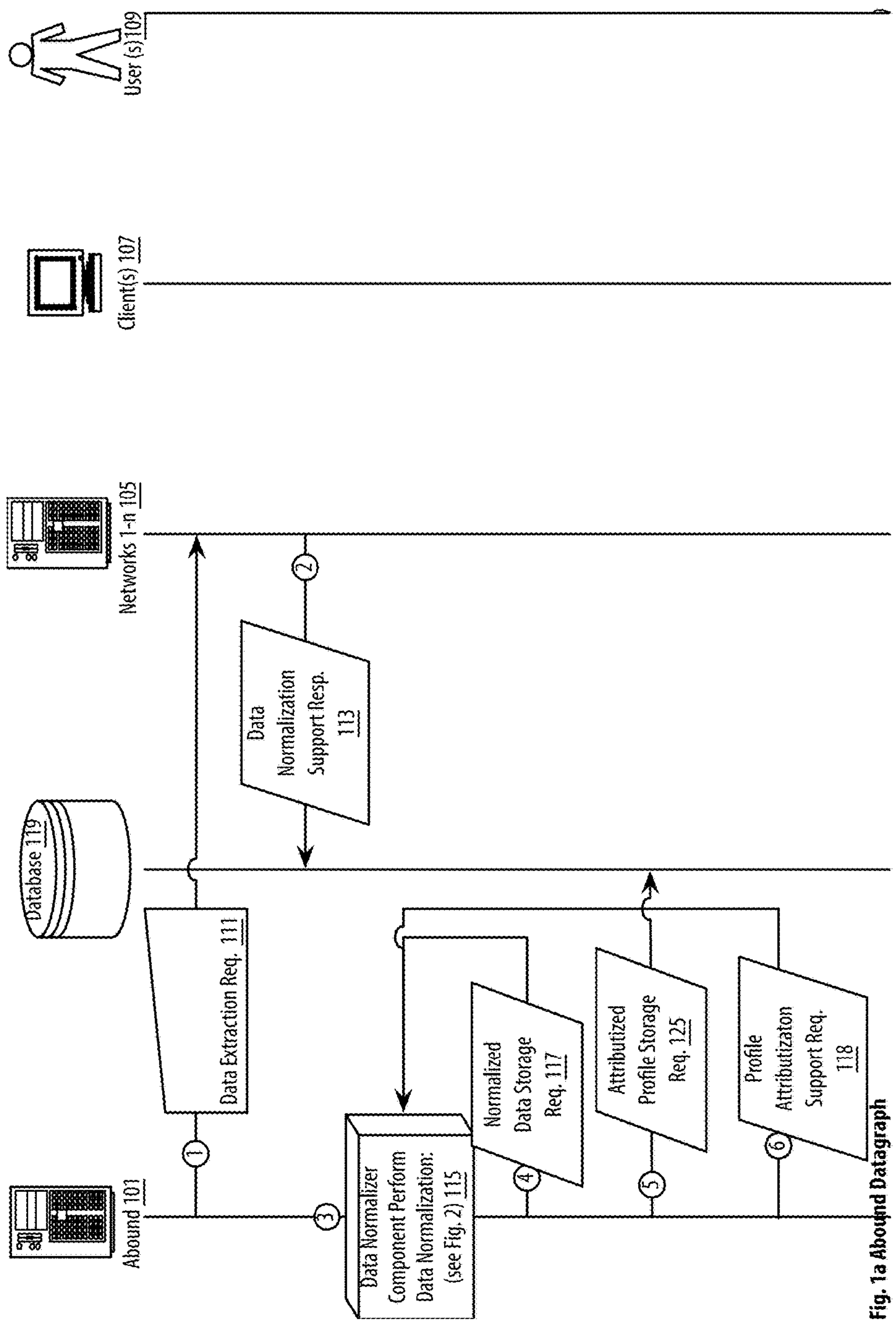
Fig. 1a Abound Datagraph

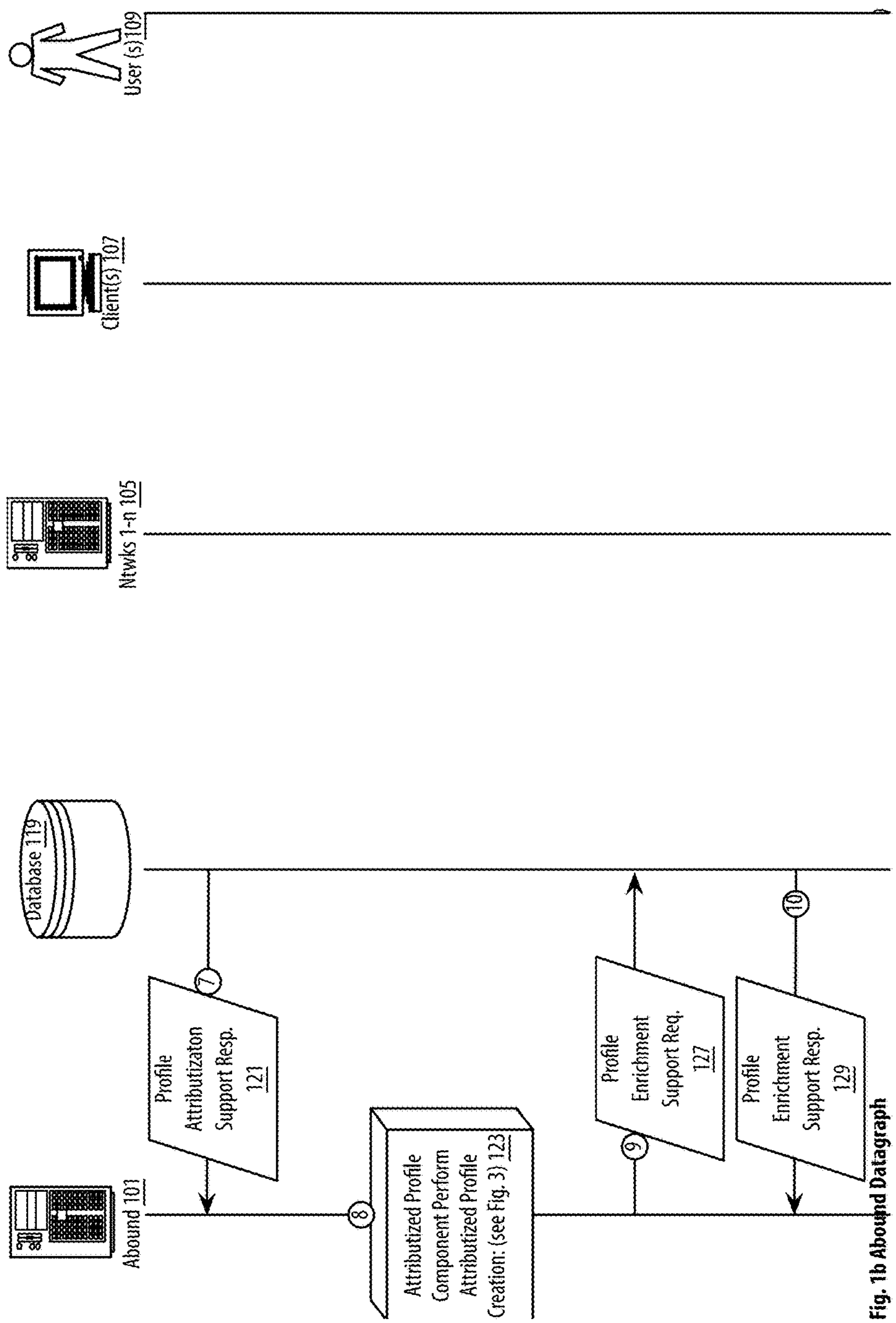
Fig. 1b Abound Datagraph

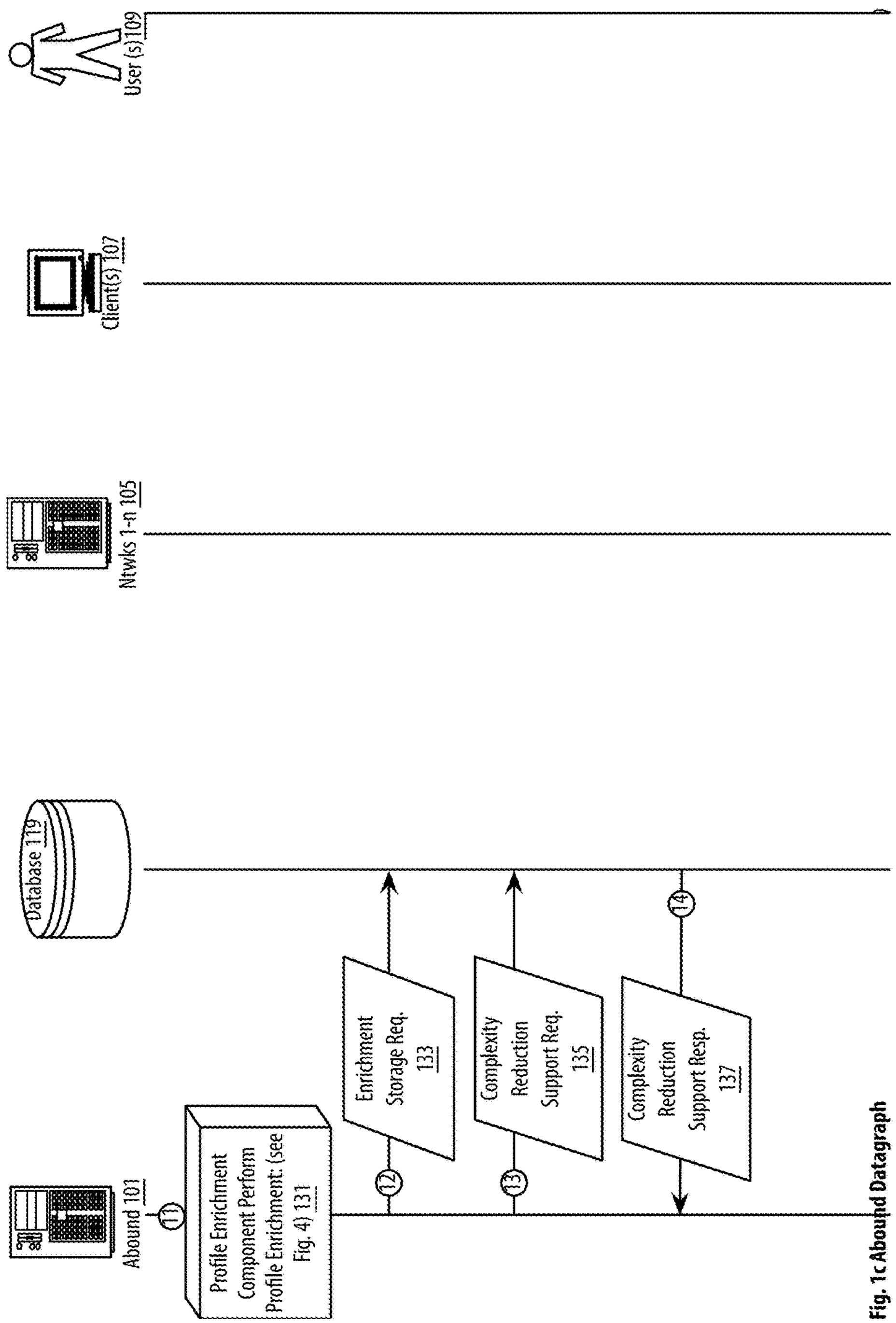
Fig. 1c Abound Datagraph

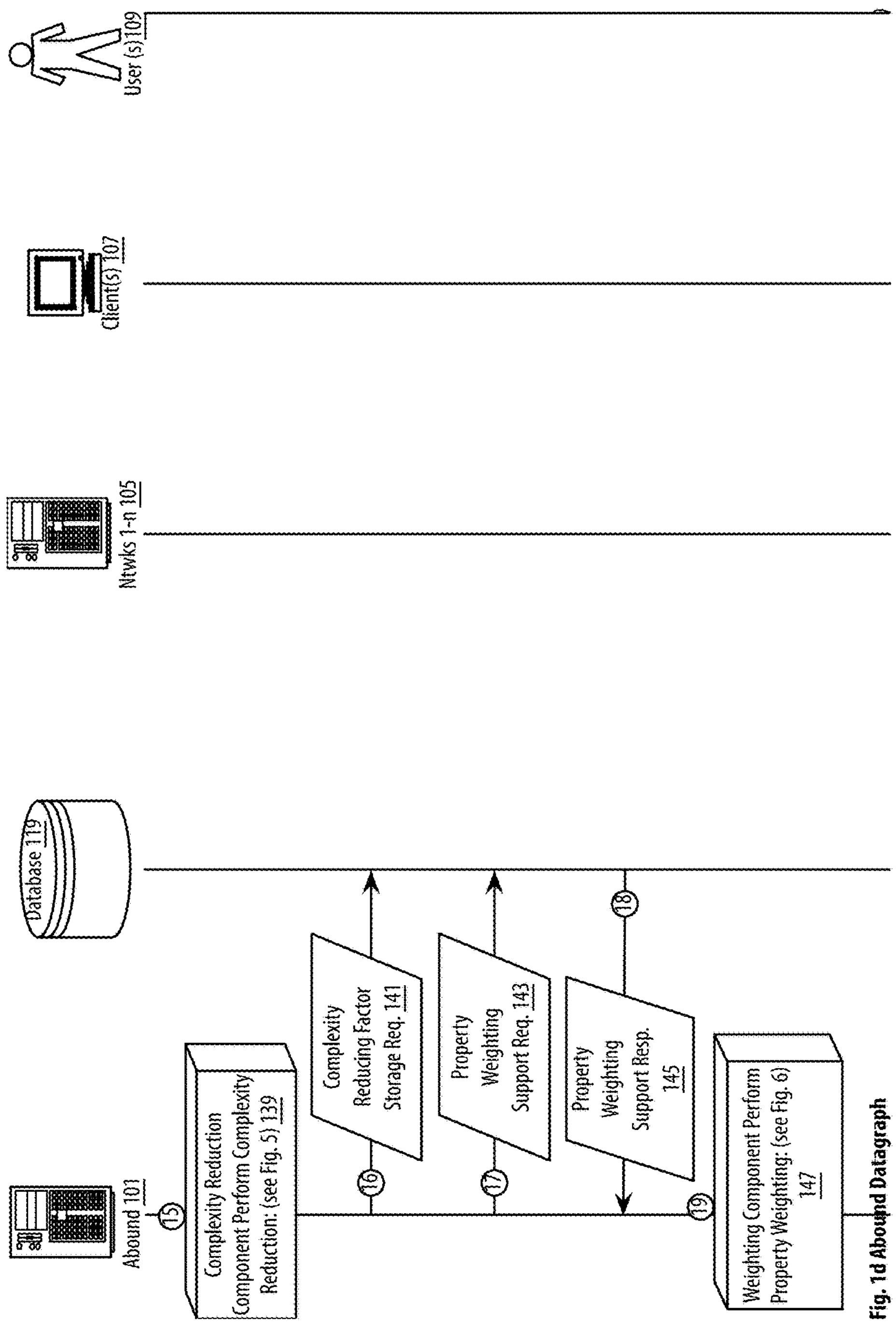
Fig. 1d Abound Datagraph

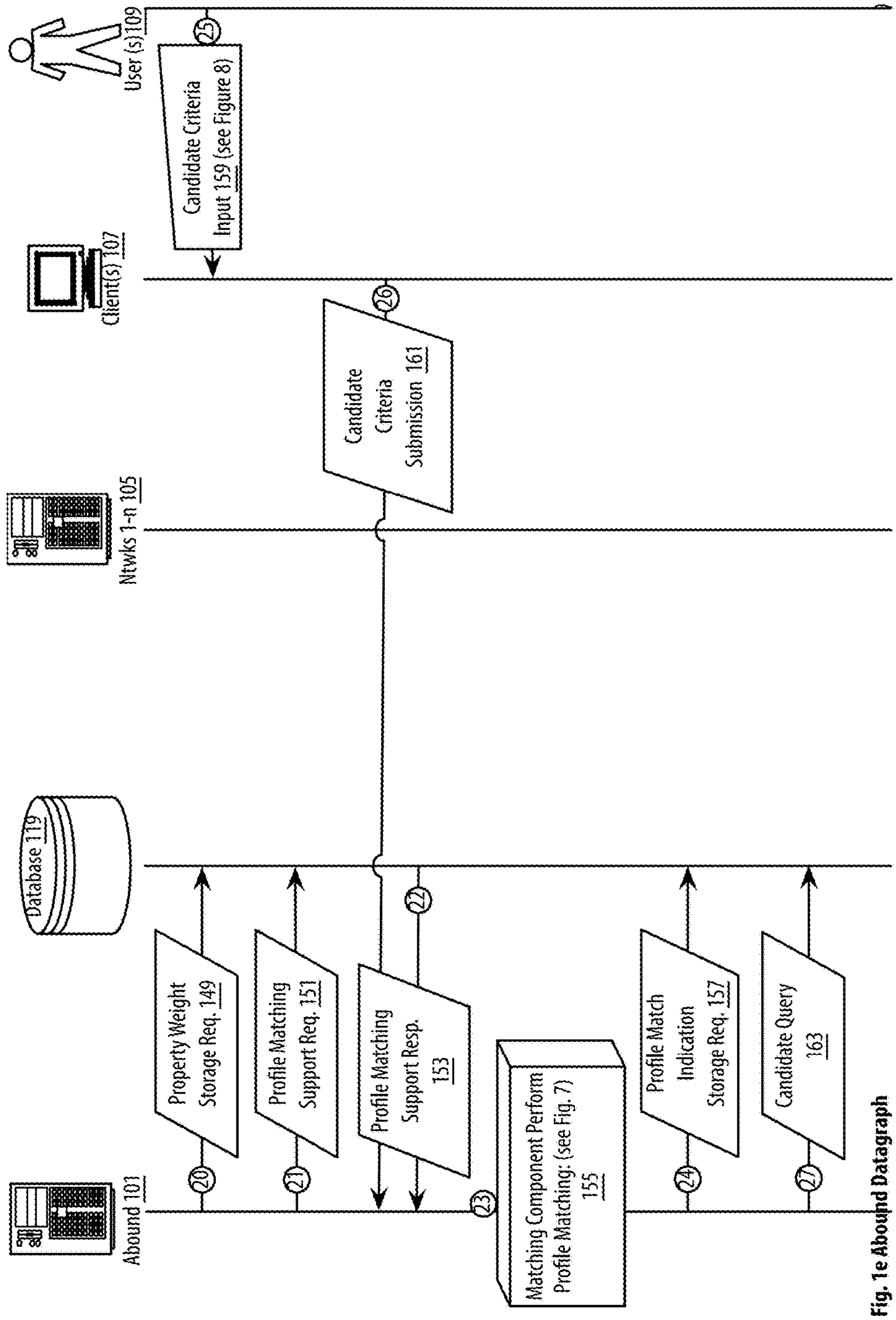
Fig. 1e Abound Datagraph

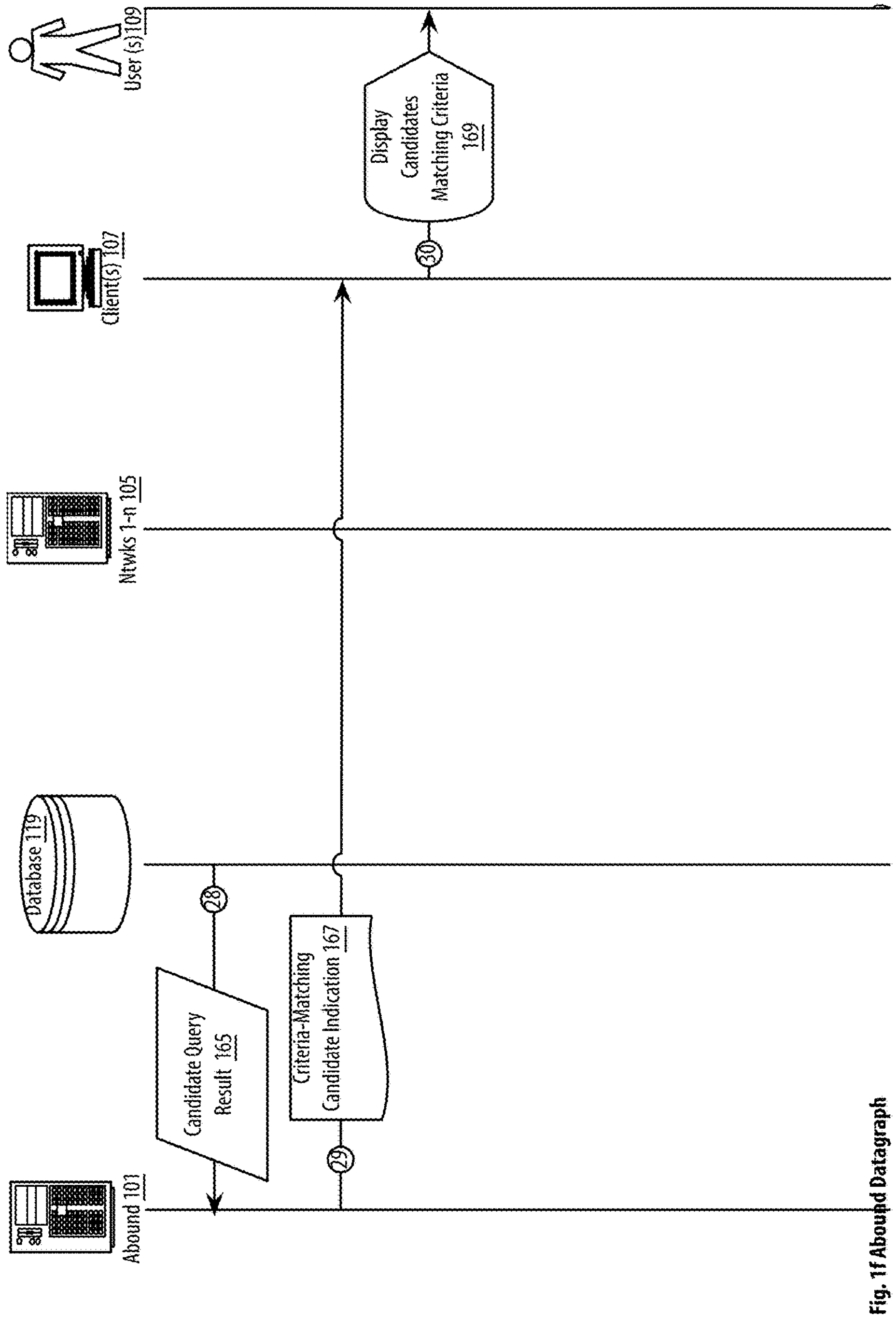
Fig. 1f Abound Datagraph

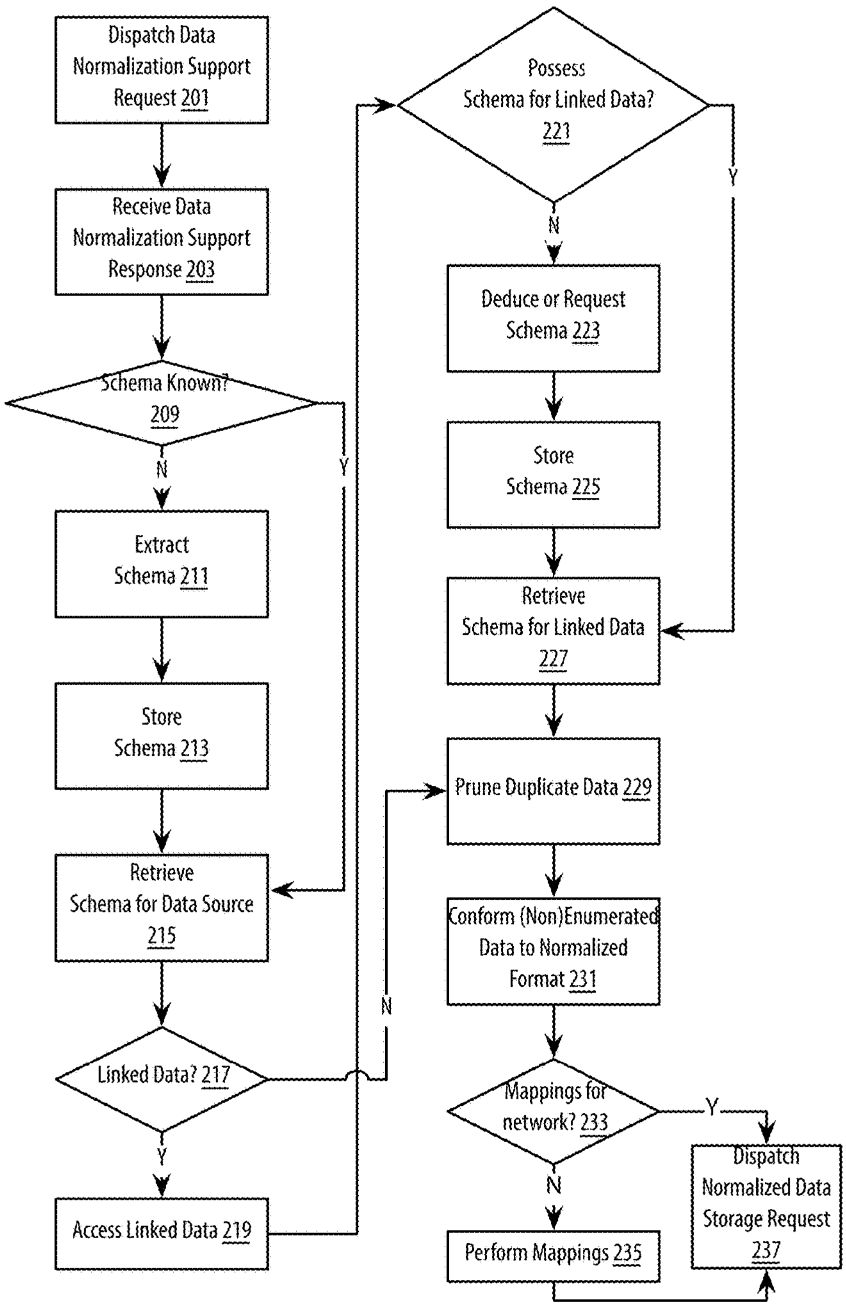
Fig. 2 Data Normalizer Component Logicflow

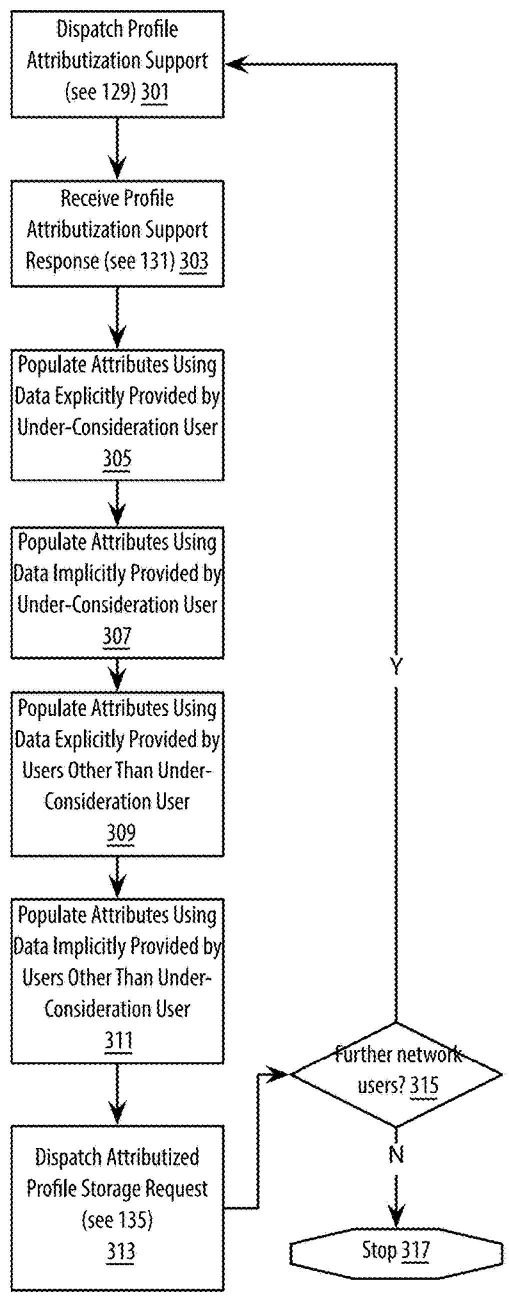
Fig. 3 Attributized Profile Component Logicflow

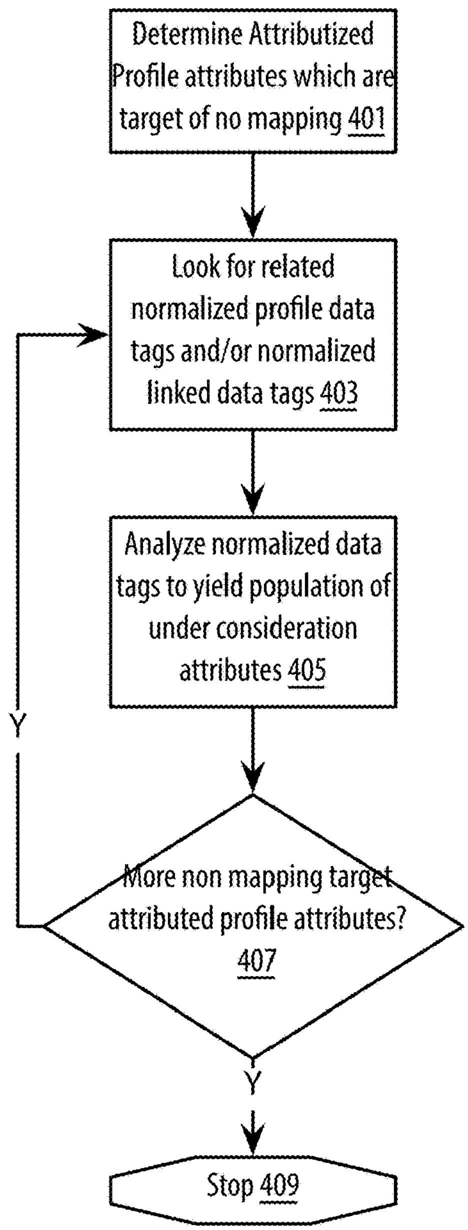
Fig. 4 Attributized Profile Component Logicflow

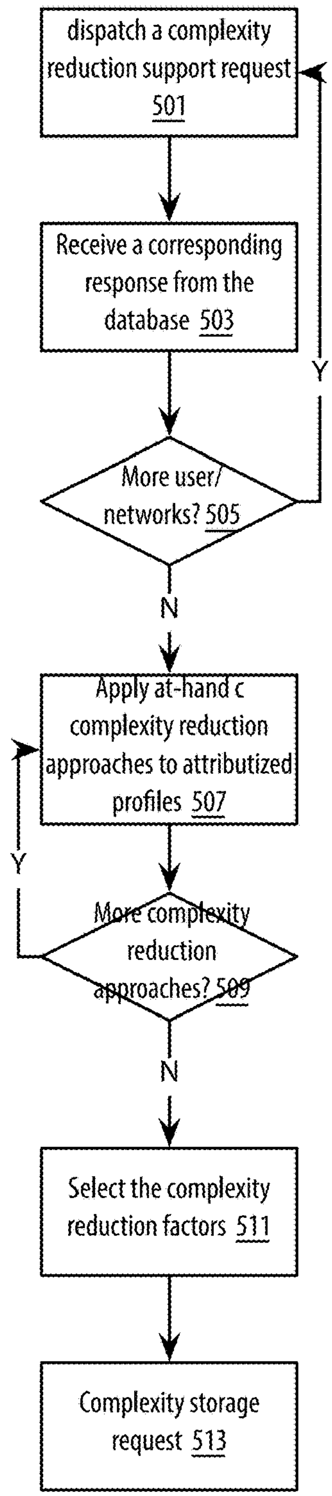
Fig. 5 Complexity Reduction Component Logicflow

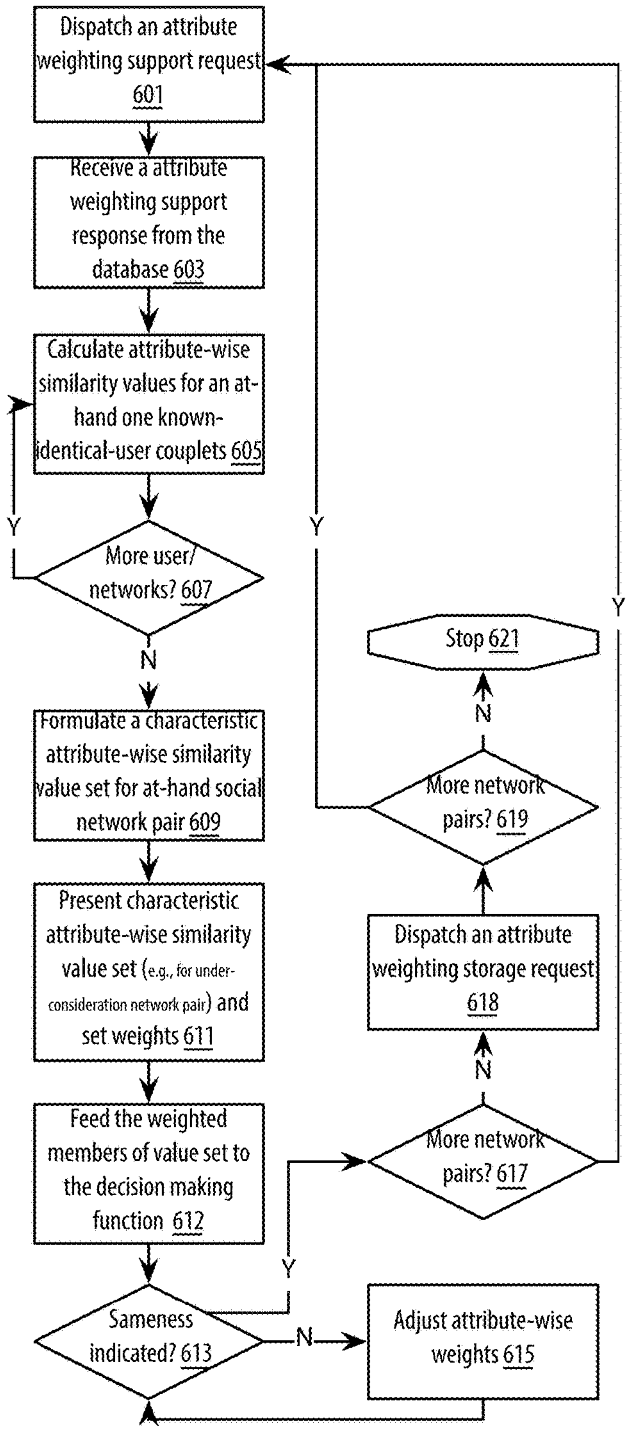
Fig. 6 Weighting Component Logicflow

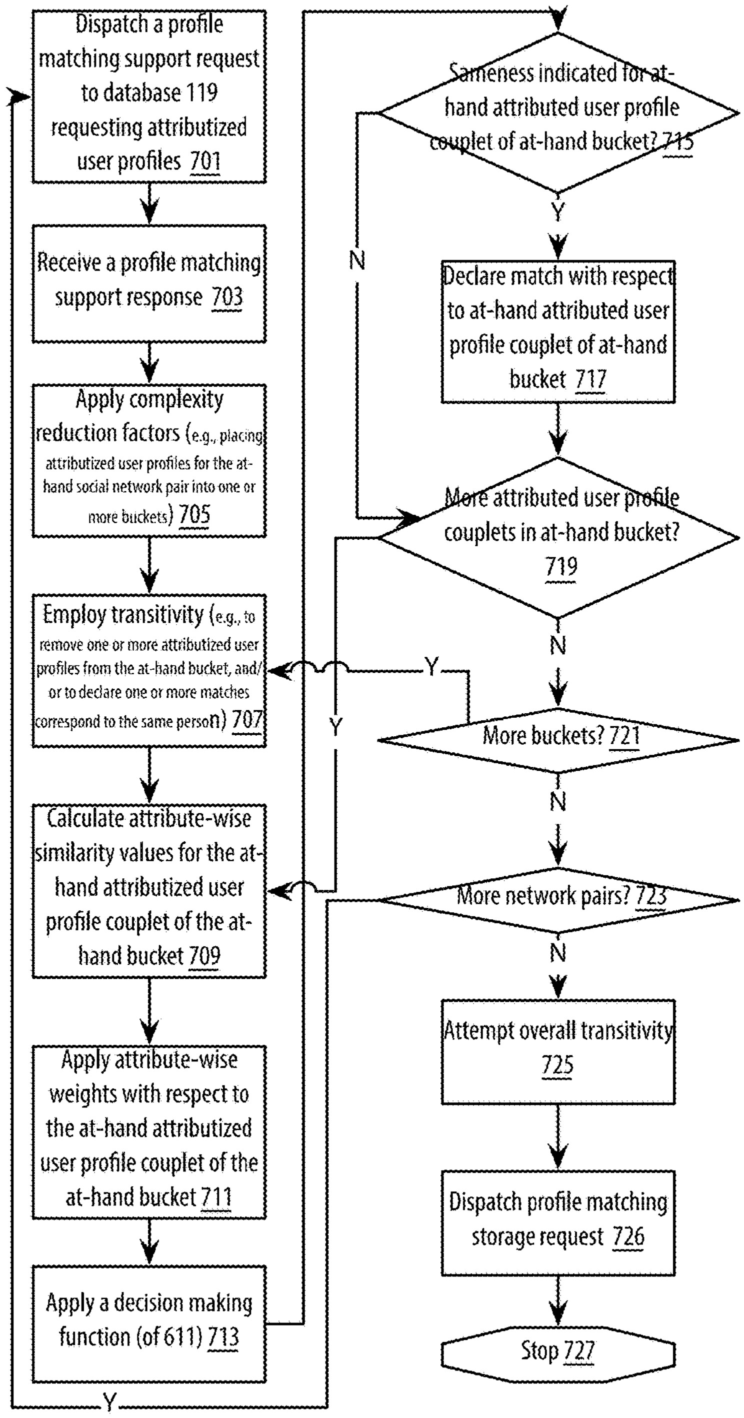
Fig. 7 Matching Component Logicflow -- Match Determination

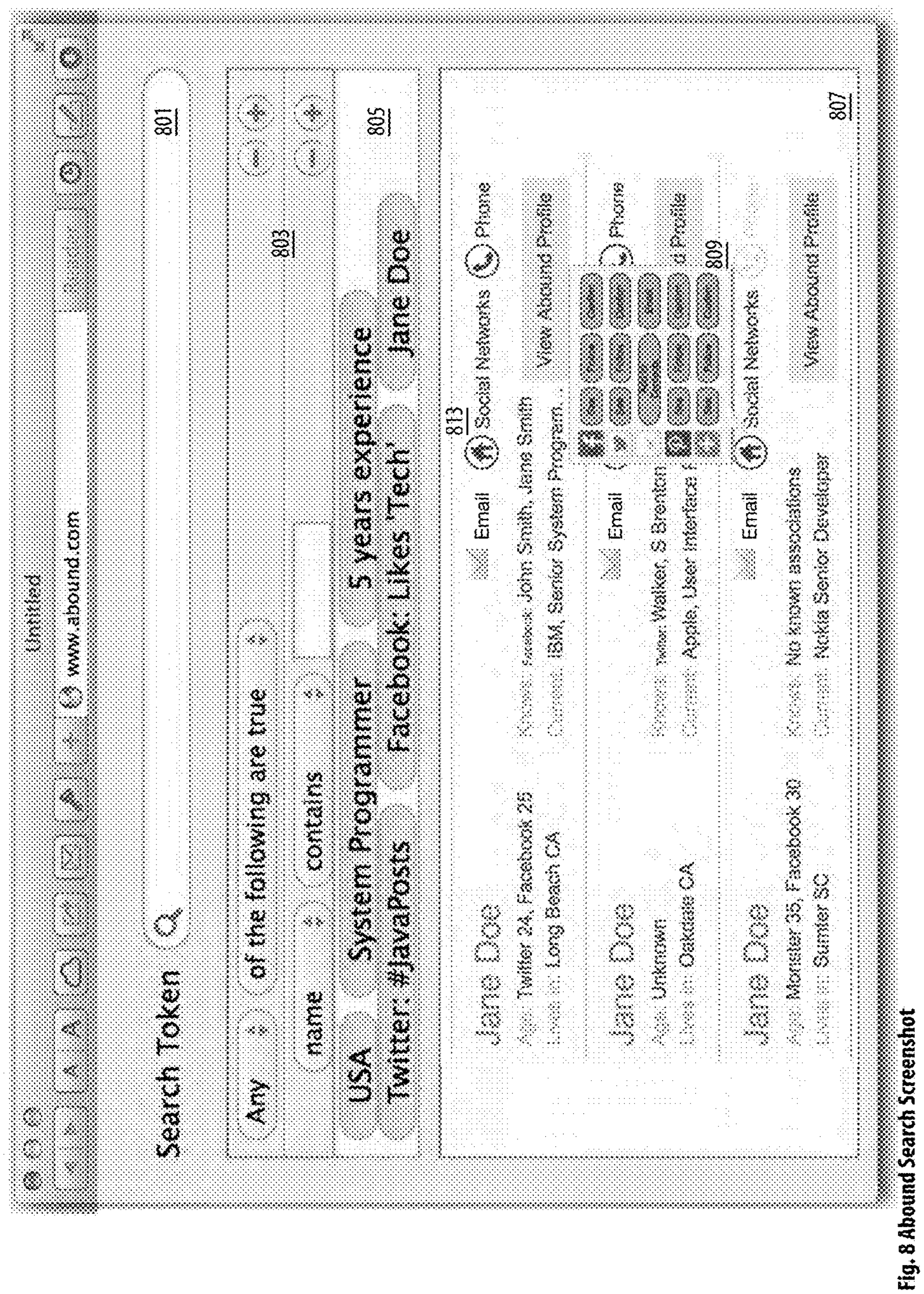
Fig. 8 Abound Search Screenshot

Gozaik Talent Identification Difference

ABOUND
FRAMEWORK
✓ IN DEVELOPMENT

Problems with existing offerings

- ❑ Too many duplicates. Current providers are restrictive and assume two profiles describe the same person only if one specific attribute is the same.
- ❑ Heavy emphasis on email matching causes problems when Facebook users register with their personal email and LinkedIn users register with their professional email.
- ❑ Many providers rely on matching attributes that do not have the same values across social media profiles. For example, the options for Interests in Facebook may not match the options for Interests in LinkedIn.
- ❑ Providers also rely on exact text entry matching which can lead to poor results due to word variation and typing errors. For example, a candidate's name may be Joe in Facebook, but Joseph in LinkedIn.

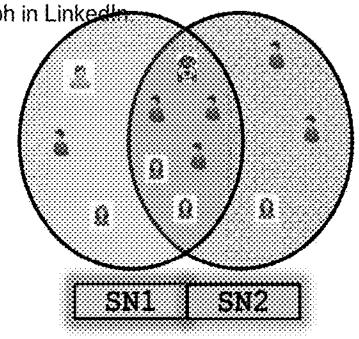

The Gozaik Difference

- Our goal is to identify the largest number of social profiles that refer to the same person.
- We investigate three main areas: social network profile heterogeneity, similarity linking of attribute values,
  and algorithm-based decision making for candidate uniqueness.
- Our framework allows users to give more importance to some attributes
- We will compare specific profile attributes and obtain appropriate results by applying adapted similarity function(s) that are associated to each attribute (e.g. comparing emails must be computed differently than comparing interests).

Fig. 10

Data Extraction [1]

Sample Crawl and API Data

ABOUND
FRAMEWORK
✓ IN DEVELOPMENT

| Source | API | Crawl |
|---|---|---|
| Facebook | http://graph.facebook.com/{facebookid} | http://www.facebook.com/directory/ |
| Twitter | https://api.twitter.com/1.1/users/lookup.json | https://twitter.com/i/directory/profiles/ |
| LinkedIn | | http://www.linkedin.com/directory/people-a-18-10 |
| Google+ | https://www.googleapis.com/plus/v1/people/{profileid} | http://www.gstatic.com/s2/sitemaps/profiles-sitemap.xml |
| GitHub | https://api.github.com/users/{loginname} | https://api.github.com/users?since={sinceid} |
| Stackoverflow | http://api.stackoverflow.com/1.1/users?pagesize=100&page=1 | |
| About Me | https://api.about.me/api/v2/json/users/view/directory/all | |
| TBD | | |
| TBD | | |
| TBD | | |

Fig. 15

Joe Rinehart
@jjrinehart
Greater Seattle Area · jjrinehart.wordpress.com
1,536
1,995
815
Follow

Data Extraction [1]
Twitter

ABOUND FRAMEWORK IN DEVELOPMENT

- Around 21 attributes to begin

- Twitter Attributes:
  - Explicit from the user (name, photo, tweets, etc.)
  - Explicit/Implicit from other Twitter's users
  - Implicit from user's data (Location-based information, skills, etc.)

Data Extraction [1]
Twitter: Bio & Descriptions

ABOUND FRAMEWORK IN DEVELOPMENT

| | | |
|---|---|---|
| topic_interest | Age/birthday | name |
| interest | depiction | based_near |
| homepage | Group | nick |
| mbox | member | title |
| mbox_sha1sum | fundedBy | surname |
| img | phone | family_name |
| weblog | Theme | givenname |
| gender | topic | firstName |
| currentproject | document | geekcode |
| pastProject | image | myersBriggs |
| workplaceHomepage | primaryTopic | dnaChecksum |
| workInfoHomepage | tipjar | accountName |
| schoolHomepage | made | icqChatID |
| publications | thumbnail | msnChatID |
| holdsAccount | logo | aimChatID |
| accountserviceHomepage | | jabberID |

Fig. 19

Data Extraction [1]

Twitter: Global View

ABOUND
FRAMEWORK
✓ IN DEVELOPMENT

Joe Rinehart
Join LinkedIn and access Joe Rinehart's full profile. It's free!
21 people have recommended Joe
500+ connections
Company Website

Data Extraction [1]
LinkedIn

ABOUND FRAMEWORK ✓ IN DEVELOPMENT

- Around 22 attributes to begin
- LinkedIn Attributes:
  - Explicit from the user (name, education, skills, etc.)

Data Extraction [1]
LinkedIn: Profile Overview

ABOUND FRAMEWORK ✓ IN DEVELOPMENT

| | | |
|---|---|---|
| topic_interest | Age/birthday | name |
| interest | depiction | based_near |
| homepage | Group | nick |
| mbox | member | title |
| mbox_sha1sum | fundedBy | surname |
| img | phone | family_name |
| weblog | Theme | givenname |
| gender | topic | firstName |
| currentproject | document | geekcode |
| pastProject | image | myersBriggs |
| workplaceHomepage | primaryTopic | dnaChecksum |
| workInfoHomepage | tipjar | accountName |
| schoolHomepage | made | icqChatID |
| publications | thumbnail | msnChatID |
| holdsAccount | logo | aimChatID |
| accountserviceHomepage | | jabberID |
| Organization | | yahooChatID |

Fig. 26

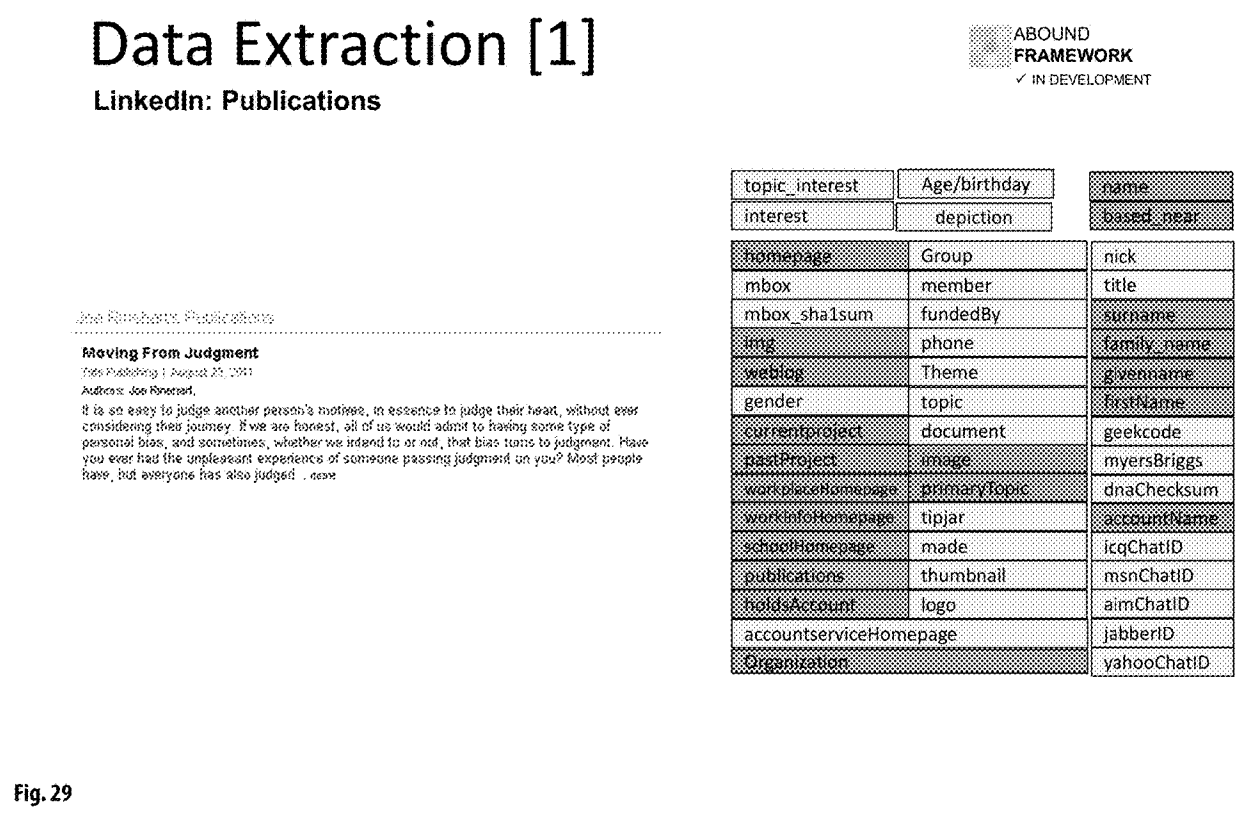

Data Extraction [1]

LinkedIn: Publications

Moving From Judgment

It is so easy to judge another person's motives, in essence to judge their heart, without ever considering their journey. If we are honest, all of us would admit to having some type of personal bias, and sometimes, whether we intend to or not, that bias turns to judgment. Have you ever had the unpleasant experience of someone passing judgment on you? Most people have, but everyone has also judged ...more

ABOUND
FRAMEWORK
✓ IN DEVELOPMENT

| | | |
|---|---|---|
| topic_interest | Age/birthday | name |
| interest | depiction | based_near |

| | | |
|---|---|---|
| homepage | Group | nick |
| mbox | member | title |
| mbox_sha1sum | fundedBy | surname |
| img | phone | family_name |
| weblog | Theme | givenname |
| gender | topic | firstName |
| currentproject | document | geekcode |
| pastProject | image | myersBriggs |
| workplaceHomepage | primaryTopic | dnaChecksum |
| workInfoHomepage | tipjar | accountName |
| schoolHomepage | made | icqChatID |
| publications | thumbnail | msnChatID |
| holdsAccount | logo | aimChatID |
| accountserviceHomepage | | jabberID |
| Organization | | yahooChatID |

Fig. 29

Data Extraction [1]

LinkedIn: Additional Information

Data Extraction [1]

LinkedIn: Global Overview

ABOUND FRAMEWORK
✓ IN DEVELOPMENT

| | | |
|---|---|---|
| topic_interest | Age/birthday | name |
| interest | depiction | based_near |
| homepage | Group | nick |
| mbox | member | title |
| mbox_sha1sum | fundedBy | surname |
| img | phone | family_name |
| weblog | Theme | givenname |
| gender | topic | firstName |
| currentproject | document | geekcode |
| pastProject | image | myersBriggs |
| workplaceHomepage | primaryTopic | dnaChecksum |
| workInfoHomepage | tipjar | accountName |
| schoolHomepage | made | icqChatID |
| publications | thumbnail | msnChatID |
| holdsAccount | logo | aimChatID |
| accountserviceHomepage | | jabberID |
| Organization | | yahooChatID |

Fig. 32

Data Extraction [1]

Github

ABOUND FRAMEWORK ✓ IN DEVELOPMENT

- Around 20 attributes to begin

- Github Attributes:
  - Explicit from users' profile
  - Explicit/Implicit from users' activities

Data Extraction [1]

ABOUND FRAMEWORK ✓ IN DEVELOPMENT

Github: API User's Information

```
"login": "heff",
"id": 166,
"avatar_url": "https://secure.gravatar.com/avatar/c6c46cea19cd7712209232181e71b87
"gravatar_id": "c6c46cea19cd7712209232181e712b8",
"url": "https://api.github.com/users/heff",
"html_url": "https://github.com/heff",
"followers_url": "https://api.github.com/users/heff/followers",
"following_url": "https://api.github.com/users/heff/following{/other_user}",
"gists_url": "https://api.github.com/users/heff/gists{/gist_id}",
"starred_url": "https://api.github.com/users/heff/starred{/owner}{/repo}",
"subscriptions_url": "https://api.github.com/users/heff/subscriptions",
"organizations_url": "https://api.github.com/users/heff/orgs",
"repos_url": "https://api.github.com/users/heff/repos",
"events_url": "https://api.github.com/users/heff/events{/privacy}",
"received_events_url": "https://api.github.com/users/heff/received_events",
"type": "User",
"name": "Steve Heffernan",
"company": "Zencoder",
"blog": "http://zencoder.com",
"location": "San Francisco",
"email": "",
"hireable": true,
"bio": "Working for Zencoder - (Video Encoding API)(http://zencoder.com)\r\nBuildin
"public_repos": 21,
"followers": 38,
"following": 3,
"created_at": "2008-02-08T04:28:16Z",
"updated_at": "2013-08-01T22:54:28Z",
```

Fig. 33

Data Extraction [1]

Github: Global Overview

ABOUND
FRAMEWORK
✓ IN DEVELOPMENT

Data Extraction [1]
Google+

ABOUND FRAMEWORK

- Around 22 attributes to begin
- Attributes are explicitly available from users' profile
- Different users provide different sets of attributes

Data Extraction [1]

Google+: Current and past locations

ABOUND FRAMEWORK
✓ IN DEVELOPMENT

Data Extraction [1]

ABOUND FRAMEWORK
✓ IN DEVELOPMENT

Google+: Basic Information

+ Relationship, birthday (for some users)

Data Extraction [1]

Google+: Global Overview

ABOUND FRAMEWORK
✓ IN DEVELOPMENT

| | | |
|---|---|---|
| topic_interest | Age/birthday | name |
| interest | depiction | based_near |

| | | |
|---|---|---|
| homepage | Group | nick |
| mbox | member | title |
| mbox_sha1sum | fundedBy | surname |
| img | phone | family_name |
| weblog | Theme | givenname |
| gender | topic | firstName |
| currentproject | document | geekcode |
| pastProject | image | myersBriggs |
| workplaceHomepage | primaryTopic | dnaChecksum |
| workInfoHomepage | tipjar | accountName |
| schoolHomepage | made | icqChatID |
| publications | thumbnail | msnChatID |
| holdsAccount | logo | aimChatID |
| accountserviceHomepage | | jabberID |
| Organization | | yahooChatID |

Fig. 43

Data Extraction [1]

Facebook

ABOUND FRAMEWORK ✓ IN DEVELOPMENT

- Around 18 attributes to begin

- Facebook attributes are explicitly provided by the users or implictly extracted from pages and groups that the users' joined

Data Extraction [1]

Facebook: API User's Information

ABOUND FRAMEWORK ✓ IN DEVELOPMENT

```
{
    "id": "1507026977",
    "name": "Joe Rinehart",
    "first_name": "Joe",
    "last_name": "Rinehart",
    "link": "http://www.facebook.com/jjrinehart",
    "username": "jjrinehart",
    "gender": "male",
    "locale": "en_US"
}
```

Fig. 44

Data Extraction [1]

Stack OverFlow

ABOUND FRAMEWORK
✓ IN DEVELOPMENT

- Around 14 attributes to begin
- Some attributes are explicitly provided by the users and other are extracted from users' interactions

Data Extraction [1]

ABOUND FRAMEWORK
✓ IN DEVELOPMENT

Stack OverFlow: API User's Information

```
    "user_id": 22656,
    "user_type": "registered",
    "creation_date": 1222430705,
    "display_name": "Jon Skeet",
    "reputation": 529977,
    "email_hash": "6d8ebb117e8d83d74ea95fbdd0f87e13",
    "age": 37,
    "last_access_date": 1275373242,
    "website_url": "http://csharpindepth.com",
    "location": "Reading, United Kingdom",
    "about_me": "<p>\nAuthor of <a href=\"http://www.manning.com/affiliate/idevaffiliate.php?id=
London.<br>\nUsually a Microsoft MVP (C#, 2003-2010, 2011-)\n</p>\n\n<p>Sites:</p>\n\n<ul>\n<li><a
href=\"http://msmvps.com/jon.skeet\" rel=\"nofollow\">Coding blog</a>\n<li><a href=\"http://pobox.
href=\"http://twitter.com/jonskeet\" rel=\"nofollow\">Twitter updates (@jonskeet)</a>\n<li><a href
profile</a>\n</ul>\n\n<p>Email: skeet@pobox.com (but please read <a href=\"http://tinyurl.com/so-j
    "question_count": 29,
    "answer_count": 26592,
    "view_count": 801208,
    "up_vote_count": 12310,
    "down_vote_count": 877,
    "accept_rate": 32,
    "association_id": "a1c71168-ffb9-42a5-8d71-ce33ad6f2c79",
    "user_questions_url": "/users/22656/questions",
    "user_answers_url": "/users/22656/answers",
    "user_favorites_url": "/users/22656/favorites",
    "user_tags_url": "/users/22656/tags",
    "user_badges_url": "/users/22656/badges",
    "user_timeline_url": "/users/22656/timeline",
    "user_mentioned_url": "/users/22656/mentioned",
    "user_comments_url": "/users/22656/comments",
    "user_reputation_url": "/users/22656/reputation",
    "badge_counts": {
      "gold": 204,
      "silver": 3376,
```

Fig. 52

Data Extraction [1]

Stack OverFlow: Global Overview

ABOUND
FRAMEWORK
✓ IN DEVELOPMENT

| | | |
|---|---|---|
| topic_interest | Age/birthday | name |
| interest | depiction | based_near |

| | | |
|---|---|---|
| homepage | Group | nick |
| mbox | member | title |
| mbox_sha1sum | fundedBy | surname |
| img | phone | family_name |
| weblog | Theme | givenname |
| gender | topic | firstName |
| currentproject | document | geekcode |
| pastProject | image | myersBriggs |
| workplaceHomepage | primaryTopic | dnaChecksum |
| workInfoHomepage | tipjar | accountName |
| schoolHomepage | made | icqChatID |
| publications | thumbnail | msnChatID |
| holdsAccount | logo | aimChatID |
| accountserviceHomepage | | jabberID |
| Organization | | yahooChatID |

Fig. 57

Passive Candidates

ABOUND
FRAMEWORK
✓ IN DEVELOPMENT

Attributes' Extraction: Summary of 6 Social Networks

| Attributes | Twitter | LinkedIn | Google+ | Facebook | StackOverflow | Github |
|---|---|---|---|---|---|---|
| name | x | x | x | x | x | x |
| givenName | x | x | x | x | x | x |
| familyName | x | x | x | x | x | x |
| nick | | | x | | | |
| title | ? | ? | x | | | |
| mbox | | | | | | x |
| mbox_sha1sum | | | | | x | x |
| based_near | x | x | x | x | x | x |
| age | | | x | ? | x | |
| phone | ? | ? | | | | |
| img | x | x | x | x | x | x |
| image | x | | x | x | | |
| depiction | x | x | x | x | x | x |
| gender | x | ? | x | x | | |
| holdsAccount | x | x | x | x | x | x |
| accountName | x | x | x | x | x | x |
| group | x | ? | | x | | ? |

Fig. 58

Passive Candidates

ABOUND FRAMEWORK
✓ IN DEVELOPMENT

Attributes' Extraction: Summary of 6 Social Networks

| Attributes | Twitter | LinkedIn | Google+ | Facebook | StackOverFlow | Github |
|---|---|---|---|---|---|---|
| logo | ? | ? | | | | |
| fundedBy | | | | | | |
| member | x | ? | x | ? | | x |
| Document | x | x | x | x | x | |
| topic | x | x | x | x | x | |
| primaryTopic | x | x | x | x | x | |
| interest | x | x | x | x | x | x |
| topic_interest | x | x | ? | ? | ? | x |
| Theme | x | x | ? | ? | x | x |
| made | | ? | | | | x |
| publications | ? | ? | | | | |
| accountserviceHomepage | | | | | | |
| Organization | | x | | x | | x |
| currentproject | | x | | ? | | |
| pastProject | | x | x | x | | |
| homepage/weblog | x | x | x | x | | x |
| workplaceHomepage | x | x | x | x | | x |
| workInfoHomepage | x | x | x | ? | | x |
| schoolHomepage | | x | x | x | | |
| knows | x | | x | | x | x |

Fig. 59

Complexity Reduction [3]

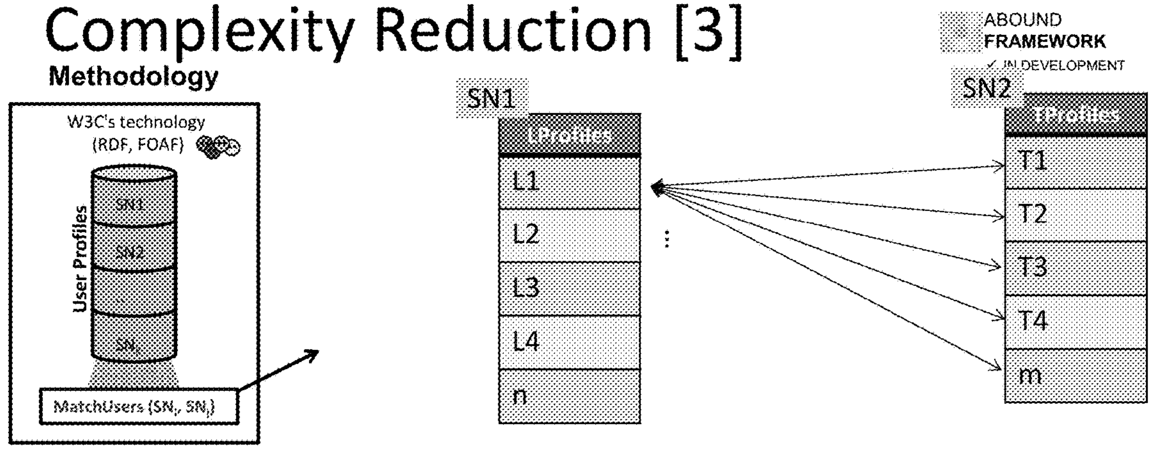

- If SN1 & SN2 are to be linked, the complete number of comparisons is equal to the cross product of the size of the two social networks, |SN1|× |SN2|:
  - Linking two social networks of 10,000 records each, the total number of comparisons is 100,000,000,
  - If the 10,000 users of both social networks were to overlap completely one to one, the number of matches is still only 10% of the total number of comparisons.

Fig. 63

Complexity Reduction [3]

ABOUND FRAMEWORK
✓ IN DEVELOPMENT

Methodology

- The aim of the blocking techniques is to reduce the number of comparisons.
- Blocking techniques partition the dataset into different blocks that are likely to contain duplicate records:
  - Records within these blocks are compared together,
  - Records in one block are not compared with others from a different block.

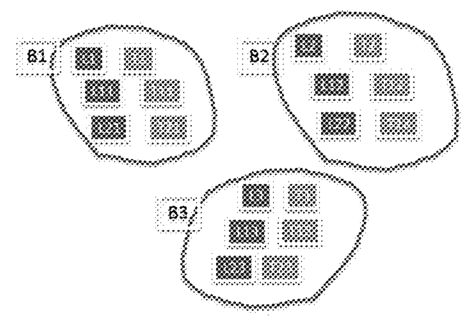

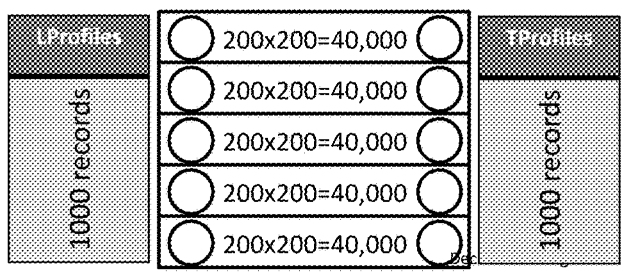

Two social networks of 1000 records divided into 5 blocks of 200 records each:

A total of 200,000 instead of 1 million

Fig. 64

Complexity Reduction [3]

Methodology

ABOUND FRAMEWORK
✓ IN DEVELOPMENT

| ID | FirstName | LastName | Gender | Occupation | Postcode |
|---|---|---|---|---|---|
| 1 | Joe | Miller | Male | Engineer | 2100 |
| 2 | Jane | Lee | Female | Researcher | 2200 |
| 3 | Alexander | William | Male | Actor | 2300 |
| 4 | Alice | Jones | Female | Developer | 2300 |

| ID | FirstName | LastName | Gender | Occupation | Postcode |
|---|---|---|---|---|---|
| 1 | Joseph | Miller | Male | Engineer | 2100 |
| 2 | J. | Lee | Female | Researcher | 2200 |
| 3 | Joe | Myler | Male | Developer | 2200 |
| 4 | Alexandre | William | Male | Artist | 2300 |
| 5 | Tim | Jones | Male | Developer | 2300 |

Fig. 65

Complexity Reduction [3]

Naïve Comparison

ABOUND
FRAMEWORK
✓ IN DEVELOPMENT

| | | | | | |
|---|---|---|---|---|---|
| 1 | Joe | Miller | Male | Engineer | 2100 |
| 2 | Jane | Lee | Female | Researcher | 2200 |
| 3 | Alexander | William | Male | Actor | 2300 |
| 4 | Alice | Jones | Female | Developer | 2300 |

| | | | | | |
|---|---|---|---|---|---|
| 1 | Joseph | Miller | Male | Engineer | 2100 |
| 2 | J. | Lee | Female | Researcher | 2200 |
| 3 | Joe | Myler | Male | Developer | 2200 |
| 4 | Alexandre | William | Male | Artist | 2300 |
| 5 | Tim | Jones | Male | Developer | 2300 |

Total number of comparisons:
5 + 5 + 5 + 5 = 20

Complexity Reduction [3]

Example with Blocking

ABOUND FRAMEWORK
✓ IN DEVELOPMENT

| ID | FirstName | LastName | Gender | Occupation | Postcode |
|---|---|---|---|---|---|
| 1 | Joe | Miller | Male | Engineer | 2100 |
| 2 | Jane | Lee | Female | Researcher | 2200 |
| 3 | Alexander | William | Male | Actor | 2300 |
| 4 | Alice | Jones | Female | Developer | 2300 |

An illustrative example with the "Postcode" as the blocking key.

| ID | FirstName | LastName | Gender | Occupation | Postcode |
|---|---|---|---|---|---|
| 1 | Joseph | Miller | Male | Engineer | 2100 |
| 2 | J. | Lee | Female | Researcher | 2200 |
| 3 | Joe | Myler | Male | Developer | 2200 |
| 4 | Alexandre | William | Male | Artist | 2300 |
| 5 | Tim | Jones | Male | Developer | 2300 |

Fig. 67

Complexity Reduction [3]

Complexity Comparison

ABOUND FRAMEWORK ✓ IN DEVELOPMENT

Duplicate candidates & Naive-based comparisons

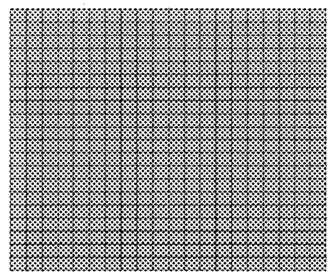

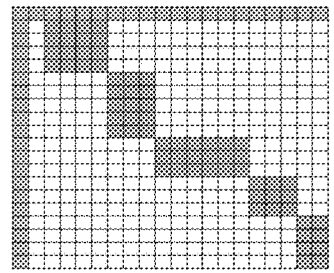

Duplicate candidates & blocking techniques

| Complexity | Blocking | Naive Comparison |
|---|---|---|
| Number of comparisons | $\frac{1}{2}\left(\frac{n^2}{b}-n\right)$ | $\left(\frac{n^2-n}{2}\right)$ |
| Key generation | $O(n)$ | - |
| Sorting | $O(n\log n)$ | - |
| Detection | $O\left(\frac{n^2}{b}\right)$ | $O(n^2)$ |
| Overall | $O\left(n\left(\frac{n}{b}+\log n\right)\right)$ | $O(n^2)$ |

Fig. 69

Complexity Reduction [3]
Blocking Techniques

ABOUND FRAMEWORK ✓ IN DEVELOPMENT

- A number of interesting approaches based on:
  - The Sequential Covering Alogrithm
  - The Discriminability and the Coverage metrics
  - The Attribute Clustering Blocking and Comparison Scheduling method
  - The Stored Neighbors approach

Complexity Reduction [3]
Transitive Closure

ABOUND FRAMEWORK ✓ IN DEVELOPMENT

Profile matching and Transitivity:
for all x,y,z ∈ A, x R y and y R z implies x R z L1 owl:sameAs T1 and
T1 owl:sameAs G1
➔ L1 owl:sameAs G1

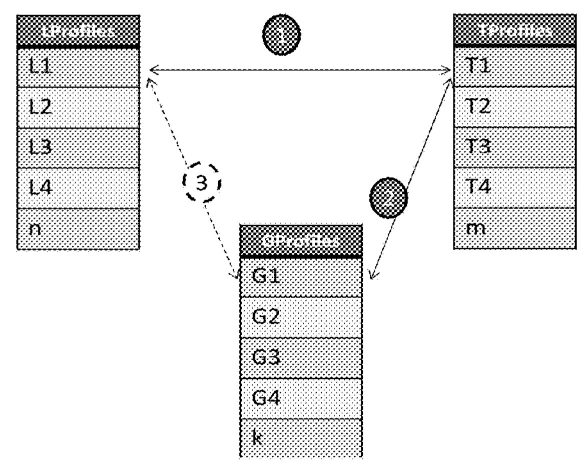

Fig. 70

Complexity Reduction [3]

Example: SN1 & SN3

ABOUND FRAMEWORK
✓ IN DEVELOPMENT

| ID | FirstName | LastName | Gender | Occupation | Postcode |
|---|---|---|---|---|---|
| 1 | Joe | Miller | Male | Engineer | 2100 |
| 2 | Jane | Lee | Female | Researcher | 2200 |
| 3 | Alexander | William | Male | Actor | 2300 |
| 4 | Alice | Jones | Female | Developer | 2300 |

| ID | FirstName | LastName | Gender | Occupation | Postcode |
|---|---|---|---|---|---|
| 1 | Josef | Miller | Male | Engineer | 2100 |
| 2 | J. | Lee | Female | Researcher | 2200 |
| 3 | Mark | Brown | Male | Developer | 2200 |
| 4 | Tim | Jones | Male | Developer | 2300 |

Fig. 72

Complexity Reduction [3]

ABOUND FRAMEWORK
✓ IN DEVELOPMENT

Example: SN2 & SN3

| ID | FirstName | LastName | Gender | Occupation | Postcode |
|---|---|---|---|---|---|
| 1 | Josef | Miller | Male | Engineer | 2100 |
| 2 | J. | Lee | Female | Researcher | 2200 |
| 3 | Mark | Brown | Male | Developer | 2200 |
| 4 | Alexandre | William | Male | Artist | 2300 |
| 5 | Tim | Jones | Male | Developer | 2300 |

| ID | FirstName | LastName | Gender | Occupation | Postcode |
|---|---|---|---|---|---|
| 1 | Joseph | Miller | Male | Engineer | 2100 |
| 2 | J. | Lee | Female | Researcher | 2200 |
| 3 | Joe | Myler | Male | Developer | 2200 |
| 4 | Tim | Jones | Male | Developer | 2300 |

Fig. 74

Complexity Reduction [3]

Pseudo Code

```
Input: DB={SN1, SN2, SN3}
Foreach (dbsrc in DB)
  Foreach (dbtrgt in DB)
   If (dbsrc NOT IN dbsrc[])
    { dbsrc[] ← dbsrc;
      If (dbtrgt NOT IN dbtrgt[])
      { Dbtrgt ←dbtrgt;
        KEYS = ComputeKeys(dbsrc, dbtrgt)
        Foreach (key in KEYS)
         U_{n,m} = MatchBlocking_{Key}(n,m)
        end
      }else
      {
        KEYS = ComputeKeys(dbsrc, dbtrgt)
        Foreach (key in KEYS)
         U_{m,k} = MatchBlocking_{Key}(U_{m},k)
         U_{n,k} = Transitive(n,k)
         U_{n,k-mk}  = MatchBlocking_{Key}(n,k-U_{m,k})
         U_{n,k}= Transitive(n,k)
         U_{m,k} = MatchBlockingKey(m-U_{m,k}-U_{n,k-mk},k)
         U_{n,k} = MatchBlockingKey(n-U_{m,k}-U_{n,k-mk},k)
        end
      }
  end
 end
```

ABOUND FRAMEWORK
✓ IN DEVELOPMENT

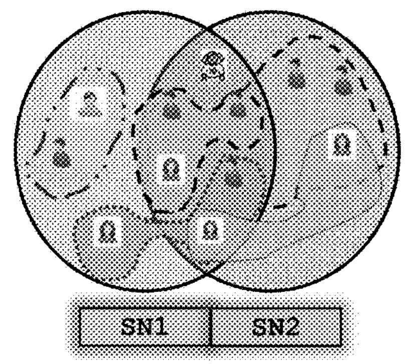

Fig. 78

Property Weighting [4]

Framework

ABOUND FRAMEWORK
✓ IN DEVELOPMENT

Weighting
Give weights to each attribute corresponding to the attribute importance within a defined context. For example: email score vs. homepage score.

| Property | Similarity |
| --- | --- |
| foaf :name | 0.9, 0.8, .. |
| foaf :firstname | 0.8, 0.7 .. |
| foaf :family_name | 1, 0.8, .. |
| foaf :workplaceHomepage | 0.65, 0.8, .. |
| foaf :img | 0.6, 0.7, .. |
| foaf :interest | 0.7, 0.7, .. |

| Attributes/Similarity Metrics | Jaro | ED | SoftTFIDF | ESA |
|---|---|---|---|---|
| < foaf : name > | 0.72 | 0.12 | 0.99 | 0 |
| < foaf : firstname > | 0.85 | 0.6 | 0.85 | 0 |
| < foaf : img > | 0.77 | 0.8 | 0.66 | 0 |
| < foaf : interest > | 0.52 | 0.22 | 0 | 0.75 |

Profile Matching [5]

Aggregation Functions

ABOUND FRAMEWORK
✓ IN DEVELOPMENT

- A decision making function is formally written as:

$$\mu(\{Sim_1(A_k, A_l), \ldots, f_n(N_k, N_l)\}, \{\varepsilon_1, \ldots, \varepsilon_n\}) \rightarrow \alpha_\mu^B$$

- Decision making functions:
  - Average-based function:

$$Avg(\{Sim_1(A_k, A_l), \ldots, Sim_n(N_k, N_l)\}, \{\varepsilon_1, \ldots, \varepsilon_n\}) = \frac{\sum_{i=1}^{n} \alpha_i^B}{n + \sum_{i=1}^{n} \varepsilon_i} \rightarrow \alpha_{Avg}^B$$

Profile Matching [5]

Aggregation Functions

ABOUND FRAMEWORK ✓ IN DEVELOPMENT

- Decision making functions:
  - Bayesian Network function encodes a joint *probability* over the set of variables defined by the following chain of rule:

$$P(V) = \prod_{i=1}^{n} P(V_i \mid \pi(V_i))$$

$$BN(\{Sim_1(A_k, A_l), \ldots, Sim_n(B_k, B_l)\}, \{\varepsilon_1, \ldots, \varepsilon_n\}) \rightarrow P(C = T \mid e)$$

$$P(C = T \mid e) = \frac{P(e \mid C=T)\, P(C=T)}{P(e)} = \frac{\prod_{e \in f} P(e \mid C=T) P(C=T)}{\sum_{b=T}^{F} \prod_{e \in f} P(e \mid C=b) P(C=b)}$$

Fig. 88

Profile Matching [5]

Aggregation Functions

ABOUND
FRAMEWORK
✓ IN DEVELOPMENT

- Decision making functions:
  - Dempster and Shafer function is based on the *mathematical theory of evidence* known as Dempster and Shafer which is used to calculate the probability of an event given a set of evidences:

$$m_{12}(A) = m_1 \oplus m_2(A) = \frac{\sum_{B \cap C = A} m_1(B) m_2(C)}{1 - \sum_{B \cap C = \phi} m_1(B) m_2(C)} \quad \text{when } A \neq \phi$$

Fig. 89

Profile Matching [5]

Aggregation Functions

ABOUND FRAMEWORK
✓ IN DEVELOPMENT

- Decision making functions:
  - Decision Trees are one of the *supervised machine learning* techniques based on logic methods of inferring classification rules. Fuzzy decision trees are a solution applicable on situations that cover cognitive uncertainty, in particular vagueness and ambiguity:
    - classification ambiguity G(P), with fuzzy portioning P:

$$G(P) = \sum_{i=1}^{k} w(E_i) \times G(E_i)$$

$$w(E_i) = \frac{M(E_i)}{\sum_{j=1}^{k} M(E_j)} \qquad M(A) = \sum_{u \in U} \mu_A(u)$$

Fig. 90

Profile Matching [5]
Aggregation Functions

ABOUND FRAMEWORK
✓ IN DEVELOPMENT

- Decision making functions:
  - Association Rule Mining (ARM) function is part of the descriptive classification category in the domain of data mining.
  - In an association rule ($X \rightarrow Y$)

$$X,Y \{ a_1, a_2, \ldots, a_n \},\ Y \neq \emptyset \text{ and } X \cap Y = \emptyset$$

- Interestingness measures:

Support $s(X) = |X \bigcup Y| \div k$ Confidence $c(X \Rightarrow Y) = |X \bigcup Y| \div X$

```
RB 1 :
(profileID1.name.TextSimilarity(profileID2.name) >= 0.9) AND
(profileID1.firstname.TextSimilarity(profileID2.firstname) >= 0.8) AND
(profileID1.family_name.TextSimilarity(profileID2.family_name) >= 1) AND
(profileID1.workplaceHomepage.TextSimilarity(profileID2.workplaceHomepage) >= 0.65) AND
(profileID1.img.TextSimilarity(profileID2.img) >= 0.6) AND
(profileID1.interest.TextSimilarity(profileID2.interest) >= 0.7)
→ (co-referent, 1)
```

Fig. 91

Passive Candidates

Data Polling Considerations

ABOUND
FRAMEWORK
✓ IN DEVELOPMENT

Last Updated

- Freshness of the data from each of the source locations will vary.
- Time period required to extract data on a widespread scale will necessitate a "divide and conquer" approach, distributing the tasks across a period of time.
- Complexity increased because the data pool is not static in nature. During the extraction and normalization period, any source profile may be added, updated or deleted, without notification.

Two approaches to mitigate this constraint:

1. Define a lifetime/window for extraction-through-provision period. Replace with fresher copy systematically.

Given an operating infrastructure to extract, normalize, score and provision the data, it is straightforward to initiate a subsequent instance that will come online after the previous edition expires. Our target cycle one each quarter.

2. Refresh

As part of the service offering, offer an on-demand refresh service that not only looks for updated records but re-scores the candidate and determines matching profiles.

Fig. 95

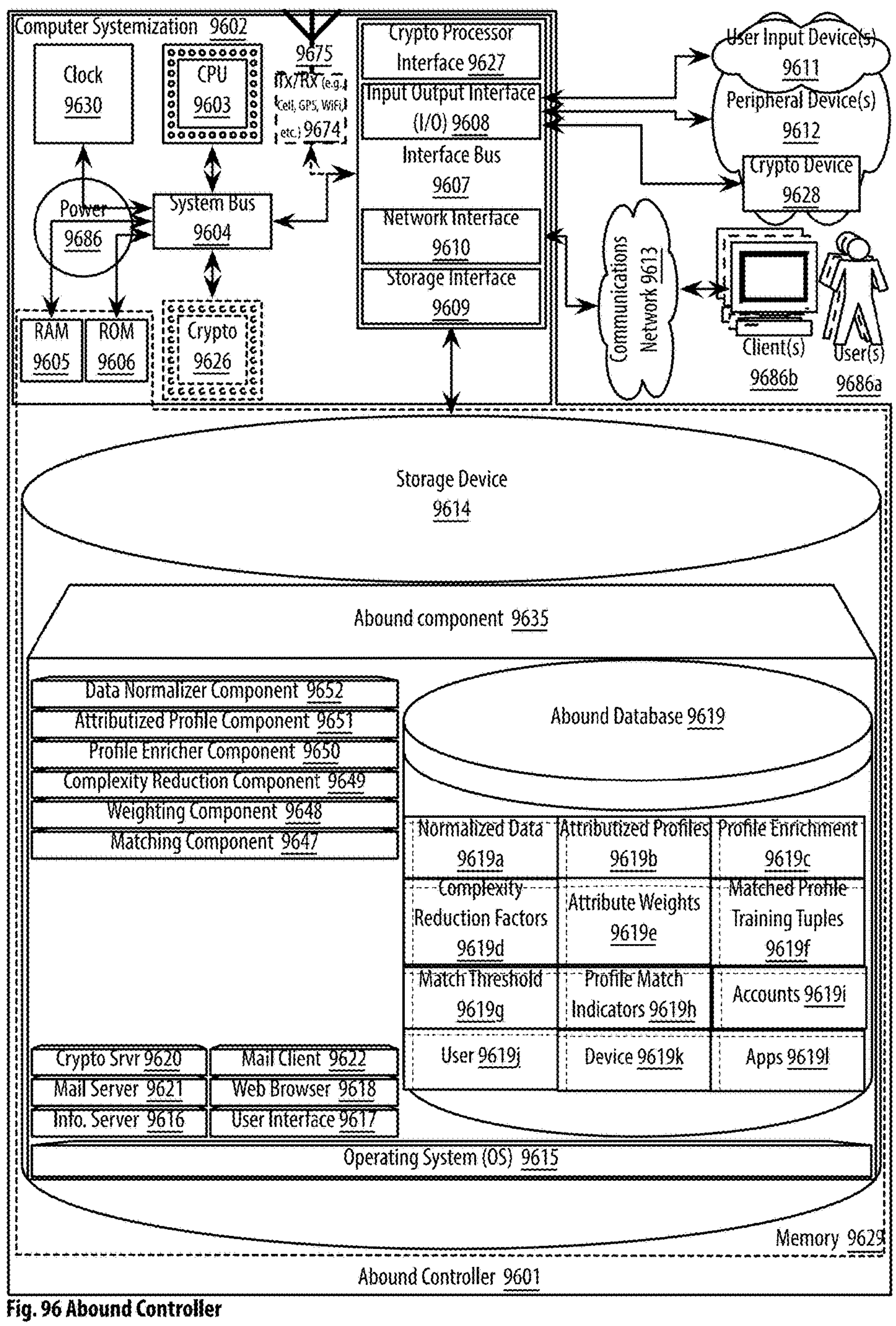
Fig. 96 Abound Controller

SOURCING ABOUND CANDIDATES APPARATUSES, METHODS AND SYSTEMS

PRIORITY CLAIM

Applicant hereby claims benefit to priority under 35 USC § 119 as a non-provisional conversion of U.S. provisional patent application Ser. No. 61/867,284, filed Aug. 19, 2013, entitled "Sourcing Candidates."

The entire contents of the aforementioned application is herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address social graph identification and matching, and more particularly, include Sourcing Abound Candidates Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Internet users maintain a number of accounts across different services. Internet users may have number of email accounts as well as a number of social network accounts. Often, Internet users will use different names and contact information in the profiles of their various Internet accounts.

BRIEF DESCRIPTION OF THE DRAWINGS

Appendices and/or drawings illustrating various, non-limiting, example, innovative aspects of the Sourcing Abound Candidates Apparatuses, Methods and Systems (hereinafter "Abound") disclosure, include:

FIGS. **1*a*-1*f*** show a datagraph diagram illustrating embodiments of messaging for Abound;

FIG. 2 shows a logic flow diagram illustrating embodiments of a data normalizer component for Abound;

FIGS. 3 and 4 show a logic flow diagrams illustrating embodiments of an attributized profile component for Abound;

FIG. 5 shows a logic flow diagram illustrating embodiments of a complexity reduction component for Abound;

FIG. 6 shows a logic flow diagram illustrating embodiments of a weighting component for Abound;

FIG. 7 shows a logic flow diagram illustrating embodiments of a matching component for Abound;

FIG. 8 shows a screenshot diagram illustrating embodiments for Abound;

FIG. 10 shows a delineated list of differentiating factors of embodiments of Abound;

FIG. 15 shows sample Crawl and API Data of embodiments for Abound;

FIGS. 19-25 show block data extraction diagrams illustrating embodiments of a Twitter Data Extraction for Abound;

FIGS. 26-32 show block data extraction diagrams illustrating embodiments of a LinkedIn Data Extraction for Abound;

FIGS. 33-37 show block data extraction diagrams illustrating embodiments of a Github Data Extraction for Abound;

FIGS. 38-43 show block data extraction diagrams illustrating embodiments of a Google+ Data Extraction for Abound;

FIGS. 44-51 show block data extraction diagrams illustrating embodiments of a Facebook Data Extraction for Abound;

FIGS. 52-57 show block data extraction diagrams illustrating embodiments of a Stack OverFlow Data Extraction for Abound;

FIGS. 58-59 shows exemplary diagrams illustrating embodiments of an Attributes' Extraction Summary for various social networks for Abound;

FIGS. 62-78 show complexity reduction block diagrams of embodiments for Abound;

FIGS. 85-92 shows profile matching block diagrams of embodiments for Abound;

FIG. 95 shows data polling considerations of embodiments for Abound; and

FIG. 96 shows a block diagram illustrating embodiments of a controller for Abound.

Figure 9:
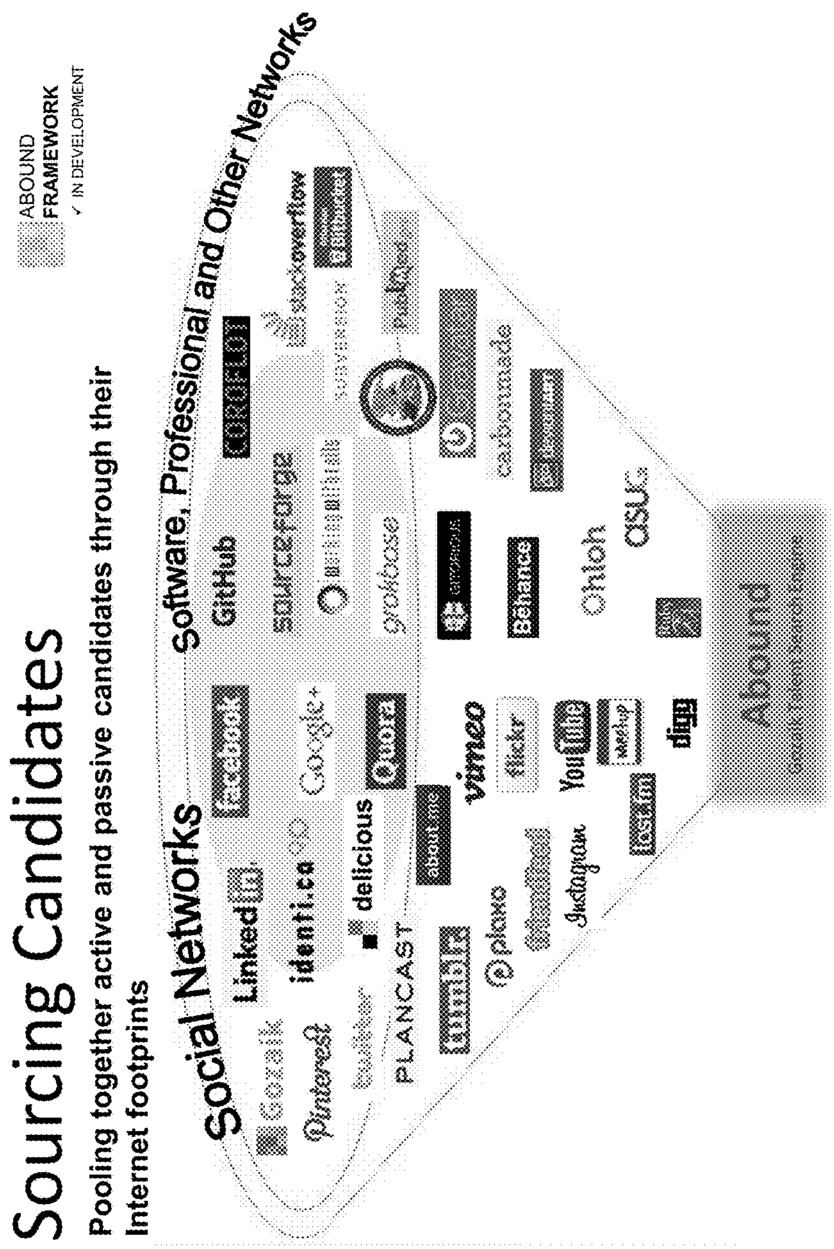
FIG. 9 shows a diagram illustrating pooling active and passive candidates through their internet footprints for embodiments of Abound.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Sourcing Abound Candidates Apparatuses, Methods and Systems (hereinafter "Abound") transforms data normalization support request and candidate criteria inputs, via Abound components (e.g., data normalizer, attributized profile, profile enricher, complexity reduction, weighting, matching, etc.), into criteria matching candidate indication outputs. Abound components, in various embodiments, implement advantageous features as set forth below.

Introduction

Abound makes it possible to source, e.g., job, candidates from a slew of e.g., social, networks and pool both active and passive candidates from their Internet footprints.

In contrast to Abound, current offerings produce too many duplicates. Current providers are restrictive and assume two profiles describe the same person only if one specific attribute is the same. Current providers place a heavy emphasis on email matching, which causes problems (e.g., Facebook users register with their personal email and LinkedIn users register with their professional email). Also, current providers rely on matching attributes that do not have the same values across social media profiles. For example, the options for Interests in Facebook may not match the options for Interests in LinkedIn. Current providers also rely on exact text entry matching, which can lead to poor results due to word variation and typing errors. For example, a candidate's name may be Joe in Facebook, but Joseph in LinkedIn.

Abound innovates past the techniques of current providers. Abound identifies the largest number of social profiles that refer to the same person. For example, Abound may investigate at least three areas: social network profile heterogeneity, similarity linking of attribute values, and algorithm-based decision making for candidate uniqueness. Abound components and frameworks allow users to give more importance to some attributes. As such, Abound may compare specific profile attributes and obtain appropriate results by applying adapted similarity function(s) that are associated to each attribute (e.g. comparing emails must be computed differently than comparing interests).

Abound

FIGS. 1*a*-1*f* show a datagraph diagram illustrating embodiments of messaging for Abound. An Abound server 101 (see FIG. 96 for more detail) may send a data extraction request 111 to a number of e.g., social, networks 105, and receive data normalization support responses 113 at Abound server 101, which may be stored in Abound database 119 (see 9619 of FIG. 96 for more detail).

An example extraction request command 111, substantially in the form of PHP is provided below:

```
<?php
// Call the required files
require__once('./configfile.php');
require__once('./oauth/oauth.php');
//Authentication keys
$consumerkey = "theconsumerkey";
$consumersecret = "theconsumersecret";
$accesstoken = "theaccesstoken";
$accesstokensecret = "theaccesstokensecret";
//Authentication function
function getConnectionWithAccessToken($cons__key, $cons__secret, $oauth__token,
$oauth__token__secret) {
   $connection = new TwitterOAuth($cons__key, $cons__secret, $oauth__token,
$oauth__token__secret);
   return $connection;
}
$connection = getConnectionWithAccessToken($consumerkey, $consumersecret,
$accesstoken, $accesstokensecret);
//Get the handles of a set of profiles
$sql = "select sno, handle from ‘sn__profile__urls‘ where status=0 order by sno
asc limit 0,1000";
$sql2 = mysql__query ($sql );
$nor = mysql__num__rows($sql2);
$handles = array( );
if($nor > 0){
      while($rs = mysql__fetch__assoc($q2)){
            $sno = $rs['sno'];
            $user__url = $rs['handle'];
            $handles[ ] = str__replace("socialnetworkurl", "", $user__url);
      }
      if (count($handles) > 0){
            $handles__string = "";
            foreach($handles as $handle){
                  $handles__string .= $handle.",";
            }
            $handles__string = substr($handles__string,0, -1);
      }
}
//Get social network information related to a handle
$users = $connection–
>get("https://api.twitter.com/1.1/users/lookup.json?screen__name=$handles__string
");
//Get specific information. See sample below.
if (count($users) > 1){
      foreach($users as $user){
            if( ($user–>id__str !=") && ($user–>screen__name !=") ){
                  $id__str = mysql__real__escape__string($user–>id__str);
                  $screen__name = mysql__real__escape__string($user–>screen__name);
                  $name = mysql__real__escape__string($user–>name);
```

-continued

```
                $profile__image__url = mysql__real__escape__string($user->profile__image__url);
                $location = mysql__real__escape__string($user->location);
                $url = mysql__real__escape__string($user->url);
                $description = mysql__real__escape__string($user->description);
                $created__at = mysql__real__escape__string(date('Y-m-d H:i:s',
strtotime($user->created__at)));
                $followers__count = mysql__real__escape__string($user->followers__count);
                $friends__count = mysql__real__escape__string($user->friends__count);
                $statuses__count = mysql__real__escape__string($user->statuses__count);
                $time__zone = mysql__real__escape__string($user->time__zone);
                $last__update = mysql__real__escape__string(date('Y-m-d H:i:s',
strtotime($user->created__at)));
                $index__id = "tw__".mysql__real__escape__string($user->id__str);
                                //Store the retrieved information into the database.
                $query = "select id from SN__users where screen__name='".$screen__name."'";
                $query2 = mysql__query($query) or die(mysql__error( ));
                $nor = mysql__num__rows($query2);
                if($nor > 0){
                }else{
                    $insert = "insert into SN__users(
                        id,
                        screen__name,
                        name,
                        profile__image__url,
                        location,
                        url,
                        description,
                        created__date,
                        followers__count,
                        friends__count,
                        statuses__count,
                        time__zone,
                        update__date,
                        index__id,
                        insert__date
                    ) values(
                        '".$id__str."',
                        '".$screen__name."',
                        '".$name."',
                        '".$profile__image__url."',
                        '".$location."',
                        '".$url."',
                        '".$description."',
                        '".$created__at."',
                        '".$followers__count."',
                        '".$friends__count."',
                        '".$statuses__count."',
                        '".$time__zone."',
                        '".$last__update."',
                        '".$index__id."',
                        now( )
                    )";
                    mysql__query($insert) or die(mysql__error( ));
                }
            }
        }
}
foreach ($handles as $screen__name){
        $user__handle = "https://twitter.com/".$screen__name;
        $update = "update `sn__profile__urls` set status=1 where
handle='".$user__handle."'";
        mysql__query($update) or die(mysql__error( ));
}
?>
```

An example data normalization support response 113 to the above request 111 provided below:

```
<pre>Array
(
        [0] => stdClass Object
            (
                [id] => 123
                [id__str] => 123
                [name] => FirstName LastName
                [screen__name] => userscreenname
```

-continued

```
                [location] => thecity, thecountry
                [description] => Bio Description that includes job title, company name
and number of interests and skills such as #php #mysql #programming
                [url] => http://homepageurl__shortened.com
                [entities] => stdClass Object
                    (
                        [url] => stdClass Object
                            (
                                [urls] => Array
                                    (
                                        [0] => stdClass Object
                                            (
                                                [url] => http://homepageurl__shortened.com
                                                [expanded__url] => http://homepageurl.com
                                                [display__url] => homepageurl.com
                                                [indices] => Array
                                                    (
                                                        [0] => 0
                                                        [1] => 20
                                                    )
                                            )
                                    )
                            )
                        [description] => stdClass Object
                            (
                                [urls] => Array
                                    (
                                    )
                            )
)
[protected] =>
                [followers__count] => 2190
                [friends__count] => 1734
                [listed__count] => 32
                [created__at] => Fri Oct 19 15:33:10 +0000 2010
                [favourites__count] => 107
                [utc__offset] => 6300
                [time__zone] => thecity
                [geo__enabled] =>
                [verified] =>
                [statuses__count] => 1560
                [lang] => en-gb
                [status] => stdClass Object
                    (
                        [created__at] => Wed Aug 14 08:00:28 +0000 2013
                        [id] => 5.9789786549738643E+16
                        [id__str] => 48654971114378560
                        [text] => A sample tweeted text- http://t.co/sample
                        [source] => <a href="http://twitter.com" rel="nofollow">Twitter Web
Client</a>
                        [truncated] =>
                        [in__reply__to__status__id] =>
                        [in__reply__to__status__id__str] =>
                        [in__reply__to__user__id] =>
                        [in__reply__to__user__id__str] =>
                        [in__reply__to__screen__name] =>
                        [geo] =>
                        [coordinates] =>
                        [place] =>
                        [contributors] =>
                        [retweet__count] => 0
                        [favorite__count] => 1
                        [entities] => stdClass Object
                            (
                                [hashtags] => Array
                                    (
                                    )
[symbols] => Array
                                    (
                                    )
[urls] => Array
                                    (
                                        [0] => stdClass Object
                                            (
                                                [url] => http://t.co/sample
                                                [expanded__url] => http://fullurl.com/sample
                                                [display__url] => fullurl.com/sample
                                                [indices] => Array
                                                    (
```

-continued

```
                                                    [0] => 2
                                                    [1] => 22
                                                )
                                          )
)
[user_mentions] => Array
                                    (
                                    )
)
[favorited] =>
                        [retweeted] =>
                        [possibly_sensitive] =>
                        [lang] => en
                    )
[contributors_enabled] =>
            [is_translator] =>
            [is_translation_enabled] =>
            [profile_background_color] => B3DFDB
            [profile_background_image_url] => photo.jpeg
            [profile_background_image_url_https] => photo2.jpeg
            [profile_background_tile] => 1
            [profile_image_url] => normal.jpg
            [profile_image_url_https] => normal.jpg
            [profile_banner_url] => 123456
            [profile_link_color] => 92A566
            [profile_sidebar_border_color] => FFFFFF
            [profile_sidebar_fill_color] => FFFFFF
            [profile_text_color] => 333333
            [profile_use_background_image] => 1
            [default_profile] =>
            [default_profile_image] =>
            [following] =>
            [follow_request_sent] =>
            [notifications] =>
        )
)
</pre>
```

An example extraction request command 111, substantially in the form of an HTTP(S) GET is provided below:

GET https://www.googleapis.com/plus/v1/people/userId

An alternative example data normalization support response 113, substantially in the form of a HTTP(S) JSON response is provided below:

```
{
    "kind": "plus#person",
    "id": "118051310819094153327",
    "displayName": "User Name",
    "url": "https://plus.google.com/118051310819094153327",
    "image": {
        "url": "https://lh5.googleusercontent.com/-
XnZDEoiF09Y/AAAAAAAAAAI/AAAAAAAAYCI/7fow4a2UTMU/photo.jpg"
    }
}
```

The data normalizer component may then perform data normalization 115 as discussed in greater detail in FIG. 2 on Abound server 101. Abound server may then issue a normalized data storage request 117 to the data normalizer in order to normalize the stored database information 115.

In response to the storage request 117, Abound server 101 may provide an attributized profile storage request 125 to the database 119 (e.g., the stored data from the database 119 may be mapped to the normalized FOAF profile). Also, Abound server 101 may issue a profile attribution support request 118 to the data normalizer in order to prepare the normalized data to be represented as a profile 115. In response, the database 119 may provide a profile attributization support response 121.

The response 121 may be used by the attributized profile component to perform profile creation (see FIG. 3 for greater detail) 123 on Abound server 101. Abound server 101 may then provide a profile enrichment support request 127 to the database 119. In response, the database may provide a profile enrichment support response 129.

Example structures and pseudo code for blocks 117-125, substantially in the form of PHP is provided below:

```
<?php
// Call the required files
require_once('./configfile.php');
//Database details
$config['SN_users'] = "twitter_users";
$config['SN_data'] = "twitter_tweets";
//Query to extract sample information
$sql = "SELECT t1.id, t1.screen_name, t1.name, t1.profile_image_url,
t1.location, t1.url,
t1.description,t1.followers_count,t1.friends_count,t1.statuses_count,
t1.time_zone, t1.last_update, t1.index_id as handleid from SN_users as t1 order
by t1.id limit 0,1000";
//Call the query
$result = mysql_query($sql, $cnx);
//Fetch results
while ($row = mysql_fetch_assoc($result)) {
      $str ="";
      $mypath="profilespath";
      $myFile =$mypath."/TW-".$row['id'].".rdf";
      //Create a normalized profile
      //Set of the main required vocabularies
      $str .="<?xml version='1.0' encoding='ISO-8859-1'?>\r\n";
      $str .="<RDF:RDF xmlns:RDF='http://www.w3.org/1999/02/22-rdf-syntax-ns#'
\r\n";
      $str .="xmlns:row='http://dummy/rdf#' xmlns:NC='http://home.netscape.com/NC-
rdf#' \r\n";
      $str .="xmlns:addr='http://wymiwyg.org/ontologies/foaf/postaddress*' \r\n";
      $str .="xmlns:foaf='http://xmlns.com/foaf/0.1/' >\r\n";
      $str .="<RDF:Bag about='urn:data:row'>\r\n";
      //List of the normalized attributes
      $disName = $row['screen_name'];
$str . ="<foaf:Person RDF:about='socialnetworkurl".$disName."'>\r\n";
      $str .="<foaf:account>" . XML_entities($row['screen_name']) .
"</foaf:account>\r\n";
$str .="<foaf:name>" . XML_entities($row['name']) . "</foaf:name>\r\n";
      if(substr_count($row['name']," ")>=1){
            list($fname,$lname) = explode(" ",$row['name']);
            $str .="<foaf:firstName>" . XML_entities($fname) .
"</foaf:firstName>\r\n";
            $str .="<foaf:lastName>" . XML_entities($lname) .
"</foaf:lastName>\r\n";
      }
      $str .="<foaf:img>" . XML_entities($row['profile_image_url']) .
"</foaf:img>\r\n";
$str .="<addr:region>" . XML_entities($row['location']) . "</addr:region>\r\n";
$str .="<foaf:homepage>" . XML_entities($row['url']) . "</foaf:homepage>\r\n";
      $skills = Get_IntersectionOfSkillsTags($row['description']);
      if(!empty($skills)):
            $str .="<foaf:theme>" . XML_entities($skills) . "</foaf:theme>\r\n";
      endif;
      $str .="<RDF:followersCount>" . XML_entities($row['followers_count']).
"</RDF:followersCount>\r\n";
$str .="<RDF:friendsCount>". XML_entities($row['friends_count']) .
"</RDF:friendsCount>\r\n";
   $str .="<RDF:statusesCount>" . XML_entities($row['statuses_count']) .
"</RDF:statusesCount>\r\n";
$str .="<RDF:timeZone>" . XML_entities($row['time_zone']) .
"</RDF:timeZone>\r\n";
$str .="<RDF:lastUpdate>" . XML_entities($row['last_update']) .
"</RDF:lastUpdate>\r\n";
$str .="<RDF:indexId>" . XML_entities($row['handleid']) . "</RDF:indexId>\r\n";
$str .="</foaf:Person>\r\n";
      $str .="</RDF:Bag>\r\n";
      $str .="</RDF:RDF>\r\n";
      //Store the normalized profile used to insert or update database information
      $fh = fopen($myFile, 'w') or die("can't open file");
      fwrite($fh, $str);
      fclose($fh);
}
function XML_entities($str) {
return preg_replace(array("'&'", "'\"'", "'<'", "'>'"), array('&#38;', '&#34;',
'<', '>'), $str);
}
function GetSN_Data($handleId){
      $sqlTweets = "select text From SN_data where SN_data.handle_id =
".$handleId." order by id";
      $resultTweets = mysql_query($sqlTweets);
      $numrows = mysql_num_rows($resultTweets);
      $tweetsval = "";
      $count=0;
      if($numrows>0){
```

-continued

```
            while($row=mysql_fetch_array($resultTweets)){
                if($count == 0)
                    $tweetsval .= $row['text'];
                else
                    $tweetsval .=",".$row['text'];
                $count++;
            }
        }
        return $tweetsval;
}
function Get_IntersectionOfSkillsTags($desc){
        $tags = Get_Skills( );
        $skilltags = @split('[,]', $tags);
        $values = array( );
        for($tval=0;$tval<=(count($skilltags)-1); $tval++){
            if (strpos(strtolower($desc), $skilltags[$tval]) !== false) {
                $values[ ] = $skilltags[$tval];
            }
        }
        $keyvalues = array_unique($values);
        $comma_separated = implode(",", $keyvalues);
        return $comma_separated;
}
function Get_Skills( ){
        $sql = "select skill from skills order by skill";
        $rs = mysql_query($sql);
        $rows = mysql_num_rows($rs);
        $tagsval = "";
        $count=0;
        if($rows>0){
            while($row=mysql_fetch_array($rs)){
                if($count == 0)
                    $tagsval .= $row['skill'];
                else
                    $tagsval .=",".$row['skill'];
                $count++;
            }
        }
        return $tagsval;
}
mysql_close($cnx);
?>
```

Abound server 101 may then use its profile enrichment component to perform profile enrichment 131 (see FIG. 4 for greater detail) on the response 129. Abound server 101 may then provide an enrichment storage request 133 and complexity reduction support request 135 to the database 119. In response, the database may provide a complexity reduction support response 137.

The response 137 may be used by the complexity reduction component to perform complexity reduction (see FIG. 5) 139 on Abound server 101. Abound server 101 may then provide complexity reducing factor storage request 141 and a property weighting support request 143 to the database 119. In response, the database may provide a property weighting support response 145.

The response 145 may be used by the weighting component to perform property weighting (see FIG. 6) 147 on Abound server 101. Abound server 101 may then provide a property weight storage request 149 and a profile matching support request 151 to the database 119. In response, the database may provide a profile matching support response 153. Also, and independently, user(s) (e.g., candidate job seekers, recruiters, systems, administrators, general searchers, etc.) 109 may use any number of client devices (e.g., mobile device, desktop/laptop computer, etc.) 107 to provide input 159 to the client device, which in turn may provide a candidate criteria submission 161 (e.g., candidate criteria may be mapped to the various attributes that are used to represent profiles in the database 119) to Abound server 101. See FIG. 8 for an example screenshot of 159.

Such candidate criteria submissions and profile matching support responses 153 may be used by the matching component to perform profile matching (see FIG. 7 for more detail) 155. Abound server 101 may then provide a profile match indication storage request 157 and candidate query 163 to the database 119. At this point querying, Abound's database is possible since the client's criteria are mapped to Abound's attributes 163. A query request 163 is thus sent to the database. The database 119 may then provide candidate query results 165 to Abound server 101, which may in turn, provide criteria matching candidate indications 167 to any requesting client devices 107 for user display (e.g., showing users results of candidates matching the users' provided criteria). The database returns the retrieved profiles that match the client's criteria 165. The returned candidates are Abound profiles (e.g., profiles matched across more than one social networks) 165.

FIG. 2 shows a logic flow diagram illustrating embodiments of a data normalizer component for Abound. This component may execute on Abound server 101 and/or on another computer. The component starts by being instantiated, for example in connection with an initialization of Abound. As an illustration, commencement of Abound functionality might involve a system administrator employing a graphical user interface (GUI) or other interface to request Abound initialization.

As depicted in FIG. 2, the data normalizer component performs blocks 201-237 with respect to a particular user and a particular, e.g., social, network, and may then repeat blocks 201-237 with respect to a different user and/or a different social network. For the case of n users and m social networks, the component may appropriately repeat blocks 201-237 such that blocks 201-237 are performed for each of the n users with respect to each of the m social networks.

As such, at block 201 the component may dispatch a normalization support request to the at-hand network requesting profile data for the at-hand user. According to one example, the request may be sent in accordance with an Application Program Interface (API) offered by that network. As another example a crawl approach may be employed by the component such that the component accesses the network as if it were a person accessing a web interface offered by the network. At block 203 the component may receive a corresponding response from the network. Although, to facilitate discussion, a single request dispatch is discussed in connection with block 201 and a single response receipt is discussed in connection with block 203, multiple dispatches and/or response receipts may be involved. For instance, in the case where the component accesses the network via a crawl approach limitations of a human-oriented web interface might dictate that coming to receive the totality of the profile data for the at-hand user with respect to the at-hand network dictate that multiple requests be dispatched and/or that multiple responses be received. Exiting blocks 201 and 203 the component may possess the totality of the profile data for the at-hand user with respect to the at-hand network.

At block 209 the component may determine whether or not a schema is already known for the at-hand network. A schema may, for example, specify for employed data tags corresponding data types. As an illustration a schema might indicate that a "<name>" tag correspond to the data type string and that an "<age>" tag correspond to the data type integer.

In the case the schema for the at-hand network is already known the component may, at block 215, retrieve that schema (e.g., from database 119). In the case where the schema is not already known the component may, at block 211, deduce or request the schema Block 211 may involve extracting a schema from instance data for a defined social network, for example, by requesting the schema in the case where the schema is available from an external source (e.g., where the at-hand network may return its schema in response to a request therefor). Block 211 may involve deducing/requesting the schema in the case where the schema is not thusly available.

As noted, a schema may specify for employed data tags corresponding data types. Schema deduction may involve the component examining the at-hand profile data such that tag-data couplings are visited in so as to determine, for each tag of the profile data, the corresponding data type. It is noted that such tag-data couplings might be referred to as instance data.

As an illustration, suppose that the profile data includes the following tag-data couplings:

```
<id> 892 </id>
<name> John Smith </name>
<url> www.sample.net/johnsmith </url>
<sex> male </sex>
```

Examining "892" the component might ascertain that "892" can be represented using an integer and conclude corresponding data type for the tag <id> to be integer. Examining "John Smith" the component might ascertain that "John Smith" can be represented using a string and conclude corresponding data type for the tag <name> to be string.

Examining "www.sample.net/johnsmith" the component might, as one example, ascertain that "www.sample.net/johnsmith" can be represented using a string and conclude corresponding data type for the tag <url> to be string. As another example the component might ascertain that "www.sample.net/johnsmith" can be represented using a string subject to the pattern of string data followed by a "/" followed by further string data. As such the component might conclude the data type for <url> to be a string subject to such a pattern. As a third example, in the case where Universal Resource Locator is among the data types at the disposal of the component, the component might ascertain that "www.sample.net/johnsmith" can be represented by a Universal Resource Locator and conclude the data type for tag <url> to be Universal Resource Locator.

Examining "male" the component might ascertain that "male" can be represented using a string and conclude the data type for the tag <sex> to be string. As another example, the component may have access to a enumeration tool that is aware of extant values that are a member of a limited set of values and which, when receiving such a value, returns the set. For instance, such a tool when presented with "January" might return "January," "February," "March," "April," "May," "June," "July," "August," "September," "October," "November," and "December." In like vein, such a tool when presented with "male" might return "male" and "female." As such the component might both, as discussed, determine that "male" can be represented using a string and further, via the enumeration tool, receive "male" and "female." The component might then conclude the data type for <sex> to be an enumerated string whose values are limited to "male" and "female." As a third example, in the case where gender is among the data types at the disposal of the component, the component might ascertain that "male" can be represented by a gender and conclude the data type for tag <sex> to be gender.

Determining a data type which can successfully represent a given value—say that "892" can be represented using an integer—may be achieved in a number of ways. As one example, the component may be written in a language and/or run with respect to an operating system which offers a function which accepts a value an returns a datatype which can represent that value.

As another example, the component might attempt to assign a value to each of multiple datatypes and to trap any errors which arise in doing so. The attempts might be performed in an order based on data type restrictiveness. As an illustration, Boolean might first be attempted, then integer, and then string, with Boolean considered the most restrictive type and string considered to be the least restrictive type. Illustratively as such, turning to "892" the component might first attempt to represent "892" to a Boolean and, receiving a trapped error when doing so, consider that attempt to fail. The component might then attempt to represent "892" as an integer and, trapping no error in doing so, consider the attempt to be a success and conclude the data type for the tag <id> to be integer.

As such, by so visiting the tag-data couplings of the profile data and determining for each visited tag the corresponding data type, the component may determine for the at-hand network a schema which specifies for the data tags employed by that network the corresponding data types.

Having performed block 211—be it by schema request or schema deduction—the component may be in possession of a schema for the at-hand network. At block 213 the component may instruct database 119 to store that schema. At block 215 the component may request that database 119 provide that schema. Such storing of the schema in the database followed by access therefrom might facilitate the component freeing, during the time which elapses between block 213 and block 215, local storage area for other purposes (e.g., for use by other components and/or processes).

The profile data may contain one or more links to data stored separately from the profile data. As one example such a link might be included in the profile data as part of a tag-data coupling (e.g., <workplacedata> www.sampcorp.net/empl_johnsmith.json </workplacedata>). As another example such a link might be included in the profile data in a manner other than a tag-data coupling. At block 217 the component may determine whether or not the profile data includes such links to separately stored data. In the case where no such links exist, the component may proceed to block 229. In the case where such links do exist, the component may proceed to block 219 to access the linked data. As an illustration, where the at-hand link is www.sampcorp.net/empl_johnsmith.json the component might access the server located at www.sampcorp.net and retrieve empl_johnsmith.json.

Having retrieved the linked data, the component may perform blocks 221-227 with respect to that linked data. The component may perform blocks 221-227 in a manner analogous to that discussed hereinabove with respect to blocks 209-215.

Entering block 229, the component will have possession of the profile data, any data linked by that profile data, a schema for the profile data, and profiles for any such linked data. From this position the component may perform housekeeping with respect to the profile data and any linked data. In one aspect, such housekeeping may involve the component, at block 229, pruning from the profile data and any linked data duplicate data. As an illustration, suppose that the profile data included <name> John Smith </name> and linked to data which also included <name> John Smith </name>. Under such a circumstance the component might, at block 229, remove one of the two instances.

According to an example, the component might likewise act to, where the profile data included <name> John Smith </name> and the linked-to data included <nme> John Smith </nme>, to remove one of these two instances despite the tags <name> and <nme> not being identical. The component might, for instance, do this in view of recognizing both <name> and <nme> to coupled to the data "John Smith." Alternately or additionally the component so remove an instance in view of the linguistic similarity between "<name>" and "<nme>."

At block 231 may—for the profile data and any linked data—act to conform either or both of non-enumerated data and enumerated data to a normalized format. Such normalized formats might, for instance, be set during a configuration stage.

As an illustration of data conformation for non-enumerated data, suppose that such a normalized format indicated that a person's name be in the format last name, first name. Under such a circumstance the component might normalize <name> Richard Smith </name> to <name> Smith Richard </name>. In normalizing data the component might employ an accessible interpretive store. Illustratively and returning to the example, such an interpretive store might indicate that "Smith" is or is likely a last name, and/or that "Richard" is or is likely a last name.

As an illustration of data conformation in the case of enumerated data, suppose that a normalized data format indicated that gender be in the format M/F. Under such a circumstance the component might normalize <sex> male </sex> to <sex> M</sex>.

Proceeding to blocks 233 and 235, the component may perform mappings between tags of the profile data and any linked data, and attributes of the to-be-employed attributized profile. As an example such attributes might be Friend of a Friend (FOAF) attributes.

Such mappings might take into account linguistic commonality between names of attributized profile attributes, and names of tags of the profile data and/or linked data.

As an illustration, suppose that one of the attributized profile attributes is "name" and that one of the profile data tags is "<name>." In view of the linguistic commonality between "name" and "<name>" the component might determine that the profile tag "<name>" map to the attributized profile attribute "name."

As another example, such mappings might alternately or additionally take into account similarities between the data formats for attributized profile attributes, and the schema-indicated data formats for tags of the profile data and/or linked data.

As an illustration, suppose that one of the attributized profile attributes is mbox and that the data format for that attribute is in the form of string@string.string. Suppose further that that one of the profile data tags is "<email>" and that the data format for that tag is also in the form of string@string.string. Under such a circumstance be component might determine that the profile tag "<email>" should map to the attributized profile attribute "mbox" in view of string@string.string matching string@string.string, and despite "<email>" and "mbox" arguably having low linguistic commonality.

As such, at block 233 the component may determine whether or not mappings are already known for the at-hand network. In the case where such mappings are already known the component may proceed to block 237. In the case where such are not already known the component may proceed to block 235. At block 235 the component may, in accordance with the above, establish one or more mappings to attributized profile attributes. According to an example, the component might include with the mappings indication of attributized profile attributes which are the target of no mappings, and/or of profile data tags and/or linked data tags which remain unmapped. As an illustration, where the attributized profile attribute "topic" was the target of no mapping the component might set forth indication of this. As another illustration, where the linked data tag "<time_zone>" remained unmapped the component might set forth indication of this.

At block 237 the component may dispatch a normalized data storage request to the database 119. The storage request may cause the database to store one or more of profile data which has been subject to normalized format conformation, linked data which has been subject to normalized format conformation, schema, and/or the discussed mapping information.

As noted hereinabove, for the case of n users and m social networks the component may appropriately repeat blocks 201-237 such that blocks 201-237 are performed for each of the n users with respect to each of the m social networks. In keeping with this at block 239 the component may determine whether or not there is call for such repeating. Where there is such call the component may return to block 201 with respect to the called-for user and network. Where there is not such call the component may end execution at block 240.

FIG. 3 shows a logic flow diagram illustrating embodiments of an attributized profile component for Abound. This component may execute on Abound server 101 and/or on another computer. The component starts by being instantiated, for example in connection with the data normalizer component having completed performance of data normalization. As depicted in FIG. 3, the attributized profile component performs blocks 301-313 with respect to a particular user and a particular social network, and may then repeat blocks 301-313 with respect to a different user and/or a different social network. For the case of n users and m social networks, the component may appropriately repeat blocks 301-313 such that blocks 301-313 are performed for each of the n users with respect to each of the m social networks.

At block 301 the component may dispatch a profile attributization support request to database 119 requesting, for the at-hand user with respect to the at-hand network, one or more of profile data which has been subject to normalized format conformation, linked data which has been subject to normalized format conformation, schema, and/or the discussed mapping information. At block 303 the component may receive a corresponding response from the database.

Via blocks 305-311 the component may act to populate one or more attributes (e.g., (FOAF) attributes) so as to create an attributized profile which corresponds to the at-hand user and the at-hand network. At block 305 the component may, for the at-hand user and the at-hand network, populate one or more such attributes using data which was explicitly provided by the at-hand user in connection with the at-hand network. Such population may make use of the mapping information discussed hereinabove in connection with FIG. 2.

As an illustration, suppose that the at-hand profile data includes the tag-data coupling <myphoto> ./richard.jpg </myphoto> which set forth an image of the at-hand user. Suppose further that the mapping information indicates a mapping between "<myphoto>" and the FOAF attribute "Image," or a mapping between "<myphoto>" and the FOAF attributes "Person," "img," and "Image" where "Person" is set to indicate the relevant at-hand user, "Image" is set to indicate the image indicated by "<myphoto>", and "img" is set to relate the at-hand user and the image indicated by "<myphoto>." Under such a circumstance the component might, at block 305 with respect to <myphoto> ./richard.jpg </myphoto> populate FOAF attributes "Person," "img," and "Image" with "Person" being set to indicate the at-hand user, "Image" is set to indicate./richard.jpg, and "img" is set to relate the at-hand user and ./richard.jpg.

At block 307 the component may, for the at-hand user and the at-hand network, populate one or more attributes using data which was explicitly provided, in connection with the at-hand network, by users other than the at-hand user. Such population may make use of the mapping information discussed hereinabove in connection with FIG. 2.

As an illustration, suppose that the at-hand profile data includes the tag-data coupling <bestfriendphoto> ./jimmy.jpg </bestfriendphoto> which sets forth an image of a friend user of the at-hand user where the image was provided by that friend user. Suppose further that the mapping information indicates a mapping between "<bestfriendphoto>" and the FOAF attribute "Image," or a mapping between "<bestfriendphoto>" and the FOAF attributes "Person," "knows," "Person," "img," and "Image" where the first instance of "Person" is set to indicate the relevant at-hand user, the second instance of "Person" is set to indicate the relevant friend user, "Image" is set to indicate the image indicated by "<bestfriendphoto>," "knows" is set to relate the friend user to the at-hand user, and "img" is set to relate the indicated image to the friend user. Under such a circumstance the component might, at block 307, with respect to <bestfriendphoto> ./jimmy.jpg </bestfriendphoto> populate the noted FOAF attributes with the first instance of "Person" being set to indicate the at-hand user, the second instance of "Person" being set to indicate the friend user, "Image" being set to indicate ./jimmy.jpg, "knows" being set to relate the friend user to the at-hand user, and "img" being set to relate the ./jimmy.jpg to the friend user.

At block 309 the component may, for the at-hand user and the at-hand network, populate one or more attributes using data which was implicitly provided by the at-hand user in connection with the at-hand network. Such populating may be directed towards profile data tags and/or linked data tags which remained unmapped after completion of the data normalizer component operations discussed in connection with FIG. 2, and or to attributized profile attributes which were the target of no mappings after completion of the data normalizer component operations discussed in connection with FIG. 2. As discussed the data normalizer component may set forth indication of such instances of being unmapped and/or of being the target of no mappings. The attributized profile component may take such indications into account when performing block 307 so as to direct its efforts to such unmapped tags, and/or to such attributized profile attributes which were the target of no mappings.

As an illustration, suppose that FOAF attributized profile attribute "workplaceHomepage" was the target of no mappings and that the component desired to populate this field with respect to the at-hand user. The component might access the applicable schema to learn that "workplaceHomepage" is to specify the homepage of a business or organization for which an individual works. The component might then, via application of the applicable schema, look for normalized profile data and/or normalized linked data tags which are related to the attribute "workplaceHomepage" as indicated by the schema for that attribute. As one example, the component might take into account similarity of the name of the tag and the name of the attribute. As another example the component might take into account the similarity of the data associated with such tags. So doing, the component might consider the attribute "workplaceHomepage" name to be linguistically similar to the normalized profile data tag name "<workname>." The component might then access the data associated with that normalized profile data tag and retrieve the string "Major Corp." The component might then recognize "Major Corp." to be the name of a company but not to be a URL thereof. Such conclusion might be made via one or more of consideration of available schemas, applying "Major Corp." to a store which includes names of corporations, and/or recognizing "Major Corp." to not be in the form of URL.

Having recognized "Major Corp." to be the name of a company but not to be a URL thereof, the component might access a search engine or other source which, provided with "Major Corp." and an indication that a URL therefore is desired, would return that URL. Receiving the URL for "Major Corp." therefrom the component could, in accordance with the schema, populate the FOAF attributized profile attribute "workplaceHomepage" to specify the received URL with respect to the at-hand user.

At block 311 the component may, for the at-hand user and the at-hand network, populate one or more attributes using data which was implicitly provided, in connection with the at-hand network, by users other than the at-hand user. Such functionality may be performed in a fashion in-line with that discussed hereinabove with respect to block 309. As an illustration, suppose that the FOAF attributized profile attribute "topic" was the target of no mappings and that the component desired to populate this field with respect to the at-hand user. The component might access the applicable schema to learn that "topic" is to specify the topic of a document. Further, the component might consider the at-hand user's profile to be the relevant document.

The component have access to a topic service which, given source data, relate words thereof to topics (e.g., dictionary lookup), determine one or more topics of the source data, consider the topic of the source data to be that of the determined topics which has the greatest number of occurring words. As an illustration, suppose that the source data included the words "tree," "tent," "backpack," "switch," "IP," "MAC," "router," and "NIC." The component might consider the source data to have two topics: "camping" corresponding to "tree," "tent," and "backpack," and "computer networking" corresponding to "switch," "IP," "MAC," "router," and "NIC." Then, seeing that three words are associated with the "camping" topic but that five words are associated with the "computer networking" topic, the topic service might conclude "computer networking" to be the topic of the source data.

The topic service might set forth that proper topic assignment to a document calls for receiving string data which comprises a specified threshold percentage of that document. The component might examine the normalized profile data and/or normalized linked data to determine the tags thereof whose corresponding data make up the highest percentages of the profile data and/or linked data. So doing, the component might learn that the profile data and/or linked data includes the tag "<user replies>" and that the data corresponding to this tag makes up the majority of the profile data and/or linked data and meets the threshold. As such, the component might pass the data corresponding to this tag to the topic service and receive a topic in reply. The component might then employ that received topic in populating the FOAF attributized profile attribute "topic.". As an illustration, where the topic service returned the topic "networking" the component could, in accordance with the schema, populate the FOAF attributized profile attribute "topic" to specify the received.

It is noted that the employ of such "<user reply>" data in populating the FOAF attributized profile attribute "topic" constitutes the employ of data implicitly-provided by users other than the at-hand user: by users other than the at-hand user as they are provided by other than the at-hand user, and implicit because these comments, while implying a topic via their word use, do not explicitly set forth a topic thereof.

As such, via the performance of blocks 305-311 the attributized profile component may populate one or more attributes (e.g., FOAF attributes) so as create—in view of normalized profile data and/or normalized linked data—an attributized profile, corresponding to the at-hand user and the at hand network. At block 313 the component may dispatch an attributized profile storage request to the database 119. The storage request may cause the database to store the attributized profile corresponding to the at-hand user and the at-hand network. As noted hereinabove, for the case of n users and m social networks, the component may appropriately repeat blocks 301-313 such that blocks 301-313 are performed for each of the n users with respect to each of the m social networks. In keeping with this at block 315 the component may determine whether or not there is call for such repeating. Where there is such call the component may return to block 301 with respect to the called-for user and network. Where there is not such call the component may end execution at block 317.

Further to that which was discussed hereinabove in connection with blocks 305-311, additional examples of populating attributes (e.g., (FOAF) attributes) so as to create an attributized profile will now be discussed.

Firstly discussed will be the circumstance wherein the at-hand network is a microblogging social network in which users may post messages, reply to messages, and follow other users. As one example, where the at-hand network is a microblogging social network the component may populate attributes using that of the normalized user profile data which corresponds to data explicitly provided by the user. For instance, in creating a bio on a microblogging social network the user might provide a photograph of himself, his name, an indication of his city and/or metropolitan area of residence, a link to his website, and an indication of his account name for the microblogging social network.

The explicitly-provided photograph might be employed by the component in populating one or more attributes which regard the user's image. For instance, the photograph might be employed in populating a FOAF img attribute and a FOAF Image attribute, with the Image attribute specifying the user's image and the FOAF img attribute being employed to relate that image to the user. The explicitly-provided name might be employed by the component in populating one or more attributes which regard the user's name. For instance, the name might be employed in populating a FOAF name attribute (e.g., conveying both given name and family name), a FOAF surname attribute, a FOAF family_name attribute, a FOAF givenname attribute, and/or a FOAF firstName attribute. The explicitly-provided city and/or metropolitan area of residence might be employed by the component in populating one or more attributes which regard the user's residence. For instance, the city and/or metropolitan area of residence might be employed in populating a FOAF based_near attribute. The explicitly-provided website link might be employed by the component in populating one or more attributes which regard the user's website. For instance, the website link might be employed in populating a FOAF homepage attribute. The explicitly-provided account name might be employed by the component in populating one or more attributes which regard the name of the user's account. For instance, the account name might be employed in populating a FOAF holdsAccount attribute, a FOAF OnlineAccount attribute, and a FOAF accountName attribute, with the accountName attribute specifying the account name, and the holdsAccount and OnlineAccount attributes being set to relate that account name to the user.

As a further example where the at-hand network is a microblogging social network, the component may populate attributes using that of the normalized user profile data which corresponds to data implicitly provided by the user. As one example, in creating a bio on a microblogging social network the user might provide his name. The name might implicitly indicate the gender of the user. The component may have access to a store associating given names with gender and might employ that store to deduce the gender of the user from the user's name. Having deduced the user's gender, the component might employ the deduced gender in populating one or more attributes which convey the gender of the user. For instance, the deduced gender might be employed in populating a FOAF gender attribute.

As another example, the user might post messages to the microblogging social network. Such posted messages may implicitly convey various information including a topic with which the posted messages can be classified and a topic which is of interest to the user. The component might have access to a word-topic associator and might employ this associator to deduce a topic of the posted messages. As an illustration, suppose that the posted messages included the terms "certifications," "IPv6," and "routing." Accessing the associator, the component might find that "IPV6" and "routing" are associated with the topic of "networking." The component might then take the finding of the topic of "networking" along with the posted term "certifications" to consider the topic of the postings to be "networking certifications."

As one example, the associator might be implemented as a lookup table which associates words with topics. As another example the associator might be implemented via application of machine learning. Machine training might be done by feeding terms and/or documents along with corresponding topics. Once trained, provision of a term could yield a topic.

Having come to consider the topic of the postings to be "networking certifications," as one example the attributized profile component may employ the implicitly-provided postings topic in populating attributes which specify a topic of the posted messages, a primary topic of the posted messages, a topic which is of interest to the user, and one or more documents which are of interest to the user. For instance, "networking certifications" might be employed in setting a FOAF topic attribute and/or a FOAF isPrimaryTopicof attribute. As an example, "networking certifications" might be employed in connection with a primary topic attribute (e.g., a FOAF Topic attribute) rather than a topic attribute (e.g., a FOAF topic attribute) in order to convey that while "networking certifications" represent a main thrust of the posted messages the posted messages may not be limited to the topic of "networking certifications." Turning to attributes which convey a topic which is of interest to the user, the component may take the user having posted messages regarding "networking certifications" to be indicative of the user having an interest in that topic. As such the component might set a topic of interest attribute (e.g., a FOAF topic_interest) attribute to indicate "networking certifications." Moreover, the component might employ periodical search, book search, webpage search, or the like to search for one or more documents (e.g., periodical articles, books, and/or webpages) which relate to "networking certifications." The component might then set an interest attribute to convey identifiers (e.g., ISBNs, titles, or URLs) of the found documents. For instance, a FOAF interest attribute might be set to relate, to the user, a URL of a found website regarding "networking certifications."

As a further example regarding populating attributes using that of the normalized user profile data which corresponds to data implicitly provided by the user, the user might join user groups hosted by the microblogging social network Such user group memberships might implicitly convey a theme which is common amongst those groups. As one example, in a manner analogous to that discussed hereinabove regarding the word-topic associator and deduction of posted message topic, the component might have access to a word-theme associator and might employ this associator to deduce a theme of the group memberships. As an illustration, suppose that the profile indicates that the user is a member of a group entitled "networking nerds" and a group entitled "friends of switches." Providing such group titles to the association, the component might receive indication that both groups are associated with the theme "networking." As another example, the under-consideration network may allow for group to provide descriptive information (e.g., in the form of a group webpage). As such, the component might access such group descriptive information and provide such group descriptive information to the associator. In return the component might receive indication that both groups are, in accordance with their group descriptions, associated with the theme "networking."

Having come to consider the groups to have a common theme—say "networking"—the component may employ the implicitly-provided theme in specifying a corresponding attribute. For instance, a FOAF Theme attribute might be set to relate the groups of which the user is a member with the theme "networking."

As yet another example regarding populating attributes using that of the normalized user profile data which corresponds to data implicitly provided by the user, messages post to the microblogging social network by the at-hand user may implicitly convey home location and workplace location regarding the user. For instance, included with such a user-posted message may be an indication of a geographical location from which the user posted the message (e.g., an indication of a city and/or of a neighborhood) and an indication of a time of day at which the user posted the message. The component might consider certain blocks of time to be work hours (e.g., weekdays between the hours of 8 a and 5 p) and other blocks of time to be non-work hours (e.g., times other than weekdays between the hours of 8 a and 5 p). The component might examine the geographical locations listed for those posts made during the work hours in order to ascertain a workplace location (e.g., the component might consider the location from which the majority of work hours posts are made to be the workplace location). In like vein the component might examine the geographical locations listed for those posts made during the non-work hours in order to ascertain a home location (e.g., the component might consider the location from which the majority of non-work hours posts are made to be the home location). Having come to ascertain a workplace location and/or a home location for the user, as one example the attributized profile component may employ such location information in populating attributes which specify a user workplace location and/or a user home location. For instance, the ascertained workplace location (e.g., a city and/or a neighborhood) might be employed in setting a FOAF workplaceHomepage attribute to specify the URL of a webpage which conveys the workplace of the user (e.g., a webpage associated with the relevant workplace city and/or neighborhood such as a municipal website promoting the workplace city and/or neighborhood). Further for instance, the ascertained home location (e.g., a city and/or a neighborhood) might be employed in setting a FOAF schoolHomepage attribute to specify the URL of a webpage which conveys the home location of the user (e.g., a webpage associated with the relevant home location city and/or neighborhood such as a municipal website promoting the home location city and/or neighborhood). It is noted that such employ of a FOAF schoolHomepage attribute to convey other than information regarding a school attended by a user might be viewed as a repurposing of such attribute.

As an additional example regarding populating attributes using that of the normalized user profile data which corresponds to data implicitly provided by the user, the user might follow other users via the microblogging social network. Such indication of other users whom the at-hand user is following may implicitly convey one or more organizations of which the at-hand user is a member. For instance, a network may allow both for user accounts which correspond to individuals and user accounts which correspond to companies, groups, organizations, and/or the like. In the case where the at-hand user follows an organizational user, the component may deduce that the at-hand user is a member of that organization.

As one example, the component may be able to access a service and/or server (e.g., one hosted by the at-hand network) by which the component may submit a user name and learn whether or not the submitted user name corresponds to an organization. Where the submitted user name corresponds to an organization, the component may also learn from the service and/or server the name of the organization. Alternately or additionally, the component may consider the organizational user name to be the name of the organization (e.g., in the case of the organizational user name "Cloud Server Professionals" the component may consider the name of the organization to be "Cloud Server Professionals"). As such, the component may consider the users followed by the at-hand user and, for each of those followed users, learn from the service and/or server whether or not the followed user corresponds to an organization.

As another example, the component may have access to a store which holds names of organizations. The component may consult this store using names of users followed by the at-hand user and/or corresponding descriptive text of those followed users in order to determine whether or not a given followed user corresponds to an organization. Where a followed user name corresponds to an organization, the component may learn from the store the name of that organization. Alternately or additionally, the component may consider the organizational user name to be the name of the organization (e.g., in the case of the organizational user name "Cloud Server Professionals" the component may consider the name of the organization to be "Cloud Server Professionals").

Where the component determines the at-hand user to be following a user corresponding to an organization, the component may populate an attribute which specifies the at hand user to be a member of the organization (e.g., with the attribute setting forth that which the component considers to be the name of the organization). For instance, the component may employ such name of the organization in populating a FOAF Organization attribute and a FOAF member attribute, with the FOAF Organization attribute specifying such name of the organization and the FOAF member attribute relating the organization to the user.

As an additional example where the at-hand network is a microblogging social network, the component may populate attributes using that of the normalized user profile data which corresponds to data explicitly provided by users other than the at-hand the user. As an example, the at-hand user may post messages via the microblogging social network and other users may, via the microblogging social network, reply to those messages. Those other users may explicitly provide to the at-hand network photographs, and included along with the replies may be those photographs. The component may consider those users who have replied to the at-hand user to comprise a group, and may consider the photographs of those users to depict that group. The photographs of those other users might be employed by the component in populating one or more attributes which convey the depiction of a group made up of users who have posted reply messages to the at-hand user. For instance, the photographs might be employed in populating FOAF Group attribute, a FOAF depiction attribute, and a FOAF Image attribute, with the Group attribute specifying the group made up of users who have posted reply messages to the at-hand user, the Image attribute specifying the images of those users, and the FOAF depiction attribute being employed to relate those images to that group.

As yet another example where the at-hand network is a microblogging social network, the component may populate attributes using that of the normalized user profile data which corresponds to data implicitly provided by users other than the at-hand the user. As an example, as noted the at-hand user may post messages via the microblogging social network and other users may, via the microblogging social network, reply to those messages. As also noted, those other users may explicitly provide to the at-hand network photographs, and included along with the replies may be those photographs. The component may consider the at-hand user to know each of those users who have posted replies. The component might populate one or more attributes which convey that the at-hand user knows those other users. For instance, the component might set a FOAF knows attribute to relate the at-hand user to those other users.

Now discussed will be the circumstance wherein the at-hand network is a professional network which indicates, with regard to a given user thereof, information regarding current and/or past employment positions, educational accomplishments, penned publications, and/or business-centric social connections with other users. As one example where the at-hand network is a professional network, the component may populate attributes using that of the normalized user profile data which corresponds to data explicitly provided by the user. As an example, in creating an overview on the professional network the user might provide a link to his homepage at the website of the company for which he works, a photograph of himself, a link to a blog which he writes, indication of the company for which he works, his name, an indication of his city and/or metropolitan area of residence, and an indication of his account name for the professional network.

The homepage link might be employed by the attributized profile component as discussed hereinabove with respect to a microblogging social network (e.g., the link might be employed in populating a FOAF homepage attribute). The photograph might be employed by the component as discussed hereinabove with respect to a microblogging social network (e.g., the photograph might be employed in populating a FOAF img attribute and a FOAF Image attribute). The blog link might be employed by the component in populating one or more attributes which specify a blog of the at-hand user. For instance, the blog link might be employed in populating a FOAF weblog attribute. The account name might be employed by the component as discussed hereinabove with respect to a microblogging social network (e.g., the account name might be employed in populating a FOAF holdsAccount attribute, a FOAF OnlineAccount attribute, and a FOAF accountName attribute). The indication of the company for which the user works may be employed as discussed hereinabove with respect to a microblogging social network and the component determining the at-hand user to be following a user corresponding to an organization (e.g., the component may employ such company indication in populating a FOAF Organization attribute and a FOAF member attribute.

Moreover, the component might populate one or more attributes which specify the at-hand user to be the topic of the overview. For instance the component might set a FOAF isPrimaryTopicOf to indicate that the at-hand user is related to the overview such that the at-hand user is the primary topic of that overview. The provided name may be employed by the component as discussed hereinabove with respect to a microblogging social network (e.g., the name might be employed by the component in populating a FOAF name attribute, a FOAF surname attribute a FOAF family_name attribute, a FOAF givenname attribute, and/or a FOAF firstName attribute). The provided indication of the user's city and/or metropolitan area of residence may be employed as discussed hereinabove with respect to a microblogging social network (e.g., the city and/or metropolitan area of residence might be employed in populating a FOAF based_near attribute).

Further where the at-hand network is a professional network, in creating an experience section with respect to the professional network the user might provide indication of present and/or past held positions. The indication of a given position may set forth a link to a website for the relevant company and/or organization, and/or may set forth a link to a website describing the particular position. The provided position and website link information may be employed by the component in populating one or more attributes which regard present and/or past positions held by the user.

For example, such an indication of a present held position and a link to a corresponding company and/or organization website might be employed in populating a FOAF currentProject attribute and a FOAF workplaceHomepage attribute. As another example, such an indication of a present held position and a link to a website describing the position might be employed in populating a FOAF currentProject attribute and a FOAF workinfoHomepage attribute.

As yet another example, such an indication of a past held position and a link to a corresponding company and/or organization website might be employed in populating a FOAF pastProject attribute and a FOAF workplaceHomepage attribute. As an additional example, such an indication of a past held position and a link to a website describing the position might be employed in populating a FOAF pastProject attribute and a FOAF workinfoHomepage attribute.

Additionally where the at-hand network is a professional network, in creating an education section with respect to the professional network the user might provide indication of attended educational institutions. The indication of a given educational institution may set forth a link to a website for that educational institution. The provided educational institution and website link information may be employed by the component in populating one or more attributes which regard educational institutions attended by the user. For instance, such an indication of an attended educational institution and a link to a corresponding educational institution website might be employed in populating a FOAF schoolHomepage attribute.

Still further where the at-hand network is a professional network, in creating a publications section with respect to the professional network the user might provide indication of publications penned by the user. The indication of a given publication may set forth a link to that publication. The provided penned publication and link information may be employed by the component in populating one or more attributes which regard publications penned by the user. For instance, such an indication of a penned publication and a link to that publication might be employed in populating a FOAF made attribute and a FOAF publications attribute such that the made attribute is employed to convey that the user penned the publication specified by the publications attribute.

Moreover where the at-hand network is a professional network, in creating a skills section with respect to the professional network the user might provide indication of keywords regarding his skills. As an illustration, the user might specify skill keywords including "Internet Protocol (IP) telephones," "Multiprotocol Label Switching (MPLS)," and "Enhanced Interior Gateway Routing Protocol (EIGRP)."

As one example, the provided keywords may be employed by the component in populating one or more attributes which regard a theme characterizing the skillset of the user. For instance, such keywords might be employed in populating one or more FOAF theme attributes which relate the keywords to the user's skillset.

As another example, the provided keywords may be employed by the component in populating one or more attributes which specify the topic of the skills section. For instance, such keywords might be employed in populating one or more FOAF topic attributes which relate the keywords to the skills section.

Still further, in creating an additional information section with respect to the professional network the user might provide indication of groups and/or associations of which he is a member. Moreover, the user may provide images (e.g., logos) for one or more of those groups and/or associations. The component may employ the group and/or association indications as discussed hereinabove with respect to a microblogging social network so as to indicate the at-hand user to be a member of those groups and/or associations (e.g., a provided name of such a group and/or organization may be employed in populating a FOAF Organization attribute and a FOAF member attribute, with the FOAF Organization attribute specifying such name of the group and/or organization, and the FOAF member attribute relating the group and/or organization to the user). Alternately or additionally, the component may employ the images as discussed hereinabove with respect to a microblogging social network so as to indicate a image (e.g., a logo) for a listed group and/or association (e.g., a provided group and/or association name and a provided image may be employed in in populating FOAF Group attribute, a FOAF depiction attribute, and a FOAF Image attribute, with the Group attribute specifying the group and/or association name, the Image attribute specifying the corresponding group and/or association image (e.g., logo), and the FOAF depiction attribute being employed to relate the image to the group).

Now discussed will be the circumstance wherein the at-hand network is a software-centric network which allows users to collaboratively work on program code. As one example where the at-hand network is a software-centric network, the component may populate attributes using that of the normalized user profile data which corresponds to data explicitly provided by the user. For instance, in creating an overview on the software-centric network the user might provide a link to his homepage, his email address, a photograph of himself, a link to a blog which he writes, indication of the company for which he works, an indication of his the programming languages with which he has familiarity, an indication of his account name for the software-centric network, one or more organizations of which he is a member, his name, and an indication of his city and/or metropolitan area of residence.

The homepage link might be employed by the attributized profile component as discussed hereinabove (e.g., the link might be employed in populating a FOAF homepage attribute). The email address might be employed by the component in populating one or more attributes which specify an email address of the at-hand user. For instance, the email address might be employed in populating a FOAF mbox attribute. The photograph might be employed by the component as discussed hereinabove (e.g., the photograph might be employed in populating a FOAF img attribute and a FOAF Image attribute). The blog link might be employed as discussed hereinabove (e.g., the blog link might be employed in populating a FOAF weblog attribute).

The indication of the company for which the user works might be employed in populating an attribute which specifies the website of the company for which the user works. For instance, the company indication may be employed in populating a FOAF workplaceHomepage attribute. Where the overview specifies the website of the company for which the user works such may be directly applied in setting the company website attribute. Where the overview does not specify the company website the component might, for instance, access a search engine, provide the company name thereto, receive an indication of the company website in return, and employ that indication in setting the company website attribute.

The indication of the programming languages with which he has familiarity might be taken to be indicative of the user's position at the company at which he works, and might be employed in populating an attribute which specifies a website describing his position. For instance, the position indication might be employed in populating a FOAF workInfoHomepage attribute. The component might, for instance, access a search engine, provide the company name and the noted programming languages thereto, receive an indication of a positing-describing website in return, and employ that indication in setting the attribute.

The account name might be employed by the component as discussed hereinabove (e.g., the account name might be employed in populating a FOAF holdsAccount attribute, a FOAF OnlineAccount attribute, and a FOAF accountName attribute). The indication of one or more organizations of which the user is a member might be employed by the component in populating one or more attributes which specify the at-hand user to be a member of those organizations (e.g., with such an attribute setting forth that which such an indication of organizational membership indicates to be the name of the organization). For instance, the component may employ such name of the organization in populating a FOAF Organization attribute and a FOAF member attribute, with the FOAF Organization attribute specifying such name of the organization and the FOAF member attribute relating the organization to the user.

The provided name might be employed by the attributized profile component as discussed hereinabove (e.g., the name might be employed in populating a FOAF name attribute conveying both given name and family name, a FOAF surname attribute, a FOAF family_name attribute, a FOAF givenname attribute, and/or a FOAF firstName attribute). The provided indication of city and/or metropolitan area of residence might be employed by the attributized profile component as discussed hereinabove (e.g., city and/or metropolitan area of residence might be employed in populating a FOAF based_near attribute).

As a further example where the at-hand network is a software-centric network, a repositories contributed to section might list one or more names of repositories to which the user has contributed code. The attributized profile component may consider such a repository to be a group, and may consider the user to be a member of those repository groups to which he has contributed. As such, for each of these repository groups the component may populate an attribute which specifies the user to be a member of that group (e.g., with the attribute setting forth the listed the name of the repository group). For instance, the component may employ such repository group name in populating a FOAF Group attribute and a FOAF member attribute, with the FOAF Group attribute specifying such name of the repository group and the FOAF member attribute relating the repository group to the user.

As another example where the at-hand network is a software-centric network, there may be a repository section corresponding to a repository maintained by the user (e.g., a repository which is a fork of another repository). Included in such a repository section may be one or more words describing the repository (e.g., "Interactive debugging software"). The component may populate an attribute which specifies that repository description as the topic of the repository. For instance, a FOAF topic attribute might be set so as to indicate the repository description to be the topic of the repository section.

As yet another example where the at-hand network is a software-centric network, there may be a bio section in which the user has placed one or more URLs. For such a URL, the component might set an interest attribute to convey the URL as being of interest to the use. For instance, a FOAF interest attribute might be set to relate, to the user, that URL.

As a further example where the at-hand network is a software-centric network, the user may (e.g., in a bio section) indicate whether or not he is seeking a job. Further, a repositories member of section might list one or more names of repositories of which the user is a member. Additionally, as noted, a repositories contributed to section might list one or more names of repositories to which the user has contributed code. The component might consider such job-seeking indication, such repository memberships, and/or such repository contributions to be themes of the user. As such, the component may employ the job seeking status, the names of the repositories of which he is a member, and the names of the repositories to which he contributes in specifying one or more theme attributes. For instance, a FOAF Theme attribute might be set, with relation to the user, to convey the job seeking status (e.g., as a Boolean), to convey the repositories of which he is a member (e.g., as strings corresponding to the repository names), and/or to convey the repositories to which he contributes (e.g., as strings corresponding to the repository names)

As another example where the at-hand network is a software-centric network, a contributions section may indicate the quantity of code contributions made by the user (e.g., within a certain period of time). The component may employ a made attribute in order to indicate that those contributions were made by the user. For instance, a FOAF made attribute might be set, with relation to the user, to specify those contributions (e.g., with the contributions being set forth as the relevant numerical quantity or via a link to the contributions section).

Discussed hereinabove in connection with blocks 309 and 311 is the employment of implicitly provided data. Further information regarding approaches for yielding such implicit data will now be discussed. It is noted that the employ of implicit data in the population of attributized profile attributes might be referred to as profile enrichment.

As one example, such yielding of implicit data might involve applying data mining, user habit analysis, and/or insight extraction techniques to social network data so as to yield the implicit data. Such social network data may include service data (e.g., data submitted by users when signing up with a social network such as name, location, and/or age), disclosed data (e.g., information—such as messages and images—which one posts to his own profile), entrusted data (e.g., information—such as messages and images—which one posts to the profiles of other users), incidental data (e.g., data regarding a given user—such as messages regarding that given user and/or images depicting that given user—which are posted by other users), behavioral data (e.g., historical data regarding a user's actions when employing a social network), derived data (e.g., data produced based on the analysis of various social network data), and/or explicit data (e.g., of the sort discussed hereinabove).

Another example of the yielding of implicit data will now be discussed in connection with FIG. 4. FIG. 4 shows a further logic flow diagram illustrating embodiments of an attributized profile component for Abound. This component may execute on Abound server 101 and/or on another computer. The component functionality discussed in connection with FIG. 4 operates, for example in connection with block 309 and/or block 311. As depicted in FIG. 4, the attributized profile component performs blocks 403 and 405 with respect to a particular non-mapping-target attributized profile attribute, and may then repeat blocks 403 and 405 with respect to a different non-mapping-target attributized profile attribute.

At block 401 the component may determine attributized profile attributes which are the target of no mappings. As noted, the data normalizer component may set forth indication of such instances of being the target of no mappings. The attributized profile component may take such indications into account when performing block 401.

At block 403 the component may, with respect to an under-consideration one of those non-mapping-target attributized profile attributes found in block 401, look for related normalized profile data tags and/or normalized linked data tags. With reference to that which is discussed hereinabove in connection with FIG. 3, in so doing the component may access one or more applicable schemas, may take into account attribute name-tag name similarity, and may take into account associated data similarity.

At block 405 the component may analyze related normalized profile data tags and/or normalized linked data tags found via block 403 in order to yield population of the under-consideration non-mapping-target attributized profile attribute. The component may check which profile attributes are empty (no values) and which profile's attributes have explicit data For example, based on the available explicit data, the component may try to infer values to fill the empty attributes, e.g., proposing different solutions to implicitly infer the values of attributes such as location, skills, interests, school. For instance, the component might find that data associated with such a related tag can be employed to populate the under-consideration non-mapping-target attributized profile attribute. As one illustration, with reference to that which is discussed hereinabove in connection with FIG. 3 where the data associated with the related tag is a string setting forth a corporation name and population of the under-consideration non-mapping-target attributized profile attribute calls for the URL of that corporation, the corporation name may be fed to a search engine or other source in order to receive the corresponding URL.

As noted hereinabove, the component may perform blocks 403 and 405 with respect to a particular non-mapping-target attributized profile attribute, and may then repeat blocks 403 and 405 with respect to a different non-mapping-target attributized profile attribute. In keeping with this at block 407 the component may determine whether or not there is call for such repeating. Where there is such call the component may return to block 403 with respect to the called-for non-mapping-target attributized profile attribute. Where there is not such call the component may end execution at block 409.

FIG. 5 shows a logic flow diagram illustrating embodiments of a complexity reduction component for Abound. This component may execute on Abound server 101 and/or on another computer. The component starts by being instantiated, for example in connection with the attributized profile component having completed performance of attributized profile creation.

As depicted in FIG. 5, the complexity reduction component performs blocks 501 and 503 with respect to a particular user and a particular social network, and may then repeat blocks 501 and 503 with respect to a different user and/or a different social network. For the case of n users and m social networks, the component may appropriately repeat blocks 501 and 503 such that blocks 501 and 503 are performed for each of the n users with respect to each of the m social networks. At block 501 the component may dispatch a complexity reduction support request to database 119 requesting, for the at-hand user with respect to the at-hand network, the attributized profile. At block 503 the component may receive a corresponding response from the database. As noted, for the case of n users and social networks the components may appropriately repeat blocks 501 and 503. In keeping with this at block 505 the component may determine whether or not there is call for such repeating. Where there is such call the component may return to block 501 with respect to the called-for user and network. Where there is not such call the component may proceed to block 507. Entering block 507 the component may, for each of the social networks, have access to the attributized profile for each of the users of that network (e.g., the totality of attributized profiles across the n users and m social networks).

As depicted in FIG. 5, the component may perform block 507 with respect to a particular complexity reduction approach and may then repeat block 507 with respect to a different complexity reduction approach. For the case of c complexity reduction approaches the component may appropriately repeat block 507 such that block 507 is performed with respect to each of the c complexity reduction approaches.

At block 507 the component may apply the at-hand one of the c complexity reduction approaches to the totality of attributized profiles across all users and all networks. The result of such application may be one or more complexity reduction factors (e.g., blocking keys) which can be employed in organizing the attributized user profiles across the multiple social networks into groups, where the attributized profiles of a given group are—in the view of the applied complexity reduction approach—similar to one another.

As an illustration, suppose that there are two social networks each having attributized user profiles. Suppose further that each attributized user profile has a user identifier number attribute, a first name attribute, a last name attribute, a gender attribute, an occupation attribute, and a postal code attribute. Suppose further that the attributized user profiles across the two networks are as follows:

Social Network A:

| ID | FirstName | LastName | Gender | Occupation | Postcode |
|---|---|---|---|---|---|
| 1 | Joe | Miller | Male | Engineer | 2100 |
| 2 | Jane | Lee | Female | Researcher | 2200 |
| 3 | Alexander | William | Male | Actor | 2300 |
| 4 | Alice | Jones | Female | Developer | 2300 |

Social Network B:

| ID | FirstName | LastName | Gender | Occupation | Postcode |
|---|---|---|---|---|---|
| 1 | Joseph | Miller | Male | Engineer | 2100 |
| 2 | J. | Lee | Female | Researcher | 2200 |
| 3 | Joe | Miller | Male | Developer | 2200 |
| 4 | Alexandre | William | Male | Artist | 2300 |
| 5 | Tim | Jones | Male | Developer | 2300 |

A given complexity reduction approach might, in view of the particularities of the attributized user profiles across the two networks, output the complexity reduction factor (e.g., blocking key) to be the "Postcode" attribute. So doing, the complexity reduction approach would convey that grouping the attributized user profiles according to postcode would serve to have those attributized user profiles of a given group to be similar to one another.

As such, for the above-listed attributized user profiles of Social Network A and Social Network B, the attributized user profiles would be arranged into three groups: a group corresponding to postcode "2100," a group corresponding to postcode "2200," and a group corresponding to postcode "2300." The "2100" group would include Joe Miller of Social Network A and Joseph Miller of Social Network B. The "2200" group would include "Jane Lee" of Social Network A, and J. Lee and Joe Miller of Social Network B. The "2300" group would include Alexander William and Alice Jones of Social Network A, and Alexandre William and Tim Jones of Social Network B. The attributized user profiles of the "2100" group would, in the view of the applied complexity reduction approach, be similar to one another. The attributized user profiles of the "2200" group would, in the view of the applied complexity reduction approach, be similar to one another. The attributized user profiles of the "2300" group would, in the view of the applied complexity reduction approach, be similar to one another.

A number of complexity reduction approaches could be available to the component for employ. As one example, an available complexity reduction approach may be the application of a sequential covering algorithm (e.g., one which, in the pursuit of rules for classifying attributized user profiles into groups, yields one or more complexity reduction factors of the sort discussed hereinabove). As another example, an available complexity reduction approach may be one which endeavors to find one or more complexity reduction factors (e.g., blocking keys) which allow for the attributized user profiles to be organized into self-similar groups, where the groupings allow for different groups to be discriminated from one another, and where the groupings seek to provide coverage of attributized user profile diversity.

As another example, a complexity reduction approach available to the component for employ may be one which, in seeking complexity reduction factors (e.g., blocking keys) applies attribute clustering blocking (e.g., including assigning attributes with similar values into non-overlapping groups) and/or comparison scheduling (e.g., including choosing an order for comparison processing which allows for duplicates to be detected early). As a further example, a complexity reduction approach available to the component for employ may be one which, in seeking complexity reduction factors (e.g., blocking keys) applies sorted neighbors processing (e.g., including sorting attributized user profiles according to a generated string which is made up of portions of user profile attributes, sequentially moving a window over the sorted attributized user profiles, and considering those pairs ensnared within such a window to be potential members of a self-similar group of the sort discussed).

As yet another example, a complexity reduction approach available to the component for employ may be one which, in seeking complexity reduction factors (e.g., blocking keys) employs heuristic approaches (e.g., one which trades accuracy of complexity reduction factor choice—say accuracy with respect to discriminability and/or coverage—for speed).

After performing block 507 the component proceeds to block 509. As noted, in case of c complexity reduction approaches the component may appropriately repeat block 507. In keeping with this at block 509 the component may determine whether or not there is call for such repeating. Where there is such call the component may return to block 507 with respect to the called-for complexity reduction approach. Where there is not such call, the component may proceed to block 511.

Entering block 511, the component is in possession of one or more complexity reduction factors which were yielded by one or more performances of block 507. At block 511 the component may select the complexity reduction approach whose one or more complexity reductions factors will be employed. As an illustration, suppose that the application of a first complexity reduction approach yielded a first complexity reduction factor (e.g., a blocking key) and that a second complexity reduction approach yielded a second complexity reduction factor (e.g., a blocking key). At block 511 the component would select between the first complexity reduction factor and the second complexity reduction factor.

A number of approaches might be employed in performing the selection of block 511. For instance, the component might select some or all of the attributized user profiles across some or all of the multiple social networks and apply, in turn, the complexity reduction factor output of each applied complexity reduction approach. As such, for example, the component might apply, in turn, a first complexity reduction factor yielded by a first complexity reduction approach and then a second complexity reduction factor (e.g., a blocking key) yielded by a second complexity reduction approach.

With such complexity reduction factor application the component might, when applying a particular complexity reduction factor, note the number of self-similar groups into which attributized user profiles are placed, and select from among the applied complexity reduction factors the one causing placement into the largest number of self-similar groups. As an illustration, suppose that application of a first complexity reduction factor yielded by a first complexity reduction approach caused the attributized user profiles to be placed into three self-similar groups and that application of a second complexity reduction factor yielded by a second complexity reduction approach caused the attributized user profiles to be placed into five self-similar groups. The component might select the second complexity reduction factor due to five being a greater number of self-similar groups than three.

At block 513 the component may dispatch a complexity reduction factor storage request to the database 119. The storage request may cause the database to store the one or more complexity reduction factors selected via block 511.

FIG. 6 shows a logic flow diagram illustrating embodiments of a weighting component for Abound. This component may execute on Abound server 101 and/or on another computer. The component starts by being instantiated, for example in connection with the attributized profile component and/or complexity reduction having completed performance of respective operations.

As depicted in FIG. 6, the weighting component performs blocks 601-617 with respect to a particular social network pair, and may then repeat blocks 601-617 with respect to a different social network pair. For the case of p social network pairs, the component may appropriately repeat blocks 601-617 such that blocks 601-617 are performed for each of the p social network pairs.

Social network pairs may be such that a pair is made up of two different social networks irrespective of the order of those networks (e.g., a single social network pair would arise from Social Network A and Social Network B). As an illustration, where the extant social networks were the social networks SN1, SN2, and SN3, the social network pairs arising therefrom would be (SN1, SN2), (SN1, SN3), and (SN2, SN3).

Available to the component (e.g., via database 119) may be known-identical-user couplets. Such a known-identical-user couplet may be an attributized user profile for a first social network and an attributized user profile for a second social network which are known to correspond to the same physical user. Such known-identical-user couplets may be produced via automated analysis and/or user input.

At block 601 the weighting component may dispatch an attribute weighting support request to database 119 requesting, for the at-hand social network pair, known-identical-user couplets. At block 603 the component may receive a corresponding response from the database.

At block 605 the component may calculate attribute-wise similarity values for an at-hand one of the known-identical-user couplets.

As an illustration, suppose that each of the attributized user profiles making up the couplet included a name attribute (e.g., a FOAF name attribute), a homepage attribute (e.g., a FOAF homepage attribute), and an image attribute (e.g., a FOAF Image attribute). Suppose further that these attributes were populated with values (e.g., with one of attributized user profiles making up the couplet populating the name attribute with "John Smith" and the other of the attributized user profiles making up the couplet populating the name attribute with "Jonny Smith"). In performing block 605 the component might calculate the similarity between the populated value for the name attribute in the first attributized user profile and the populated value for the name attribute in the second attributized user profile (e.g., calculating similarity between the string "John Smith" and the string "Jonny Smith"). Further in performing block 605 the component might calculate the similarity between the populated value for the homepage attribute in the first attributized user profile and the populated value for the homepage attribute in the second attributized user profile (e.g., calculating similarity between the string "www.johnsmith.com" and the string "www.johnsmith.com"). Still further in performing block 605 the component might calculate the similarity between the populated value for the image attribute in the first attributized user profile and the populated value for the image attribute in the second attributized user profile (e.g., calculating similarity between the jpeg data corresponding to "john.jpg" and the jpeg data corresponding to "me.jpg"). Calculating the similarity between the two populated values for the name attribute the component might find a value of 0.7 (e.g., conveying 70% similarity). Calculating the similarity between the two populated values for the homepage attribute the component might find a value of 0.8 (e.g., conveying 80% similarity). Calculating the similarity between the two populated values for the image attribute the component might find a value of 0.6 (e.g., conveying 60% similarity).

Attribute-wise similarity may be calculated in a number of ways. As one example syntactic approaches could be employed. Such syntactic approaches might include ones—such as string matching techniques—which take into account the explicit similarities between inputted data items. As another example semantic approaches could be employed in calculating attribute-wise similarity. Such semantic approaches might include ones which take into account the similarities in terms of meaning between inputted data items. As one illustration, a syntactic approach might find low similarity between the string "computer" and the string "pc" while a semantic approach might find high similarity between these two strings.

Examples of syntactic approaches include SoftTFIDF (wherein TFIDF stands for "term frequency-inverse document frequency"), Jaro, and Edit-Distance. Examples of semantic approaches include Explicit Semantic Analysis (ESA), and/or ones leveraging knowledge resources (e.g., Wikipedia and/or book archives) and/or taxonomies (e.g., the North American Industry Classification System (NAICS)) in determining similarities in terms of meaning.

The semantic approaches (e.g., ESA) might be applied, for instance, when calculating value similarities with respect to attributes deemed to be semantically-oriented. The syntactic approaches might be applied, for instance, when calculating value similarities with respect to attributes deemed to regard senseless multi-term values, attributes deemed to regard senseless one-term values, attributes deemed to regard URL values and/or URI values, and/or attributes deemed to regard numeric values. In particular, SoftTFIDF might be applied with respect to attributes deemed to regard senseless multi-term values, Jaro might be applied with respect to attributes deemed to regard senseless one-term values, and/or Edit-Distance might be employed with respect to attributes deemed to regard URL values and/or URI values, and/or attributes deemed to regard numeric values.

Providing examples, such attributes deemed to be semantically-orientated might include attributes conveying depiction (e.g., the FOAF depiction attribute), attributes conveying a thing or topic to be of interest to a person (e.g., the FOAF topic_interest attribute), and/or attributes conveying a document (e.g., as specified by a URL) to be of interest to a person (e.g., a FOAF interest attribute).

As examples, such attributes deemed to regard senseless multi-term values might include attributes conveying name (e.g., the FOAF name attribute) and attributes conveying spatial proximity (e.g., the FOAF based_near attribute). As further examples such attributes deemed to regard senseless one-term values might include attributes conveying nickname (e.g., the FOAF nick attribute), attributes conveying honorifics such as Mr., Ms., and Dr. (e.g., the FOAF title attribute), attributes conveying surname (e.g., the FOAF surname attribute), attributes conveying family name (e.g., the FOAF family_name attribute), attributes conveying given name (e.g., the FOAF givenname attribute), attributes conveying first name (e.g., the FOAF firstName attribute), attributes conveying technical expertise (e.g., the FOAF geekcode attribute), attributes conveying personality type (e.g., the FOAF myersBriggs attribute), attributes conveying DNA information (e.g., the FOAF dnaChecksum attribute), attributes conveying account name (e.g., the FOAF account-Name attribute), and/or attributes conveying online chat identifier (e.g., the FOAF icqChatID, msnChatID, aimChatID, jabberID, and/or yahooChatID attributes).

As additional examples, such attributes deemed to regard URL values, URI values, and/or numeric values might include attributes conveying groups (e.g., the FOAF Group attribute), attributes conveying that a person or other entity is a member of a group (e.g., the FOAF member attribute), attributes conveying funding (e.g., the FOAF fundedBy attribute), attributes conveying telephone number (e.g., the FOAF phone attribute), attributes conveying theme (e.g., the FOAF theme attribute), attributes conveying topic (e.g., the FOAF topic attribute), attributes corresponding to a document (e.g., the FOAF Document attribute), attributes corresponding to an image (e.g., the FOAF Image attribute), attributes conveying primary topic (e.g., the FOAF primaryTopic attribute), attributes conveying mechanism for providing reward (e.g., the FOAF tipjar attribute), attributes conveying creatorship (e.g., the FOAF made attribute), attributes corresponding to a thumbnail image (e.g., the FOAF thumbnail attribute), attributes conveying logo (e.g., the FOAF logo attribute), attributes conveying service provider homepage (e.g., the FOAF accountServiceHomepage attribute), attributes corresponding to an organization (e.g., the FOAF Organization attribute), attributes conveying homepage (e.g., the FOAF homepage attribute), attributes conveying email address (e.g., the FOAF mbox attribute), attributes conveying hash checksum (e.g., the FOAF mbox_shal sum attribute), attributes specifying an image to depict a person (e.g., the FOAF img attribute), attributes conveying a blog (e.g., the FOAF weblog attribute), attributes conveying a thing or topic to be of interest to a person (e.g., the FOAF topic_interest attribute), attributes conveying a project presently being worked on by a person (e.g., a FOAF currentProject attribute), attributes conveying a project previously worked on by a person (e.g., a FOAF pastProject attribute), attributes conveying a webpage which conveys the workplace of a person (e.g., a FOAF workplaceHomepage attribute), attributes conveying a webpage which describes a person's work position (e.g., a FOAF workinfoHomepage attribute), attributes conveying a webpage which conveys the a school attended by a person (e.g., a FOAF schoolHomepage attribute), attributes specifying an publication penned by a person (e.g., the FOAF publications attribute), and/or attributes specifying an online account to correspond to a person (e.g., the FOAF holdsAccount attribute).

Returning to the example of calculating attribute-wise similarity values for the discussed known-identical-user couplet in which the attributes were the name attribute (e.g., the FOAF name attribute), the homepage attribute (e.g., the FOAF homepage attribute), and the image attribute (e.g., the FOAF Image attribute), and with an eye towards the foregoing discussion of approaches for calculating attribute-wise similarity, the name attribute might be deemed to regard senseless multi-term values and, as such, SoftTFIDF might be employed. Further, the homepage attribute might be deemed to regard URL values and/or URI values and, as such, Edit-Distance might be employed. Moreover, the image attribute might be deemed to regard URL values and/or URI values—or numeric values—and, as such, Edit-Distance might be employed.

Departing block 605, the component may have calculated attribute-wise similarity values for an at-hand one of the known-identical-user couplets (e.g., finding a value of 0.7 with regard to a name attribute, finding a value of 0.8 with regard to a homepage attribute, and finding a value of 0.6 with regard to an image attribute). As depicted in FIG. 6, the component performs block 605 with respect to an at-hand one of the known-identical-user-couplets for the at-hand social network pair, and then may repeat block 605 with respect to a different one of the known-identical-user-couplets for the at-hand social network pair. For the case of d known-identical-user-couplets for the at-hand social network pair, the component may appropriately repeat block 605 such that block 605 is performed for each of the d known-identical-user-couplets. In keeping with this at block 607 the component may determine whether or not there is call for such repeating. Where there is such call the component may return to block 605 with respect to the called-for known-identical-user-couplet for the at-hand social network pair. Where there is not such call the component may proceed to block 609.

At block 609 the component may formulate a characteristic attribute-wise similarity value set for the at-hand social network pair. Via performance of block 605 with respect to each of multiple known-identical-user couplets for the at-hand social network pair, the component may have, for each of these couplets, calculated attribute-wise similarity values. Illustratively, for the case of three such known-identical-user couplets—where the couplets include a name attribute, a homepage attribute, and an image attribute—the attribute-wise similarity value calculation by the component may yield the following results.

For the first of the three couplets, a value of 0.7 with regard to a name attribute, a value of 0.8 with regard to a homepage attribute, and a value of 0.6 with regard to an image attribute. For the second of the three couplets, a value of 0.85 with regard to a name attribute, a value of 0.7 with regard to a homepage attribute, and a value of 0.7 with regard to an image attribute. For the third of the three couplets, a value of 0.9 with regard to a name attribute, a value of 0.7 with regard to a homepage attribute, and a value of 0.9 with regard to an image attribute.

In formulating the characteristic attribute-wise similarity value set, the component may, with respect to each attribute included in couplet, access the calculated similarity values therefor across the at-hand couplets.

Illustratively and returning to the above example, for the name attribute the component might access 0.7 corresponding to the first couplet, 0.85 corresponding to the second couplet, and 0.9 corresponding to the third couplet. For the homepage attribute the component might access 0.8 corresponding to the first couplet, 0.7 corresponding to the second couplet, and 0.7 corresponding to the third couplet. For the image attribute the component might access 0.6 corresponding to the first couplet, 0.7 corresponding to the second couplet, and 0.9 corresponding to the third couplet.

The component may then apply a characterization and/or aggregation function (e.g., average) to each such cross-couplet attribute wise value group. The component may then consider the characteristic attribute-wise similarity value set to include each such result in a fashion linked to the corresponding attribute.

Illustratively and returning to the example, the first cross-couplet attribute wise value group could correspond to the name attribute and include the values 0.7, 0.85, and 0.9. the second cross-couplet attribute wise value group could correspond to the homepage attribute and include the values 0.8, 0.7, and 0.7. The third cross-couplet attribute wise value group could correspond to the image attribute and include the values 0.7, 0.7, and 0.9. Where the applied characterization and/or aggregation function is average, application to the first, name-attribute-corresponding cross-couplet attribute wise value group could yield a value of 0.82 due to 0.82 being the average of 0.7, 0.85, and 0.9. Application to the second, homepage-attribute-corresponding cross-couplet attribute wise value group could yield a value of 0.73 due to 0.73 being the average of 0.8, 0.7, and 0.7. Application to the third, image-attribute-corresponding cross-couplet attribute wise value group could yield a value of 0.77 due to 0.77 being the average of 0.7, 0.7, and 0.9.

As noted, the component may consider a characteristic attribute-wise similarity value set to include each characterization and/or aggregation function result in a fashion linked to the corresponding attribute. As such, for the above example the characteristic attribute-wise similarity value set could set forth 0.82 for the name attribute, 0.73 for the homepage attribute, and 0.77 for the image attribute.

Exiting block 609 the component will have the characteristic attribute-wise similarity value set for the at-hand social network pair. The component may then proceed to block 611.

Blocks 611-625 will now be discussed. Arising from multiple known-identical-user couplets across the at-hand social network pair and giving attribute-wise similarity values, the characteristic attribute-wise similarity value set for the at-hand social network pair yielded by block 609 is indicative of the attribute-wise similarity values which tend to arise when there is an attribute-wise similarity comparison done between a user's attributeized user profile for one social network of the at-hand social network pair and that same user's attributized user profile for the other social network of the at-hand social network pair. Returning to the above-discussed example characteristic attribute-wise similarity value set, there is indication that an attribute-wise similarity comparison done between a user's attributized user profile for one social network of the at-hand social network pair and that same user's attributized user profile for the other social network of the at-hand social network pair is expected to be on order of 82% similar with respect to the name attribute, on order of 73% similar with respect to the homepage attribute, and on order of 77% similar with respect to the image attribute.

Via blocks 611-615, automated weighting may be based on a set of profiles that Abound already knows that they refer to the same physical users. As such, each pair of these profiles may be processed in order to extract the similarity score of each attributes. For example, sn1.profile1 vs. sn2.profile5 are processed and the similarity value of each attribute (first name, last name, homepage, etc.) are extracted. Afterwards, the aggregated value of each attribute is computed from the similarity values obtained from each compared pair.

Also via blocks 611-615, the characteristic attribute-wise similarity value set yielded by block 609 is employed in selecting per attribute weights which will cause a decision making function, when fed the characteristic attribute-wise similarity value set, to convey an answer of sameness. Attributes weighting may be flexible since it can reflect the weights between each pair of a social network. Subsequently, a first name weight can be different for the source pair (sn1-sn2) and for the source pair (sn1-sn5). For example, this may depend and vary based on the data/characteristic of each social network.

Because the per-attribute weights were chosen to yield an answer of sameness for the characteristic attribute-wise similarity value set—the characteristic attribute-wise similarity value set arising from known-same-user couplets across the at-hand social network pair—going forward it can be expected that should there be taking of an attributized user profile for one social network of the at-hand pair and an attributized user profile for the other social network of the at-hand pair, subjecting of them to attribute-wise similarity value calculation, applying those per attribute weights thereto, and applying the decision making function, the decision making function will indicate sameness where the two attributized user profiles correspond to the same person and that the decision making function will indicate lack of sameness where the two attributized user profiles correspond to different people. It is noted that the per-attribute weights selected are considered applicable to the at-hand social network pair but perhaps inapplicable to other social network pairs.

When initially performing block 611 with respect to the at-hand characteristic attribute-wise similarity value set, the component may set each per-attribute weight to 1.0. The component may then feed the weighted members of the characteristic attribute-wise similarity value set to the decision making function 612. Returning to the above-discussed example characteristic attribute-wise similarity value set 611, the attribute weight for the name attribute could bet set to 1.0, the attribute weight for the homepage attribute could be set to 1.0, and the attribute weight for the image attribute could be set to 1.0. Further according to the example, fed to the decision making function could be 0.82 (reflecting the discussed 0.82 name similarity value of the set with the 1.0 weighting applied), 0.73 (reflecting the discussed 0.73 homepage similarity with the 1.0 weighting applied), and 0.77 (reflecting the discussed 0.77 image similarity with the 1.0 weighting applied).

At block 613, the output of the 1.0-weight feeding of the decision making function could be checked to see whether or not sameness had been indicated. In the case where sameness was indicated, the set 1.0 per-attribute weights could be accepted as the per-attribute weights for the at-hand social network pair and the component could proceed to block 617. In the case where the decision making function did not indicate sameness, flow could proceed to block 615 where new per-attribute weights could be selected. Flow could then return to block 611 where the component could act in a manner analogous to that discussed hereinabove with respect to 1.0 per-attribute weights, but instead with the per-attribute weights set in accordance with the selection of block 615.

As such, via one or more performances of blocks 611-615 the component could select per-attribute weights for the at-hand social network pair. With reference to that which is discussed hereinabove, it is noted that it could be expected that should there be taking of an attributized user profile for one social network of the at-hand social network pair and an attributized user profile for the other social network of the at-hand pair, subjecting of those attributized user profiles to attribute-wise similarity value calculation, application thereto of the per-attribute weights selected via blocks 611-615, and application to the decision making function that the decision making function will indicate sameness where the two attributized user profile correspond to the same person and that the decision making function will indicate lack of sameness where the two attributized user profiles correspond to different people.

Now discussed in greater detail will firstly be the new per-attribute weight selection of block 615, and secondly be the decision making function. Turning to the new per-attribute weight selection of block 615, as one example a random selection approach could be employed in which the component randomly selected the per attribute weights. Such random selection could be constrained so that no weighted member of the characteristic attribute-wise similarity value set would have a value less than zero or greater than 1.0 (e.g., the discussed 0.73 homepage similarity with weighting applied would fall within the range of 0-1.0). Due to the cycle-capable nature of blocks 611-613, such a random selection approach could be expected to ultimately result in a selection of weights which would cause block 613 to resolve in the affirmative and for flow to proceed to block 617.

As another example, where the decision making function conveys sameness or lack of sameness by outputting a compound similarity value which is compared to a threshold (e.g., a threshold set by a system administrator during a configuration operation), one or more of the per-attribute weights might be selected so that one or more of the weighted members of the characteristic attribute-wise similarity value set would be equal to the threshold value. As an illustration, assuming a threshold value of 0.75 and returning to the above example where the characteristic attribute-wise similarity value set contains 0.82 for the name attribute, 0.73 for the homepage attribute, and 0.77 for the image attribute, the weight for the name attribute could be 0.91, the weight for the homepage attribute could be 1.03, and the weight for the image attribute could be 0.97.

As a further example, expert input and/or automated processing (e.g., machine learning, data mining, and/or uncertainty reduction processing) might be employed in order to recognize attribute importance on a per-social network and/or per-social network pair basis. The component might raise weights corresponding to attributes found to have greater importance and/or might lower weights corresponding to attributes found to have lower importance. As an illustration, suppose that by such expert input and/or automated processing it was known that at least one of the social networks of the at-hand social network pair was one for which a telephone number attribute reflected a telephone number that had been confirmed (e.g., via telephone company confirmation) to be accurate for the user. In view of this the component might raise the weight corresponding to the telephone number attribute. Accordingly, for instance, with such higher weighting a given degree of similarity with respect to the telephone number attribute would be more likely to lead to the decision making function conveying sameness.

Turning to the decision making function, the decision making function might take as input one or more similarity values (e.g., similarity values to which per-attribute weighting has been applied) and output a single compound similarity value. That compound similarity value might then be compared to a threshold value (e.g., a threshold set by a system administrator during a configuration operation). As one example the threshold value might be 0.75. Where the compound similarity value meets or exceeds the threshold, the decision making function may be considered to have indicated an answer of sameness. Where the compound similarity value falls beneath the threshold, the decision making function may be considered to have indicated an answer of lack of sameness.

A variety of different decision making functions could be employed. As examples, the employed decision making function could be an average-based decision making function, a Bayesian network-based decision making function (e.g., one encoding a joint probability over a set of values defined by a chain of rule), a mathematical theory of evidence-based decision making function (e.g., one employing a Dempster and Shafer function and/or one calculating event probability in view of a set of evidences), a supervised machine learning-based decision making function (e.g., one in which classification rules are inferred, one employing decision trees, and/or one employing fuzzy decision trees), and an association rule mining (ARM)-based decision making function (e.g., one employing interestingness measures), As referenced hereinabove, block 617 is entered in the case where attempted per-attribute weights, having caused the decision making function to indicate sameness, are accepted as the per-attribute weights for the at-hand social network pair. At block 618 the component may dispatch an attribute weighting storage request to database 119. The storage request may cause the database to store the accepted per-attribute weights for the at-hand social network pair. The component may then proceed to block 619.

As noted hereinabove, for the case of p social network pairs the component may appropriately repeat blocks 601-617 such that blocks 601-617 are performed for each of the p social network pairs. In keeping with this at block 619 the component may determine whether or not there is call for such repeating. Where there is such call the component may return to block 601 with respect to the called-for social network pair. Where there is not such call the component may end execution at block 621.

As an alternative to and/or in addition to the discussed automated selection of per-attribute weights (e.g., ones considered applicable to a certain social network pair but perhaps inapplicable to other social network pairs), per-attribute weights might be explicitly specifiable. As one example, such explicit specification of per-attribute weights might be performed by a system administrator and/or by an expert (e.g., a social network expert). As another example, such explicit specification of per-attribute weights might be performed by an individual and/or entity (e.g., a human resources department of a company) employing Abound in seeking potential job candidates.

As an illustration, such an entity employing Abound in seeking potential job candidates might consider an attribute conveying technical expertise (e.g., the FOAF geekcode attribute) to be of particular import. As such, the entity might specify a particular weight for this attribute (e.g., one corresponding to a particular social network and/or one applicable to all social networks) and/or might specify that this attribute (e.g., in connection with a particular social network and/or in connection with all social networks) receive a higher weighting (e.g., with the entity perhaps specifying a degree of increase—say as a percentage). With such higher weighting a given degree of similarity with respect to the technical expertise attribute would be more likely to lead to the decision making function conveying sameness. It is noted that a weight specification provided by a particular entity (e.g., a particular human resources department) might only be employed in connection with that entity (e.g., a weight specification provided by a particular human resources department might only be applied in connection with candidate searches performed by that human resources department).

As one example, explicitly specified attributes might be applied in lieu of automatically selected of per-attribute weights. As another example explicitly specified attributes might be applied in combination with automatically selected per-attribute weights. As an illustration, suppose that for a certain social network pair the automatically-selected weight for a name attribute was 0.91, but that a weighting of 0.75 was explicitly specified for this attribute and network pair. In the case of in-lieu of application, 0.75 might be employed in place of 0.91. In the case of in-combination-with application, 0.75 might be applied in connection with 0.91 (e.g., by employing as the weight 0.68—the product of 0.75 and 0.91).

FIG. 7 shows a logic flow diagram illustrating embodiments of a matching component for Abound. This component may execute on Abound server 101 and/or on another computer. The component starts by being instantiated, for example in connection with the weighting component having completed performance of attribute weighting.

As depicted in FIG. 7, the matching component performs blocks 701-721 with respect to a particular social network pair, and may then repeat blocks 701-721 with respect to a different social network pair. For the case of p social network pairs, the component may appropriately repeat blocks 701-721 such that blocks 701-721 are performed for each of the p social network pairs. With reference to that which is discussed in connection with FIG. 6, it is noted that social network pairs may be such that a pair is made up of two different social networks irrespective of the order of those networks (e.g., a single social network pair would arise from Social Network A and Social Network B).

At block 701 the matching component may dispatch a profile matching support request to database 119 requesting, for the at-hand social network pair, the attributized user profiles for each of the social networks thereof (e.g., where the at-hand social network pair is SN1, SN2, the request could seek the attributized user profiles for SN1 and the attributized user profiles for SN2). At block 703 the component may receive a corresponding response from the database.

At block 705 the component may, in the case where one or more complexity reduction factors (e.g., blocking keys) were yielded by the operation of the complexity reduction component action discussed hereinabove in connection with FIG. 5, apply those complexity reduction factors so as place the attributized user profiles for the at-hand social network pair into one or more buckets. As an illustration and with reference to the example discussed in connection with FIG. 5, in the case of the complexity reduction factor (e.g., blocking key) being a "Postcode" attribute, the attributized user profiles of the at-hand social network pair could be arranged into three buckets: a bucket corresponding to postcode "2100," a bucket corresponding to postcode "2200," and a bucket corresponding to postcode "2300." It is noted that under a circumstance where placement into multiple buckets is not possible (e.g., where no complexity reduction factors were produced by the action of the complexity reduction component), there may be considered to exist a single bucket which holds the totality of the attributized user profiles of the at-hand social network pair.

As depicted in FIG. 7, the matching component may perform blocks 707-719 with respect to a particular bucket of the at-hand social network pair, and may then repeat blocks 707-719 with respect to a different bucket of the at-hand social network pair. For the case of b buckets within the at-hand social network pair, the component may appropriately repeat blocks 707-719 such that blocks 707-719 are performed for each of the b buckets.

At block 707 the matching component may attempt, with respect to the at-hand bucket of the at-hand social network pair, to employ transitivity in order to remove one or more attributized user profiles from the at-hand bucket, and/or to declare one or more matches in which one attributized user profile within one social network of the at-hand social network pair corresponds to the same person as an attributized user profile within the other social network of the at-hand social network pair. It is noted that transitivity corresponds to a property by which, for instance, in the case of three entities L, T, and G—and the knowledge that L is equivalent to T and that T is equivalent to G—it can be concluded that L is equivalent to G.

The operation of block 707 will now be explained by way of example. Suppose that three social networks will be considered via the operations discussed in connection with FIG. 7: SN1, SN2, and SN3. Also suppose that among the attributized user profiles of SN1 is one whose FirstName and LastName fields convey "Joe Miller," that among the attributized user profiles of SN2 is one whose FirstName and LastName fields convey "Joseph Miller," that among the attributized user profiles of SN3 is one whose FirstName and LastName fields convey "Josef Miller."

Suppose further that operations of FIG. 7 have already run in connection with the social network pair SN1, SN2, and in connection with the social network pair SN1, SN3. Also suppose that the at-hand social network pair is SN2, SN3.

From this vantage point, suppose that the running in connection with the social network pair SN1, SN2 has yielded results including declaring match between the SN1 attributized user profile conveying "Joe Miller" and the SN2 attributized user profile conveying "Joseph Miller" (e.g., declaring these two attributized user profiles to correspond to the same person). Also suppose that the running in connection with the social network pair SN1, SN3 has yielded results including declaring match between the SN1 attributized user profile conveying "Joe Miller" and the SN3 attributized user profile conveying "Josef Miller."

As such, attempt at application of transitivity in block 707 might in view of the two discussed match declarations conclude with respect to network pair SN2, SN3 that the SN2 attributized user profile conveying "Joseph Miller" and the SN3 attributized user profile conveying "Josef Miller" correspond to the same individual. The component may therefore in connection with block 707 declare, with respect to network pair SN2, SN3, match between the SN2 attributized user profile conveying "Joseph Miller" and the SN3 attributized user profile conveying "Josef Miller." The component may therefore also in connection with block 707 remove the SN2 attributized user profile conveying "Joseph Miller" and the SN3 attributized user profile conveying "Josef Miller" from the at-hand bucket.

An attributized user profile couplet may be made up of two attributized user profiles: one attributized user profile from one social network of the at-hand social network pair, and one attributized user profile from the other social network of the at-hand social network pair. As depicted in FIG. 7, the matching component performs blocks 709-717 with respect to a particular attributized user profile couplet, and may then repeat blocks 709-717 with respect to a different attributized user profile couplet. For the case of l attributized user profile couplets, the component may appropriately repeat blocks 709-717 such that blocks 709-717 are performed for each of the l attributized user profile couplets.

Attributized user profile couplets may be such that such a couplet is made up of two different attributized user profiles irrespective of the order of those attributized user profiles (e.g., a single such couplet would arise from attributized user profile 1 in Social Network A and attributized user profile 2 in Social Network B). As an illustration, suppose that couplets were to be formulating drawing from the Social Network A attributized user profile 1, the Social Network A attributized user profile 2, the Social Network B attributized user profile 3, and the Social Network B attributized user profile 4. The arising attributized user profile couplets would be the following four. Firstly, Social Network A attributized user profile 1 and Social Network B attributized user profile 3. Secondly, Social Network A attributized user profile 1 and Social Network B attributized user profile 4. Thirdly, Social Network A attributized user profile 2 and Social Network B attributized user profile 3. Fourthly, Social Network A attributized user profile 2 and Social Network B attributized user profile 4.

At block 709 the component may calculate attribute-wise similarity values for the at-hand attributized user profile couplet of the at-hand bucket. Such operation may be performed in an analogous manner to that discussed in connection with block 605 FIG. 6, but with the operation being performed with respect to the at-hand attributized user profile couplet of the at-hand bucket rather than with respect to a known-identical-user couplet as set forth in block 605. As an illustration, suppose that each of the attributized user profiles making up the at-hand attributized user profile couplet of the at-hand bucket included a name attribute (e.g., a FOAF name attribute), a homepage attribute (e.g., a FOAF homepage attribute), and an image attribute (e.g., a FOAF Image attribute). Calculation of the attribute-wise similarity values at block 709 might yield a 0.6 similarity value with respect to the name attribute, a 0.7 similarity value with respect to the homepage attribute, and a 0.9 similarity value with respect to the image attribute.

At block 711 the component may apply attribute-wise weights with respect to the at-hand attributized user profile couplet of the at-hand bucket. Such attribute-wise weights might be of the sort discussed in connection with FIG. 6. As an illustration and continuing with the example set forth in connection with block 709, suppose that the to-be-applied weight for the name attribute is 0.8, that the to-be-applied weight for the homepage attribute is 0.75, and that the to-be-applied weight for the image attribute is 0.8. As such, the post-weight-application results may be 0.48 for the name attribute (reflecting the discussed 0.6 name similarity value of the set with the 0.8 weighting applied), 0.53 (reflecting the discussed 0.7 homepage similarity with the 0.75 weighting applied), and 0.72 (reflecting the discussed 0.9 image similarity with the 0.8 weighting applied).

With reference to that which is discussed in connection with FIG. 6, per-attribute weights selected may be considered applicable to a particular social network pair but perhaps inapplicable to other social network pairs. As such, per-attribute weights employed in connection with block 711 may be those appropriate for the at-hand social network pair.

At block 713 the component may take the result of block 711—the at-hand attributized user profile couplet of the at-hand bucket with the per-attribute weights having been applied thereto—and apply a decision making function thereto. Such operation may be performed in an analogous manner to that discussed in connection with block 611 FIG. 6, but with the operation being performed with respect to the noted the result of block 711 rather than with respect to a weighted characteristic attribute-wise similarity value set with as set forth in block 611.

At block 715 the component may check the output of the decision making function to see whether or not sameness had been indicated. Such might be performed in a manner analogous to that discussed in connection with block 613 of FIG. 6. As an example the output of the decision making function might be considered to indicate sameness in the case where the output met or exceeded a threshold of the sort discussed hereinabove, and might be taken to not indicate sameness in the case where the threshold was not met.

In the case where sameness was not indicated flow could proceed to block 719. In the case where sameness was indicated flow could proceed to block 717 wherein the component could declare a match with the respect to the at-hand attributized user profile couplet of the at-hand bucket. As referenced above, the at-hand attributized user profile couplet will include one attributized user profile from one network of the at-hand social network pair, and one attributized user profile from the other network of the at-hand social network pair. In doing the noted declaration the component could indicate that that these two attributized user profiles correspond to the same person.

As noted hereinabove, for the case of l attributized user profile couplets, the component may appropriately repeat blocks 709-717 such that blocks 709-717 are performed for each of the l attributized user profile couplets. In keeping with this at block 719 the component may determine whether or not there is call for such repeating. Where there is such call the component may return to block 709 with respect to the called-for attributized user profile couplet. Where there is not such call the component may proceed to block 721.

As also noted hereinabove, for the case of b buckets within the at-hand social network pair, the component may appropriately repeat blocks 707-719 such that blocks 707-719 are performed for each of the b buckets. In keeping with this at block 721 the component may determine whether or not there is call for such repeating. Where there is such call the component may return to block 707 with respect to the called-for bucket. Where there is not such call the component may proceed to block 723.

As additionally noted hereinabove, For the case of p social network pairs, the component may appropriately repeat blocks 701-721 such that blocks 701-721 are performed for each of the p social network pairs. In keeping with this at block 723 the component may determine whether or not there is call for such repeating. Where there is such call the component may return to block 701 with respect to the called-for social network pair. Where there is not such call the component may proceed to block 725.

At block 725 the component may attempt overall transitivity. As discussed hereinabove in connection with block 717, the component may declare a match with the respect to an attributized user profile couplet, and therefore a same-person match between two attributized user profiles: an attributized user profile in one social network and an attributized user profile in another social network. Via block 725 the component may attempt to link such findings in declaring matches between three or more attributized user profiles across three or more social networks.

As an illustration, suppose that the component had declared that attributized user profile A in social network 1 corresponded to the same person as that of attributized user profile B in social network 2. Suppose further that the component had declared that attributized user profile B in social network 2 corresponded to the same person as that of attributized user profile C in social network 3. Via block 725 the component might, in view of this and employing transitivity, declare a cross-three-network match in which user profiles A-C correspond to the same person. Thereafter, via block 726, the component may dispatch a profile matching storage request, i.e., storing indications of attributized user profile couplet matches.

Subsequent to attempting overall transitivity at block 725 and storage 726, flow could proceed to block 727 where execution could end.

FIG. 8 shows a screenshot diagram illustrating embodiments for Abound search. The Figure shows abound search occurring inside a web browser window, but mobile, and stand-alone applications are also contemplated. A search text box 801 allows a user (e.g., recruiter) to enter search tokens which may be modified by a number of constraints 803 (e.g., Boolean, fuzzy, etc.). A number of tokens may be added and joined allowing searches on any or all the tokens 805. Abound search results may be displayed 807 and interacted with. For example, any of the sources of information used to create the Abound aggregated/consolidated candidate profile may be shown as individual entries that allow a recruiter to view, and interact with the individual. For example, aggregated social network information for the identified candidates may be revealed by clicking on the Social information indicator, e.g., icon, 813, and reveal a social selection menu 809 allowing the user see, follow, confirm social network accounts for the candidate. Similarly, a recruiter may engage email 811 to initiate an email, or phone 815 interaction (e.g., revealing and/or engaging phone dialing).

FIG. 9 shows a diagram illustrating pooling active and passive candidates through their internet footprints for embodiments of Abound.

FIG. 10 shows a delineated list of differentiating factors of embodiments of Abound.

Figure 11:
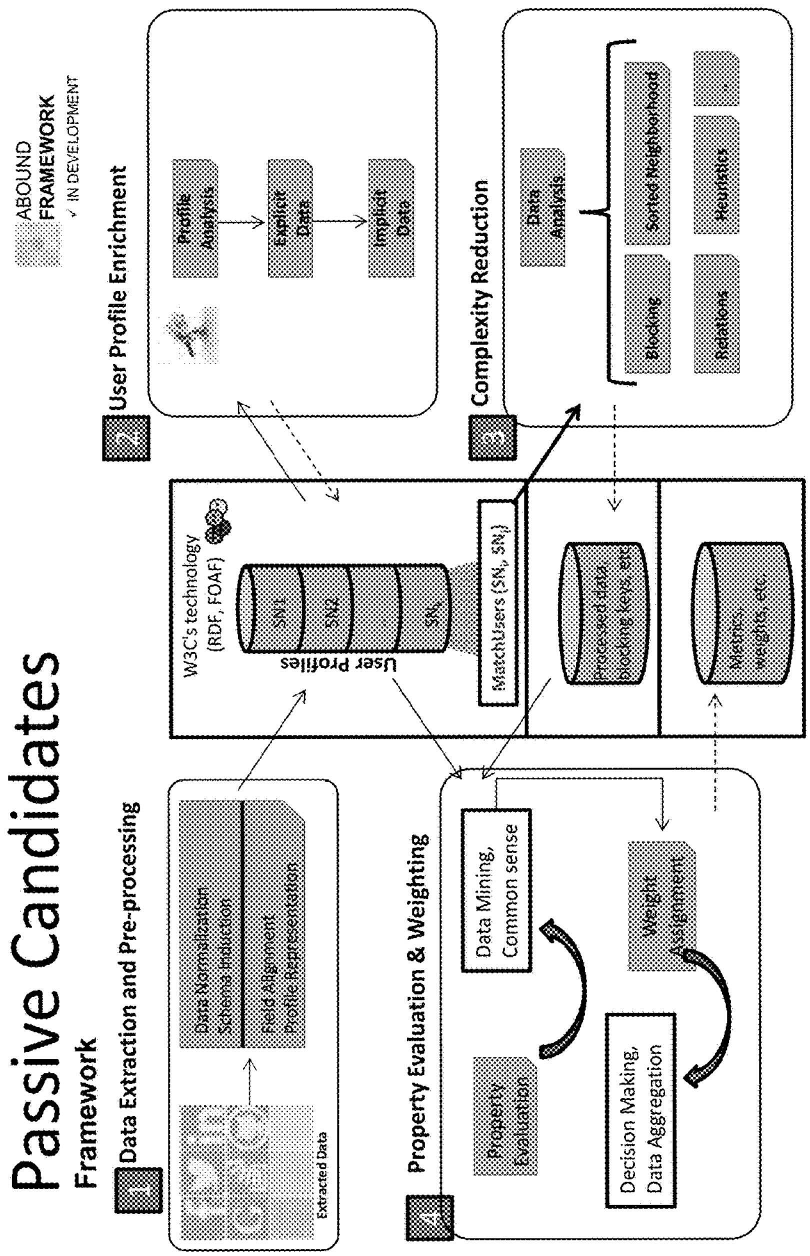
FIGS. 11-12 show a framework diagram illustrating embodiments of Abound.
Figure 12:
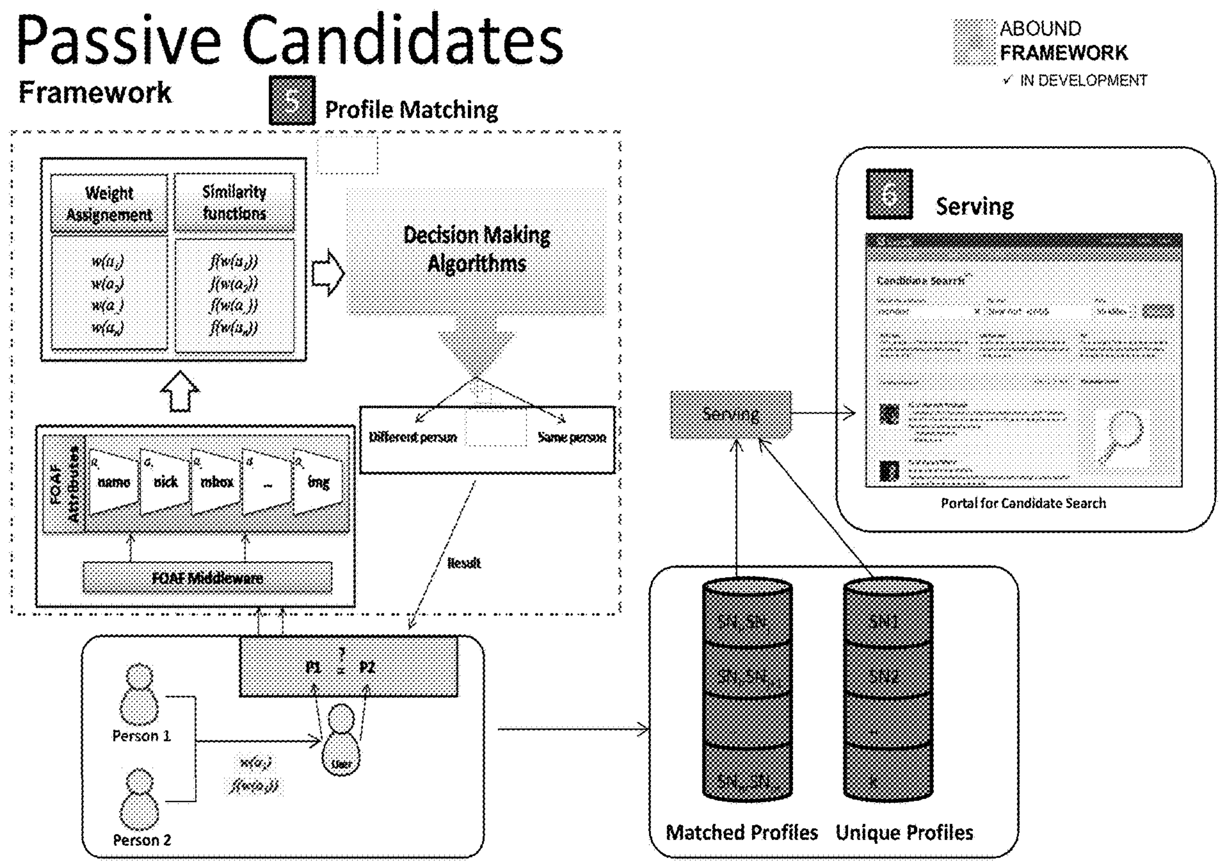

FIGS. 11-12 show a framework diagram illustrating embodiments of Abound.

Figure 13:
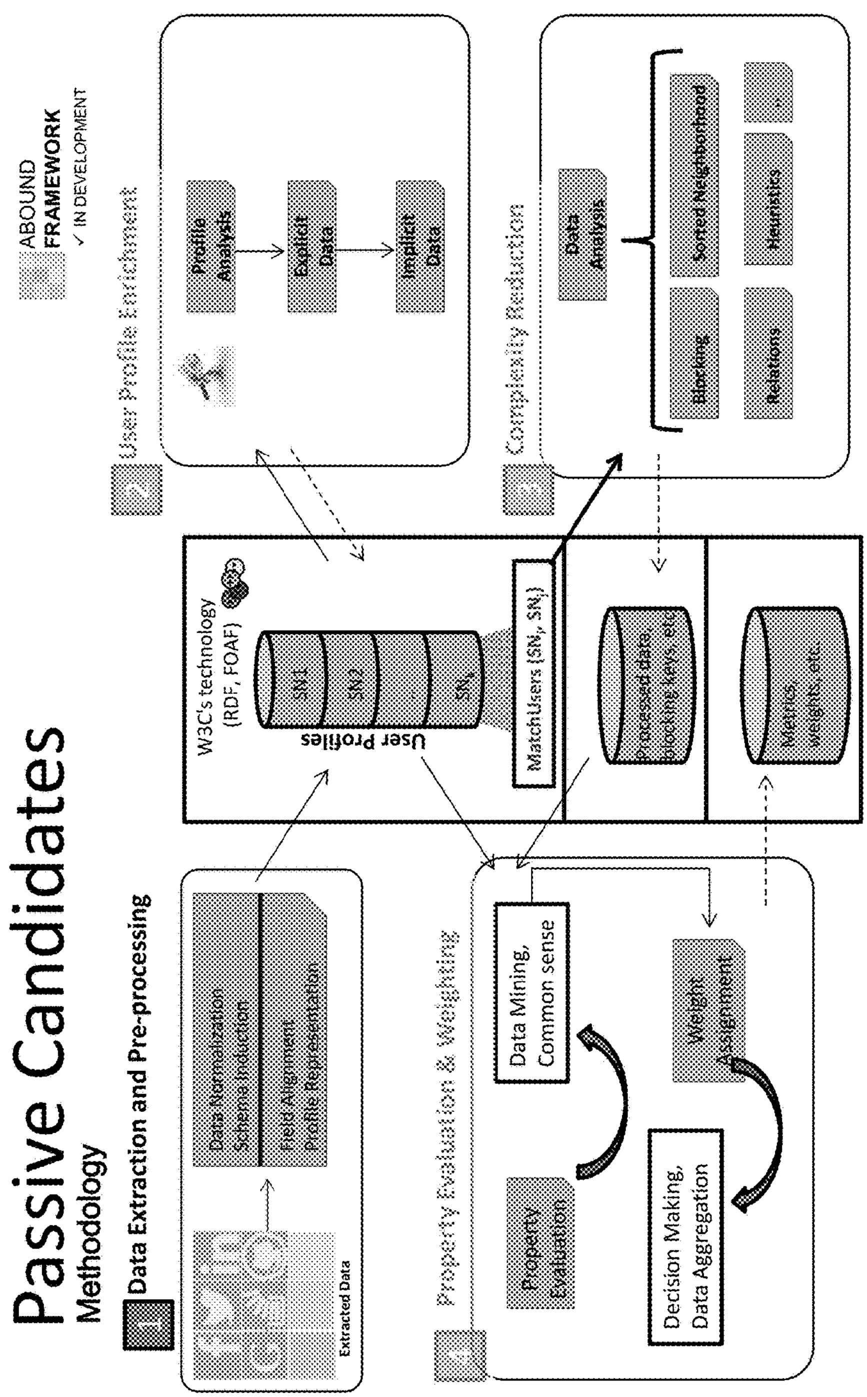
FIGS. 13-14 show a data extraction and normalization block diagram of embodiments for Abound.
Figure 14:
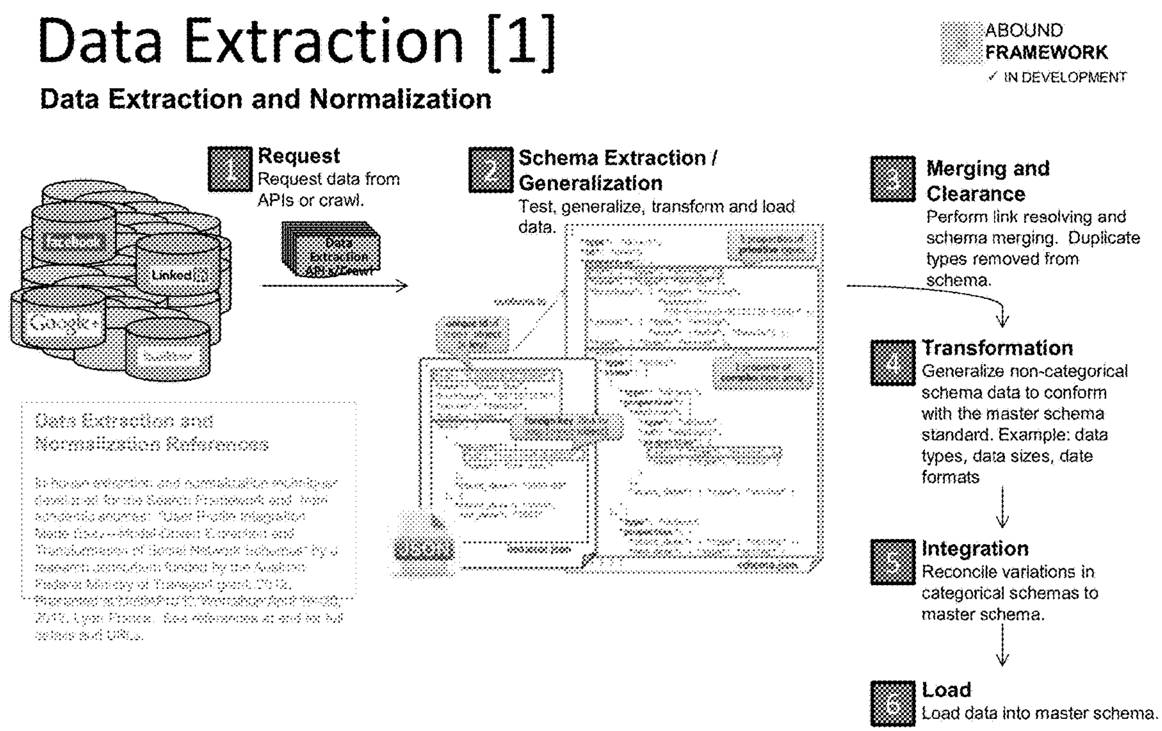

FIGS. 13-14 show a data extraction and normalization block diagram of embodiments for Abound.

FIG. 15 shows sample Crawl and API Data of embodiments for Abound.

Figure 16:
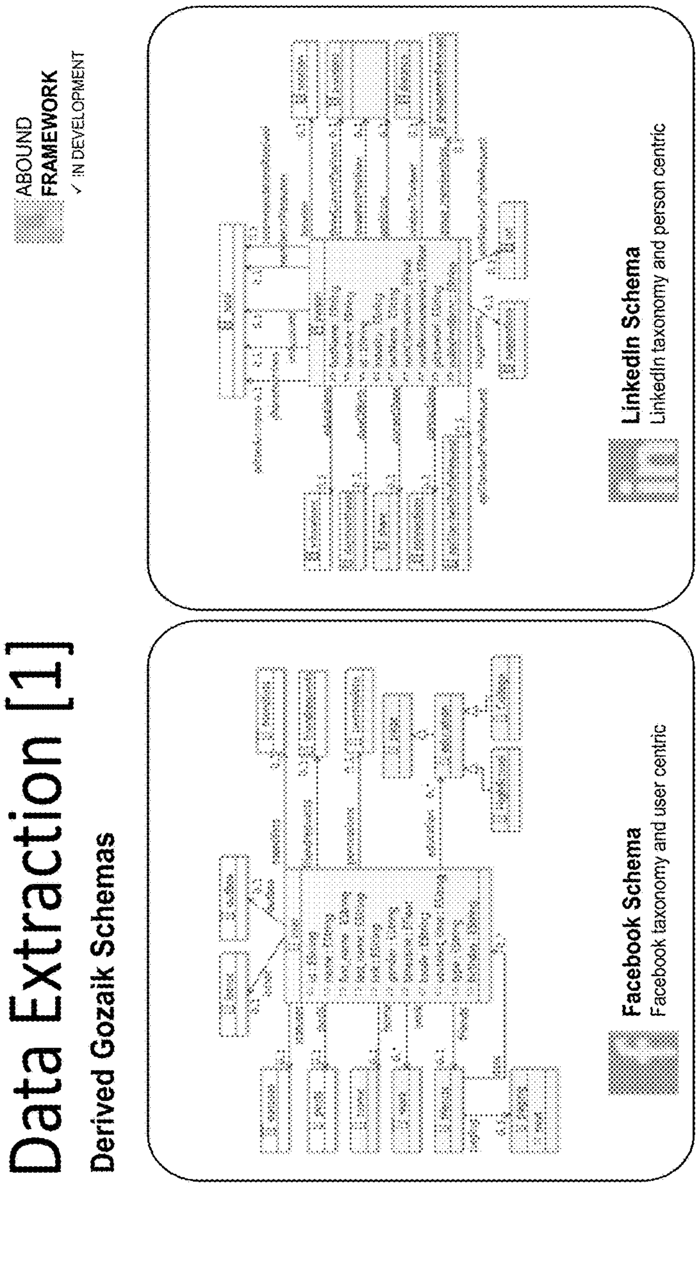
FIGS. 16-17 show block diagrams illustrating derived schemas of various embodiments for Abound.
Figure 17:
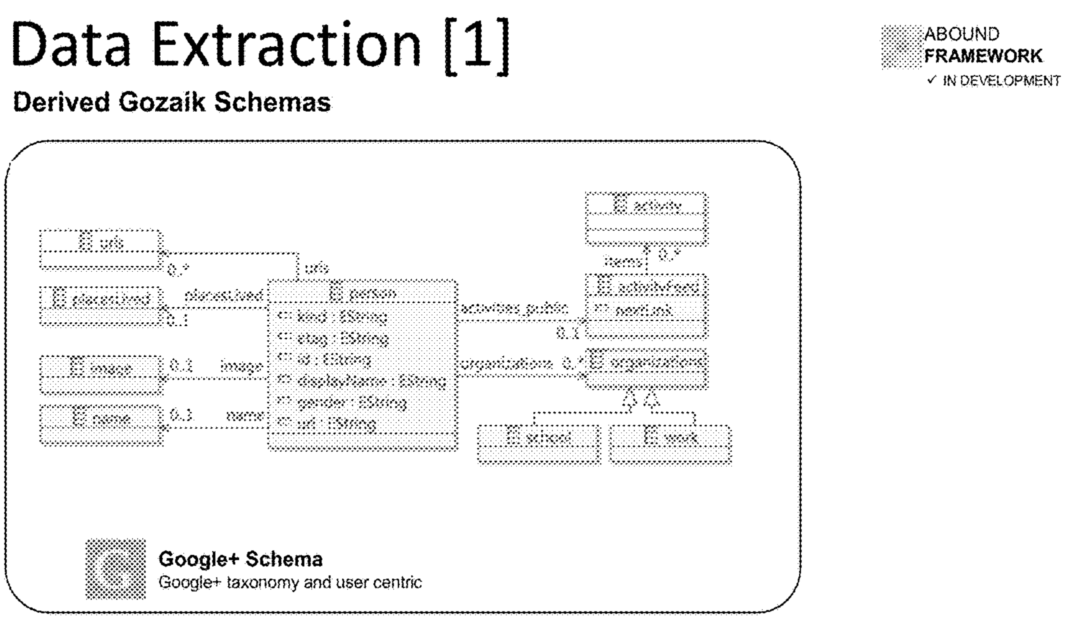

FIGS. 16-17 show block diagrams illustrating derived schemas of various embodiments for Abound.

Figure 18:
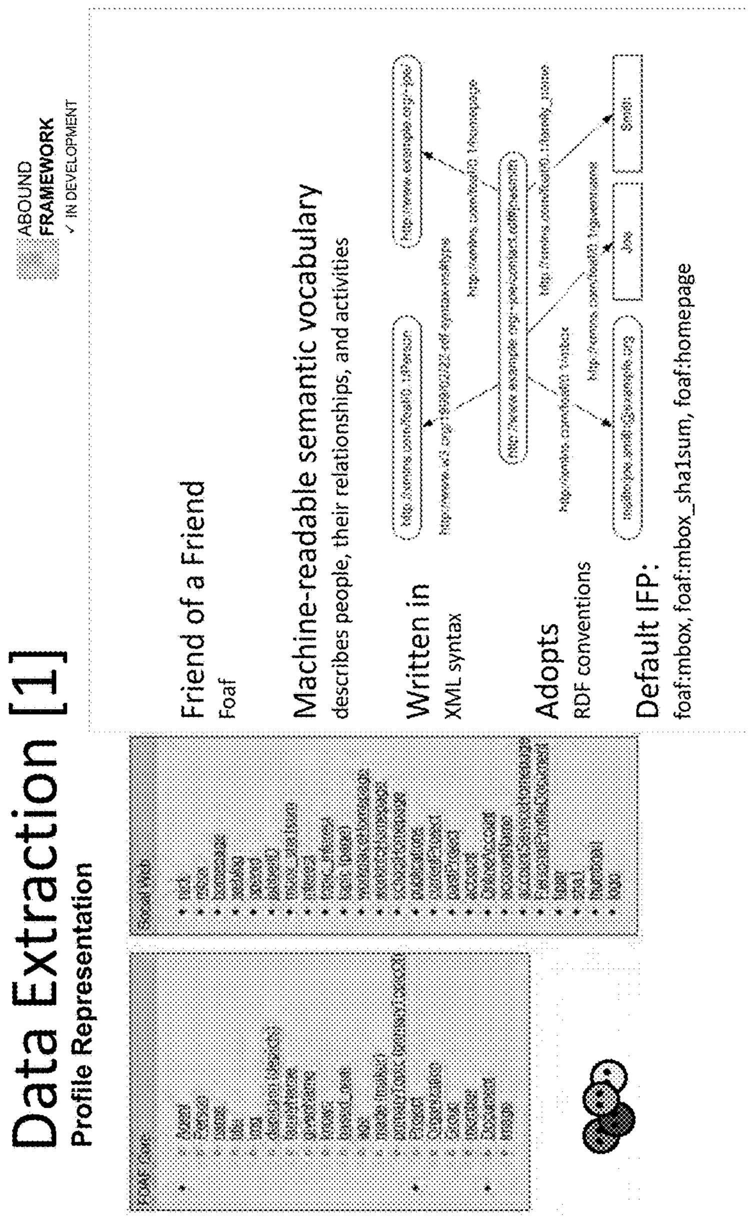
FIG. 18 shows a block diagram illustrating profile representation embodiments for Abound.
Figure 20:
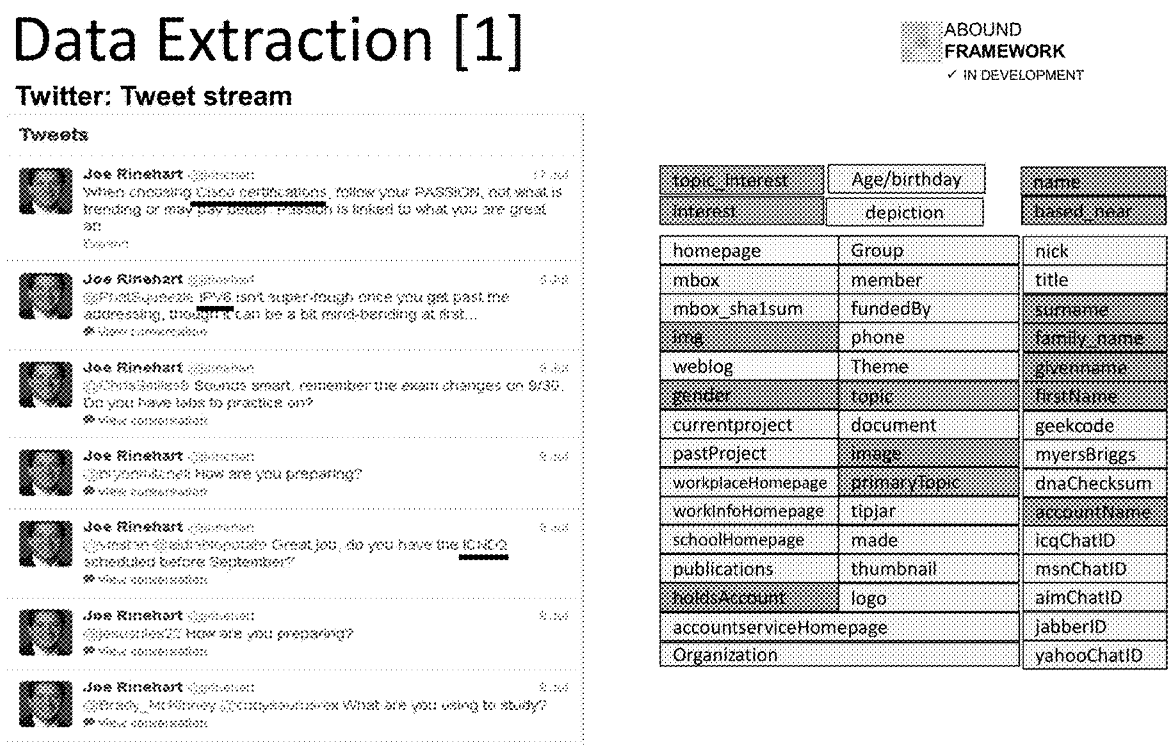
Figure 21:
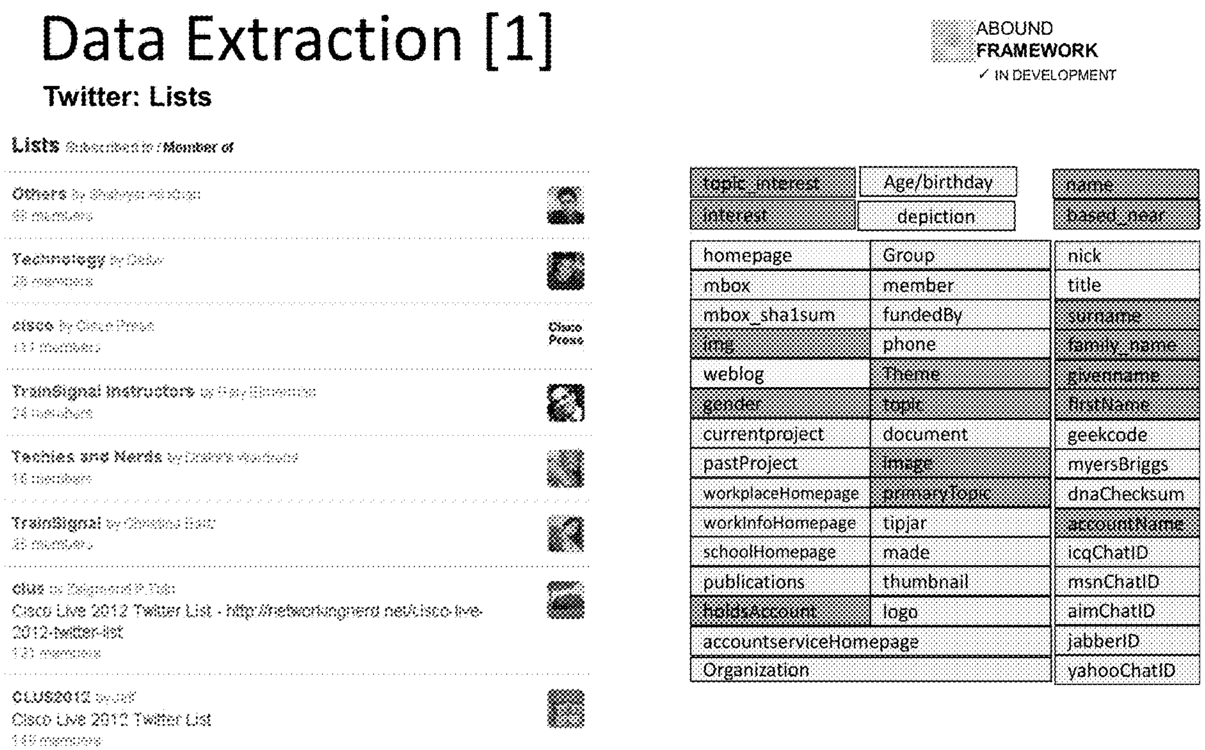
Figure 22:
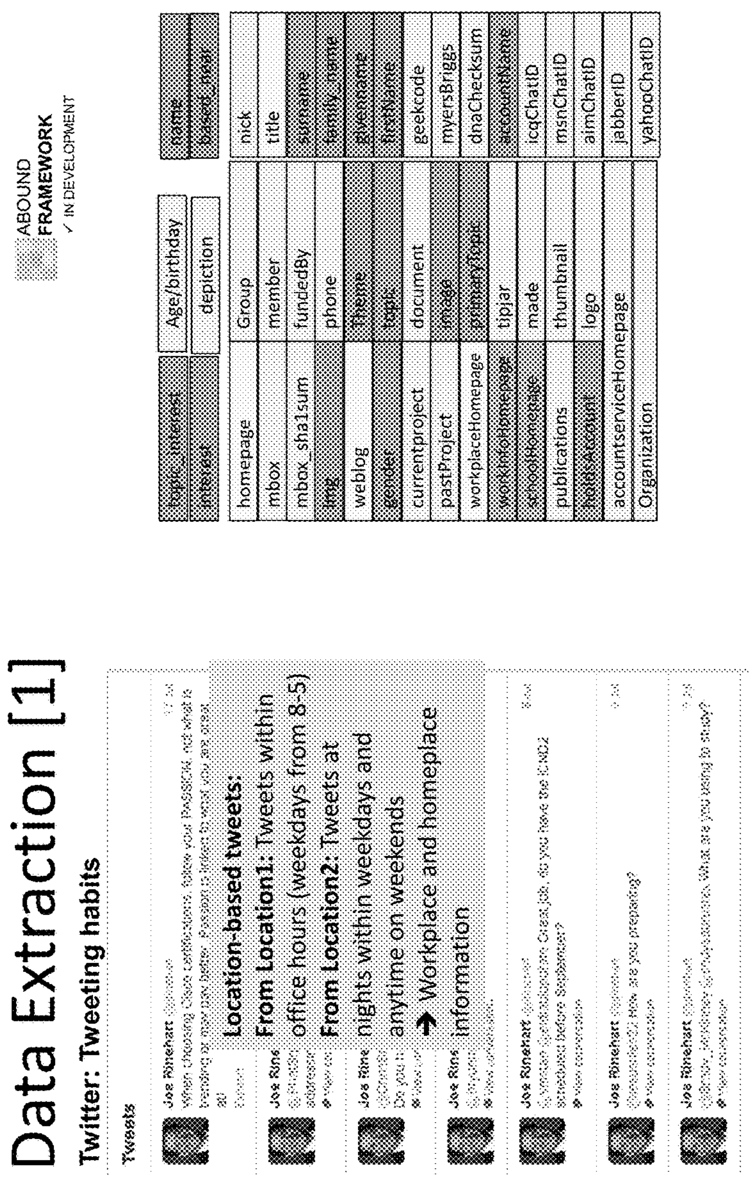
Figure 23:
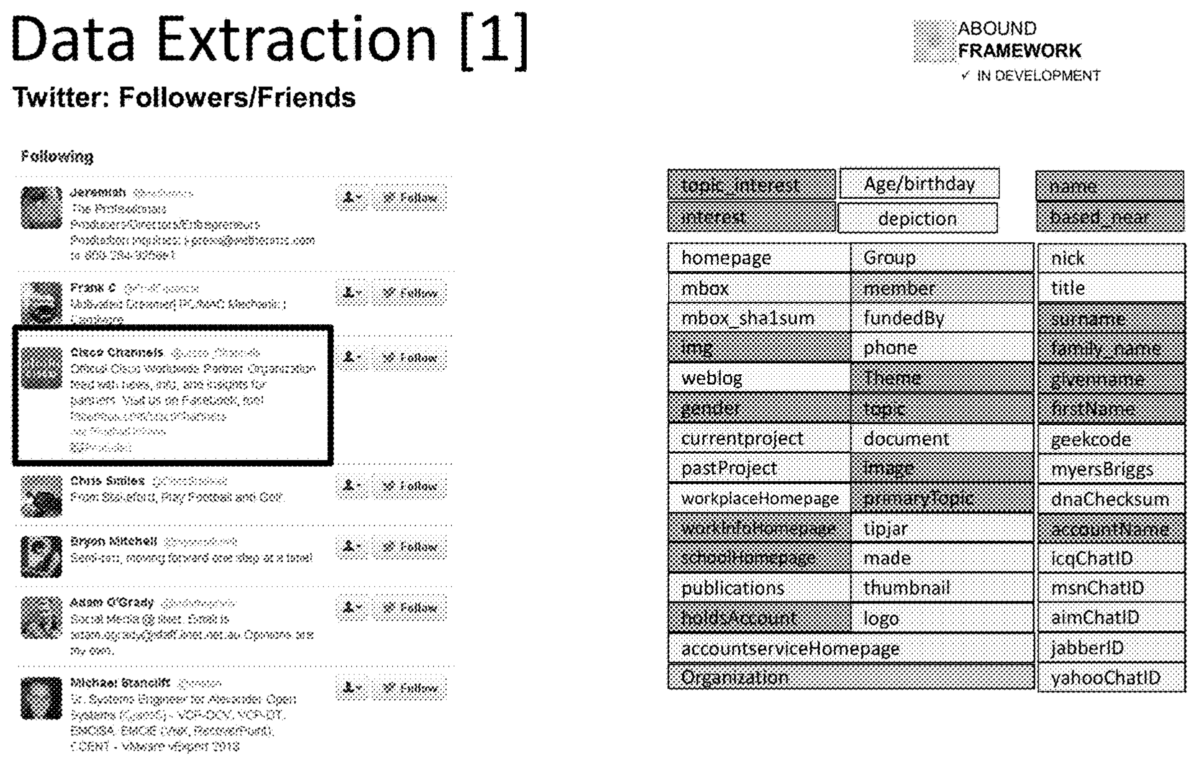
Figure 24:
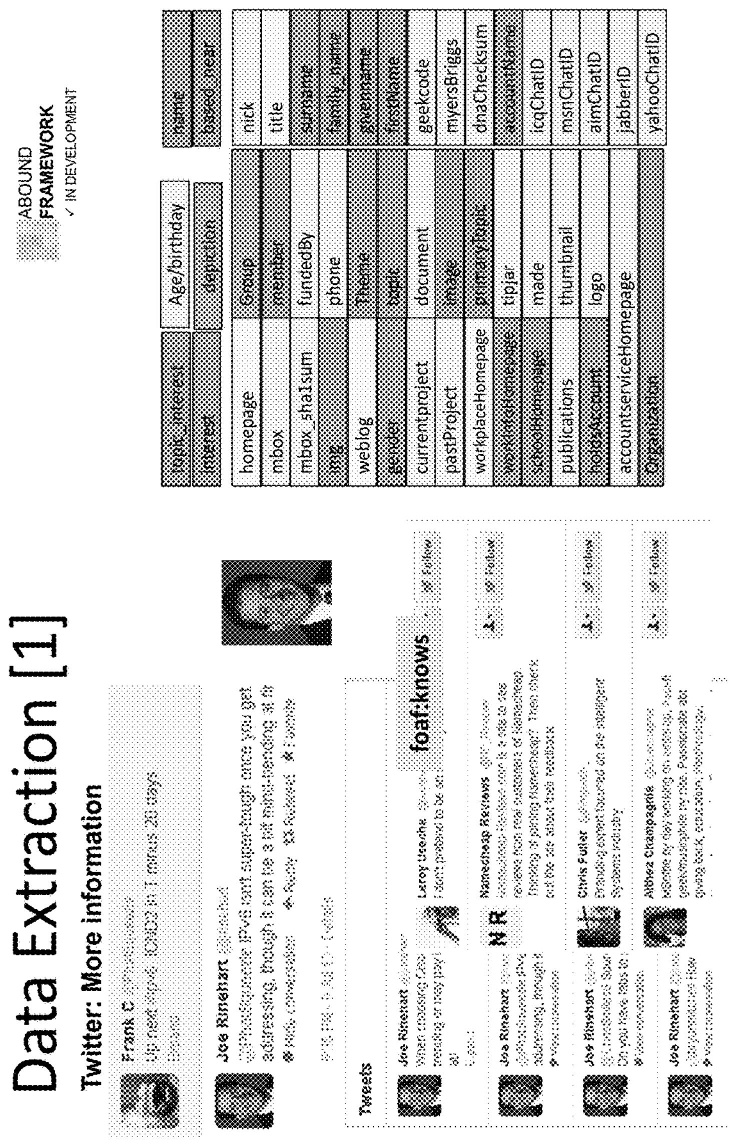
Figure 25:
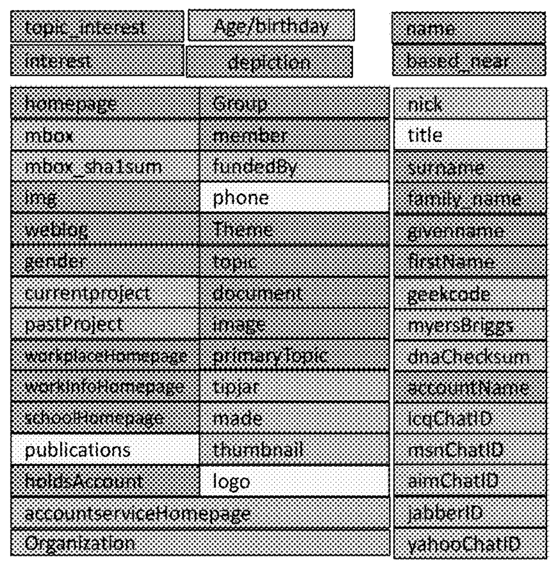
Figure 27:
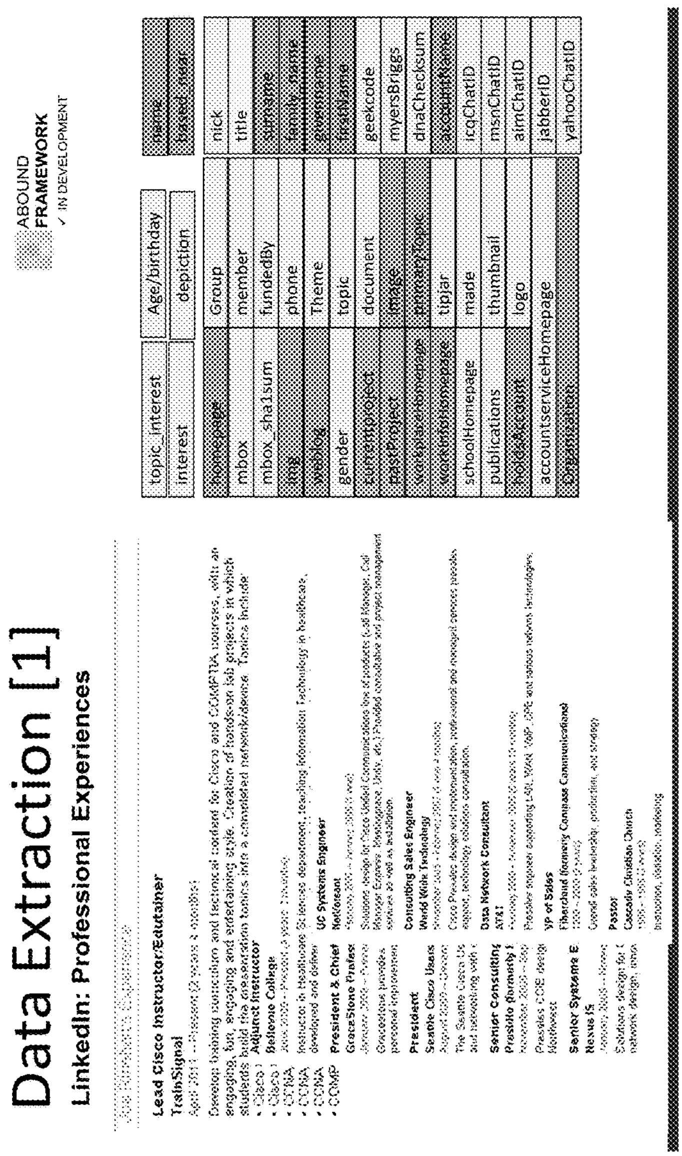
Figure 28:
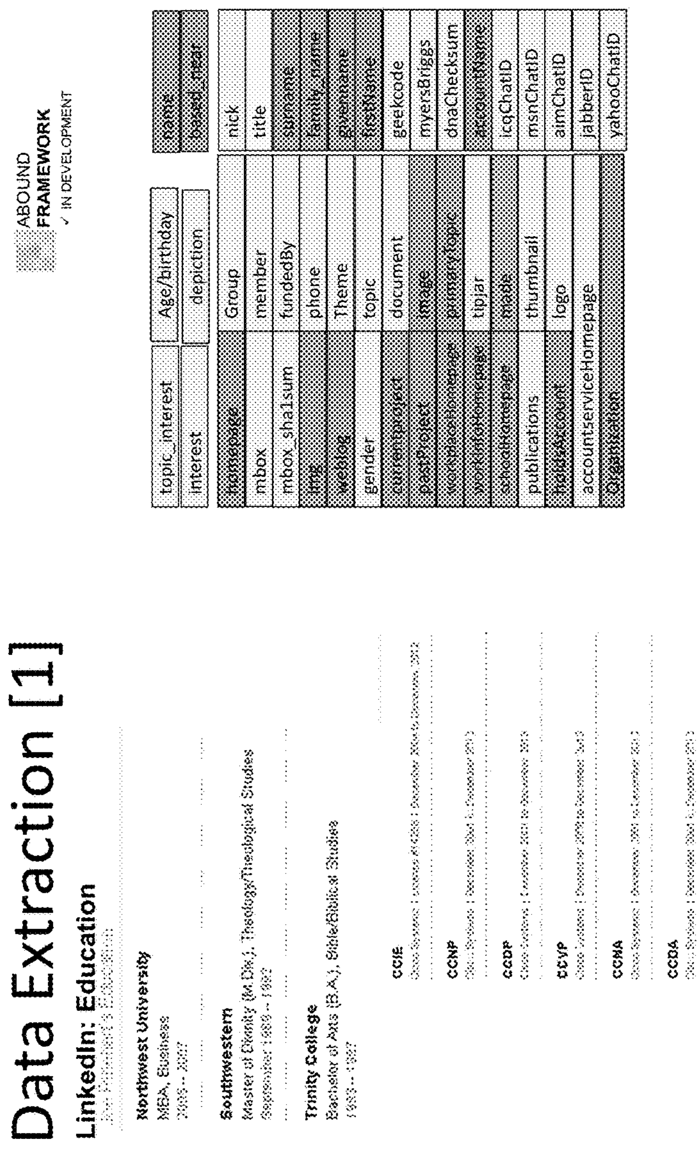
Figure 30:
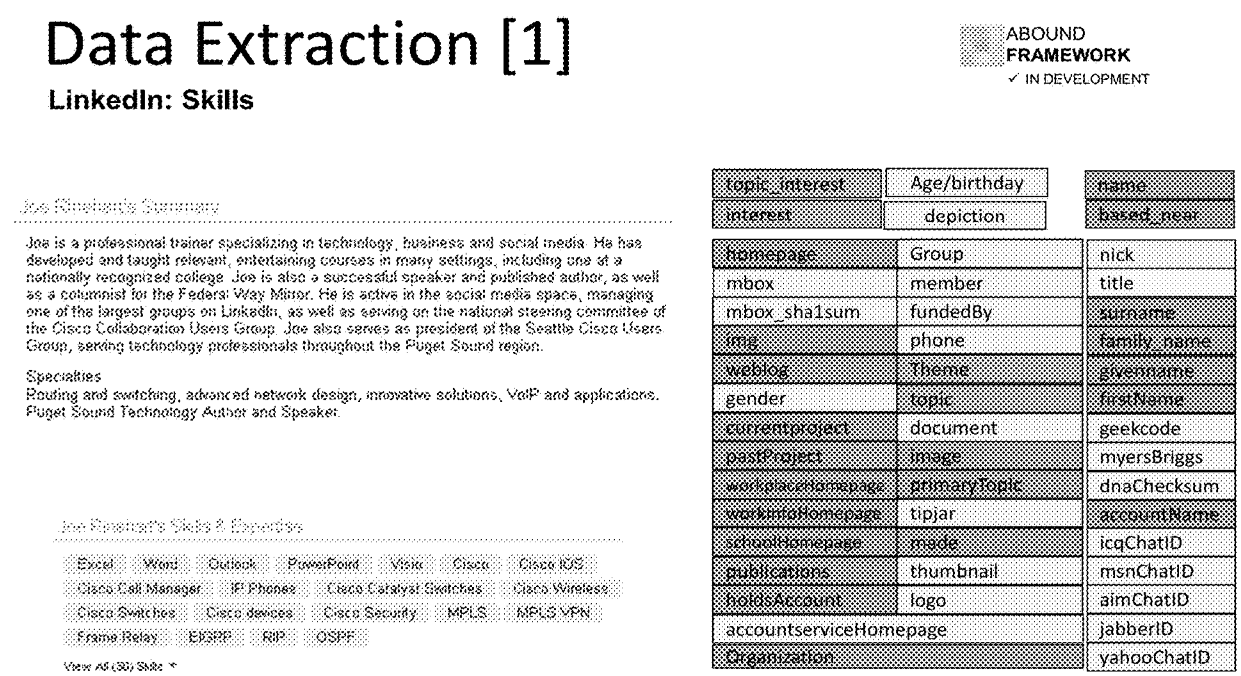
Figure 31:
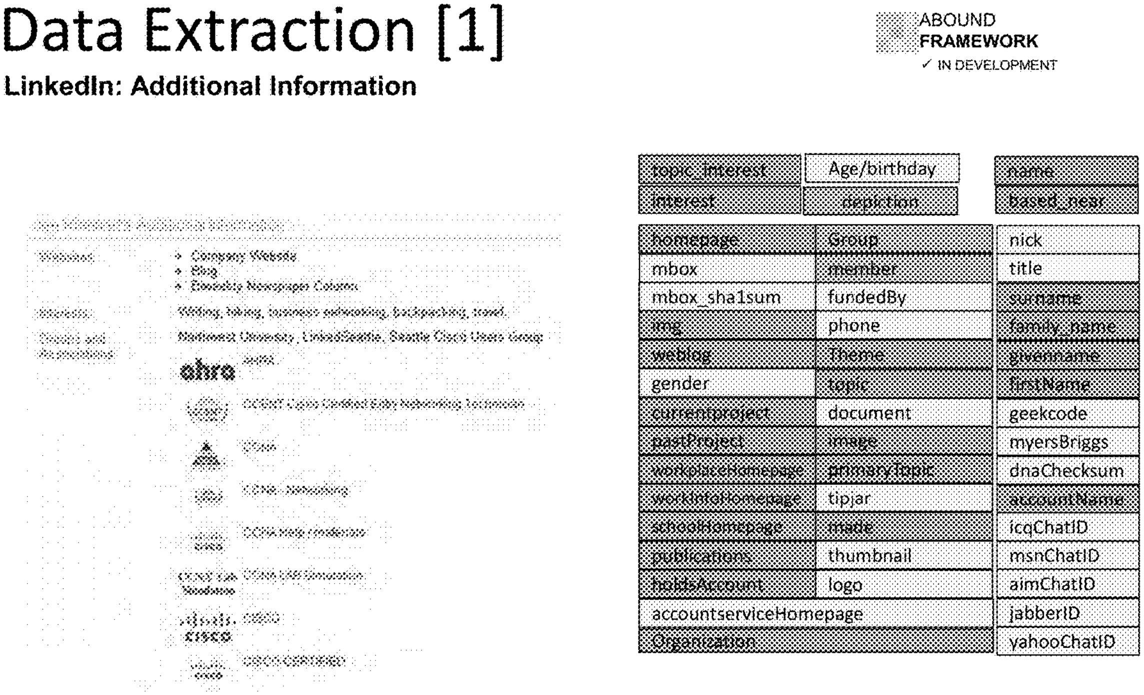
Figure 34:
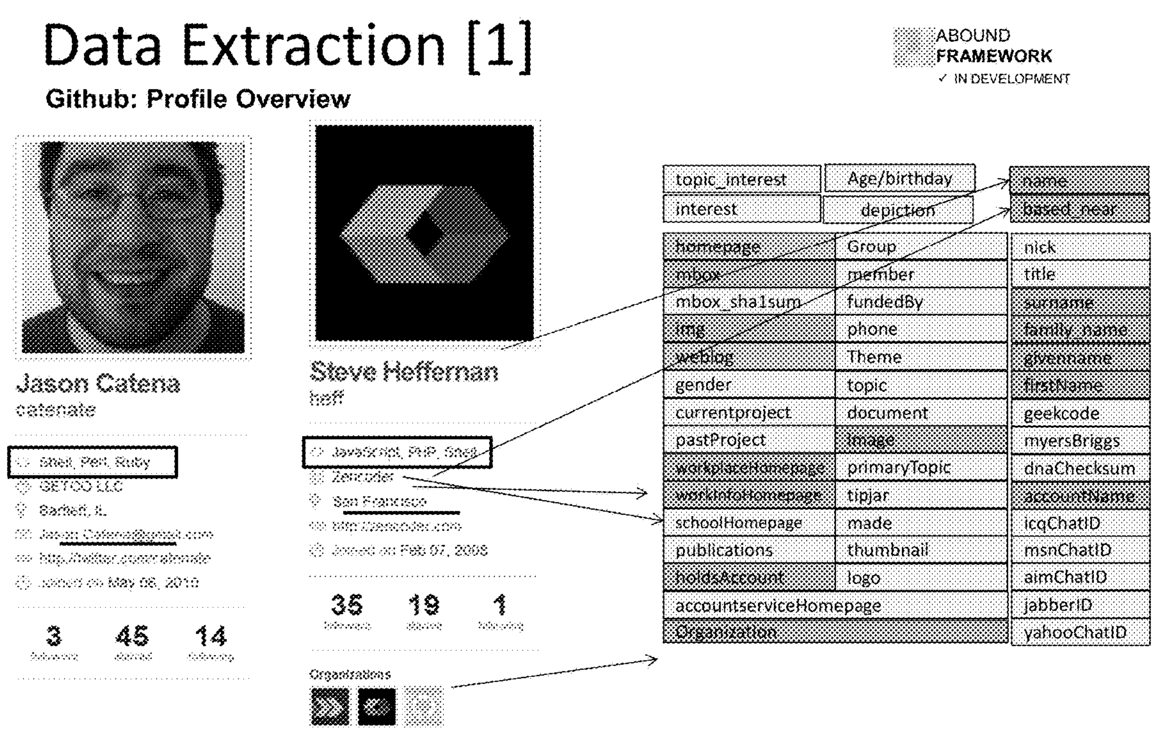
Figure 35:
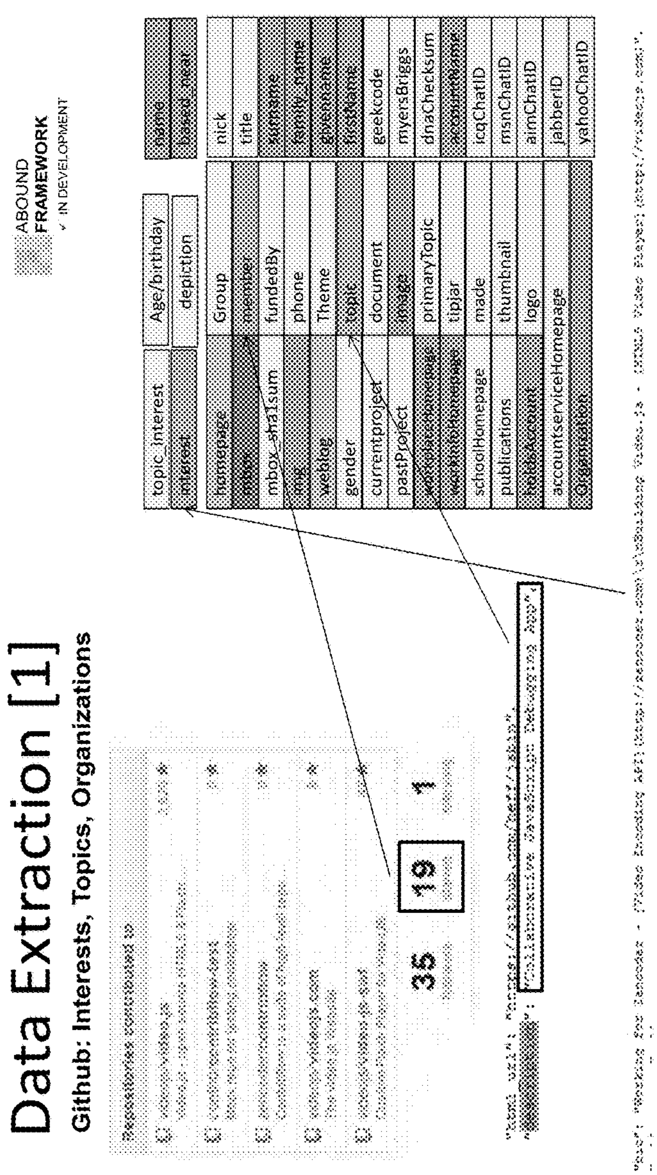
Figure 36:
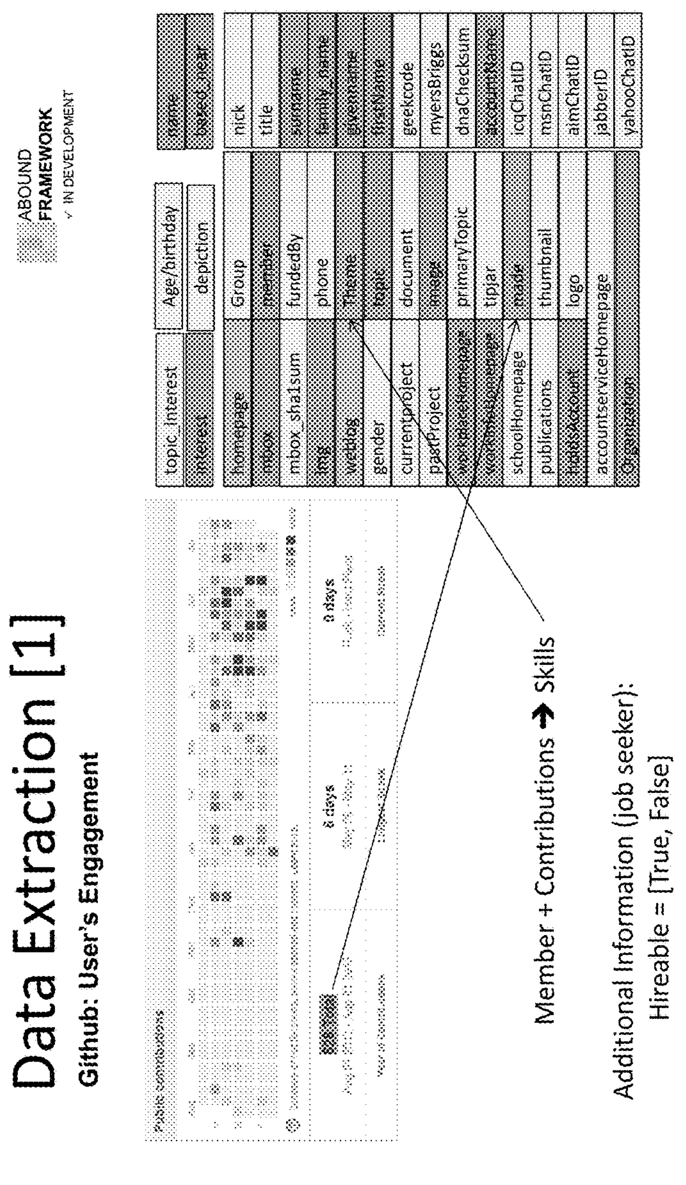
Figure 37:
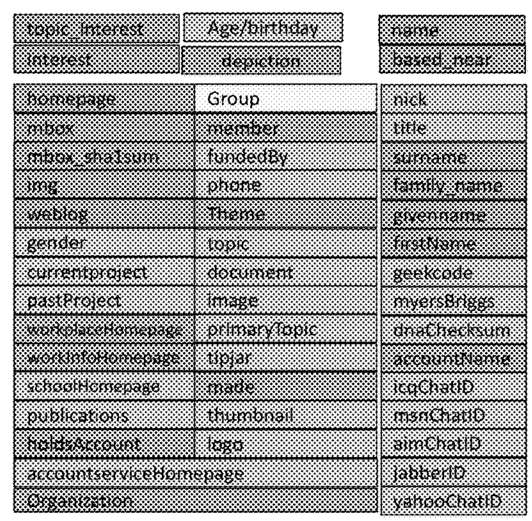
Figure 38:
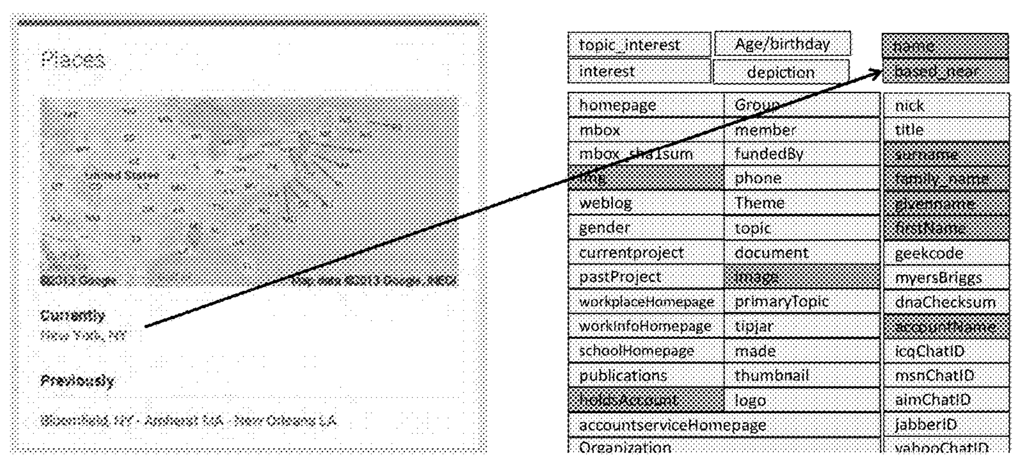
Figure 39:
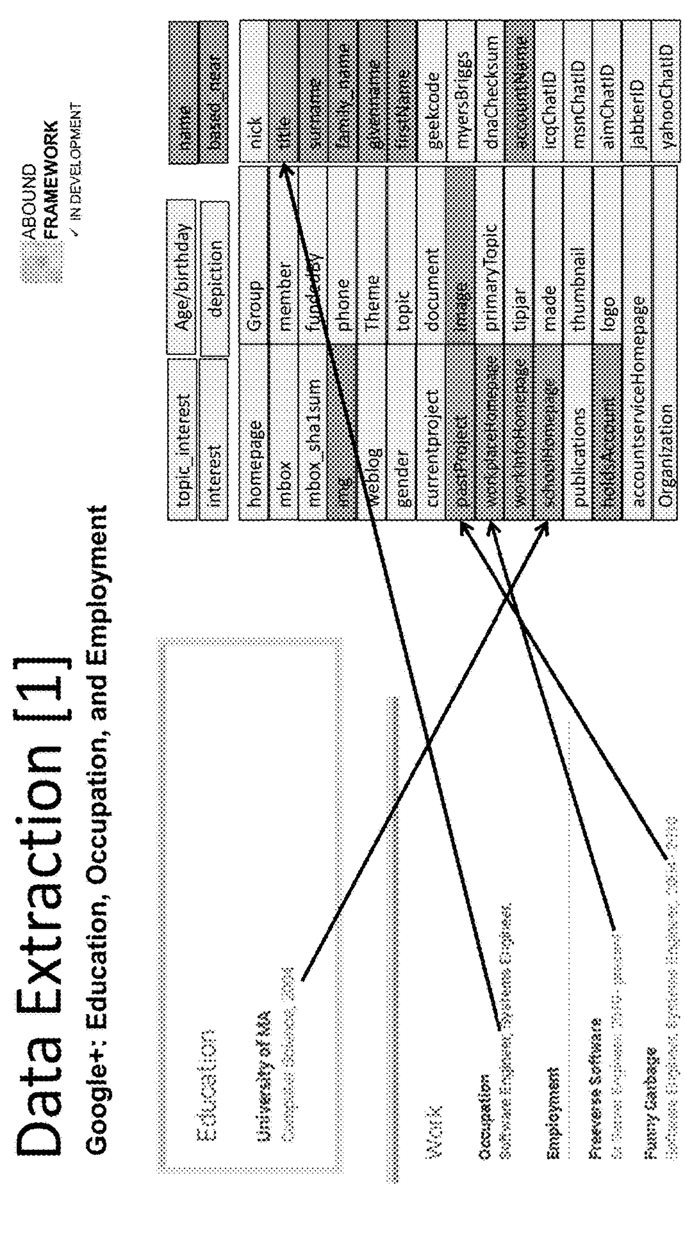
Figure 40:
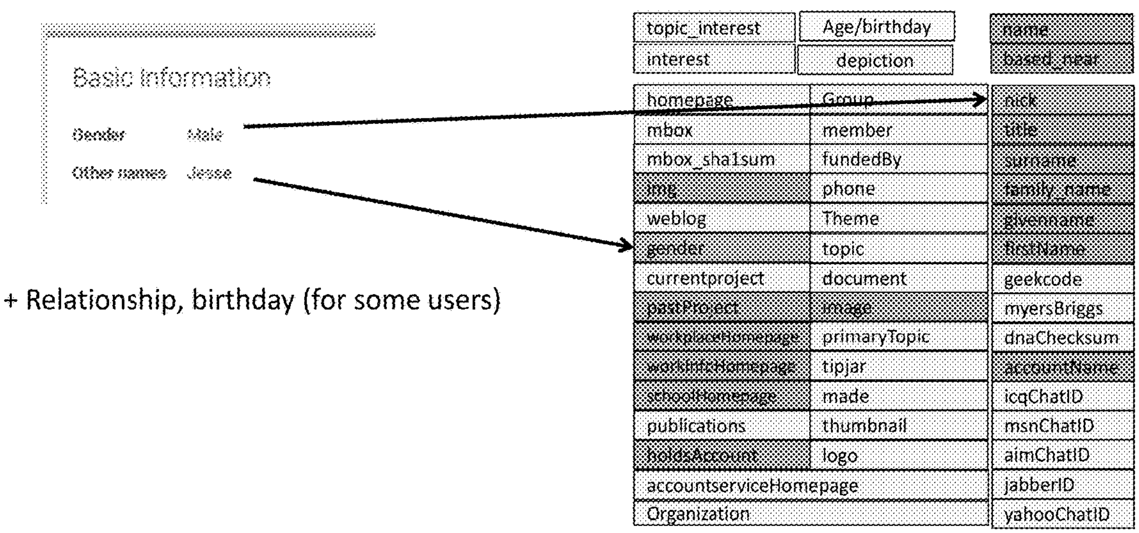
Figure 41:
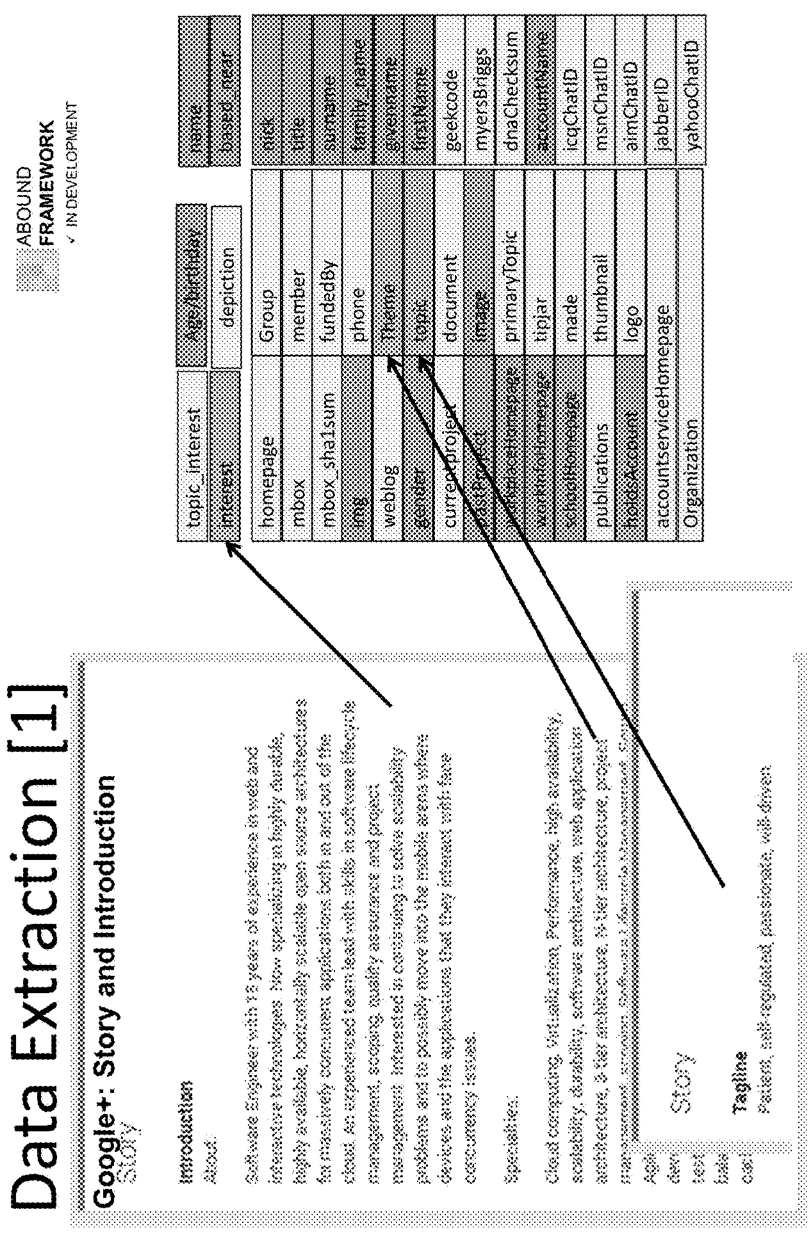
Figure 42:
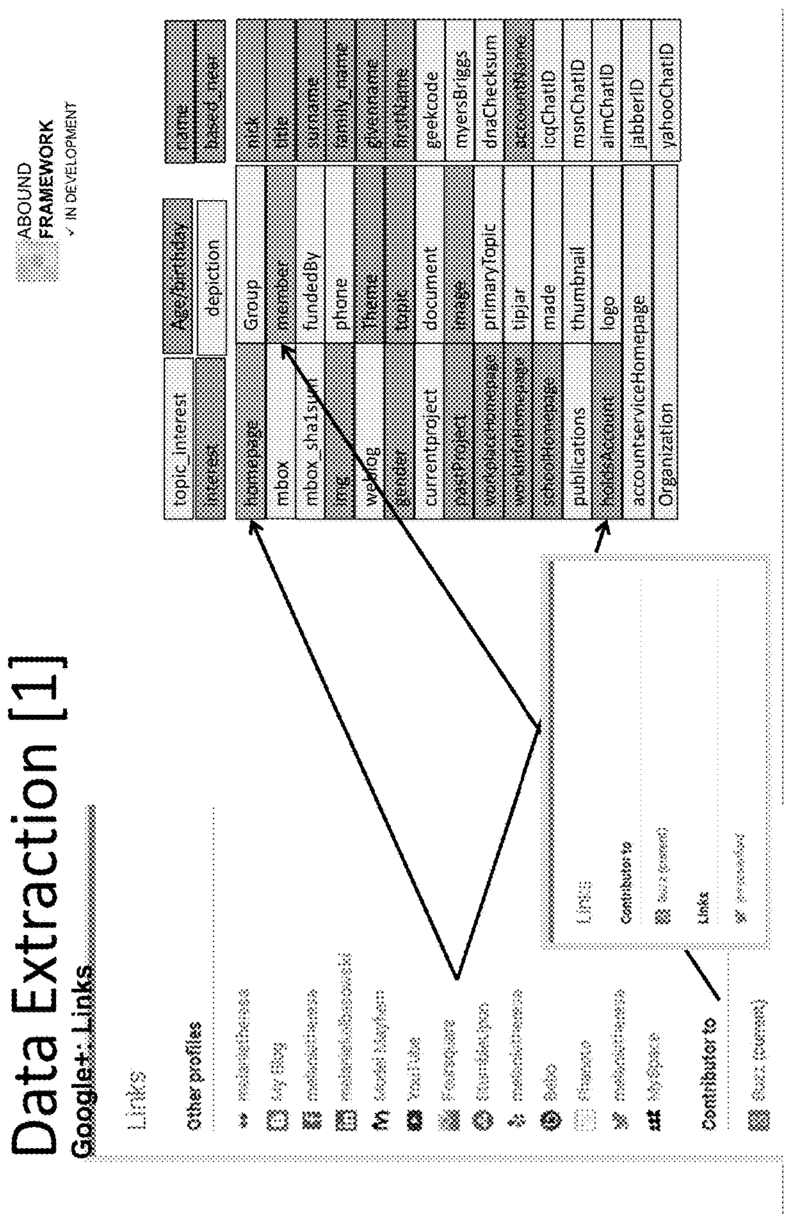
Figure 45:
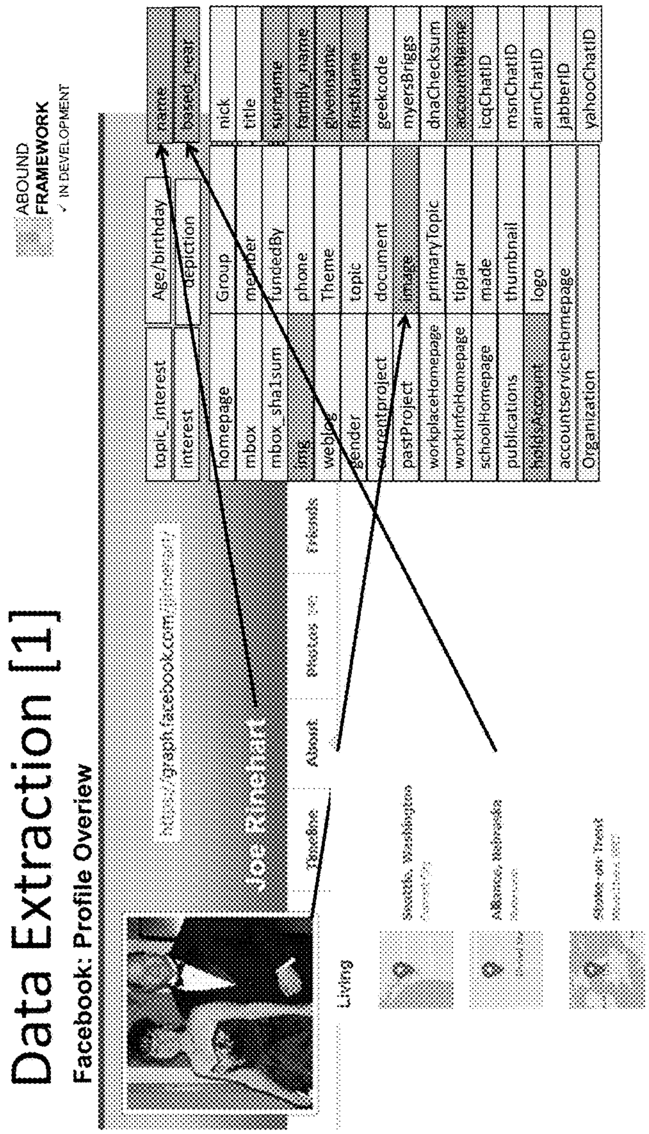
Figure 46:
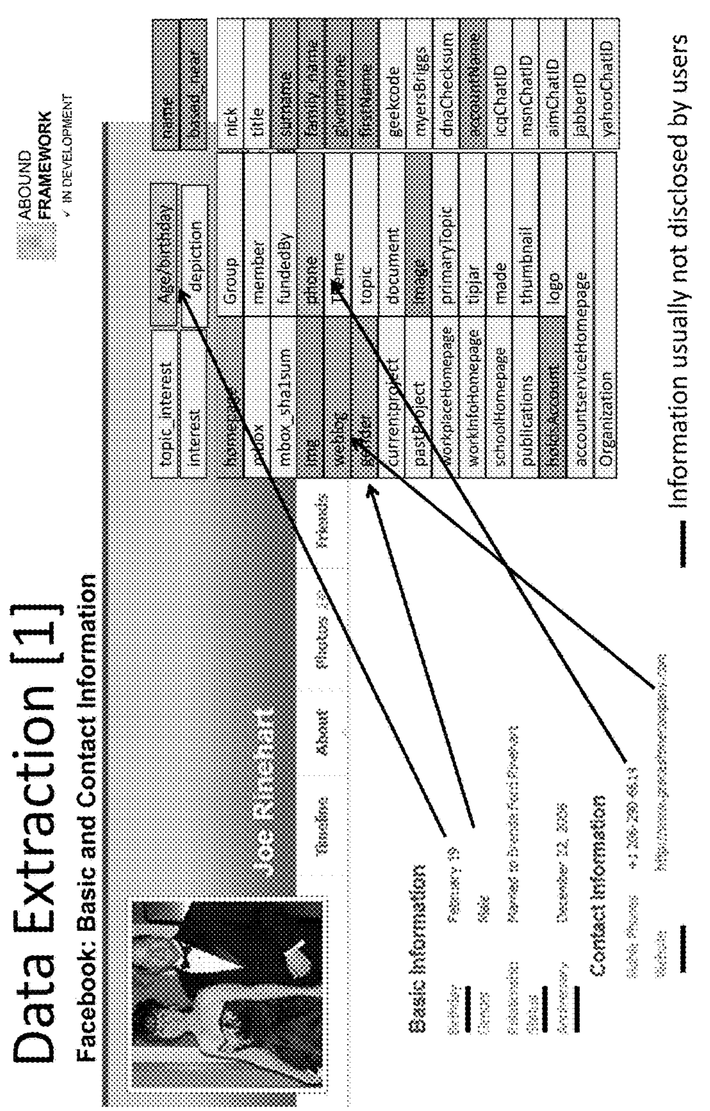
Figure 47:
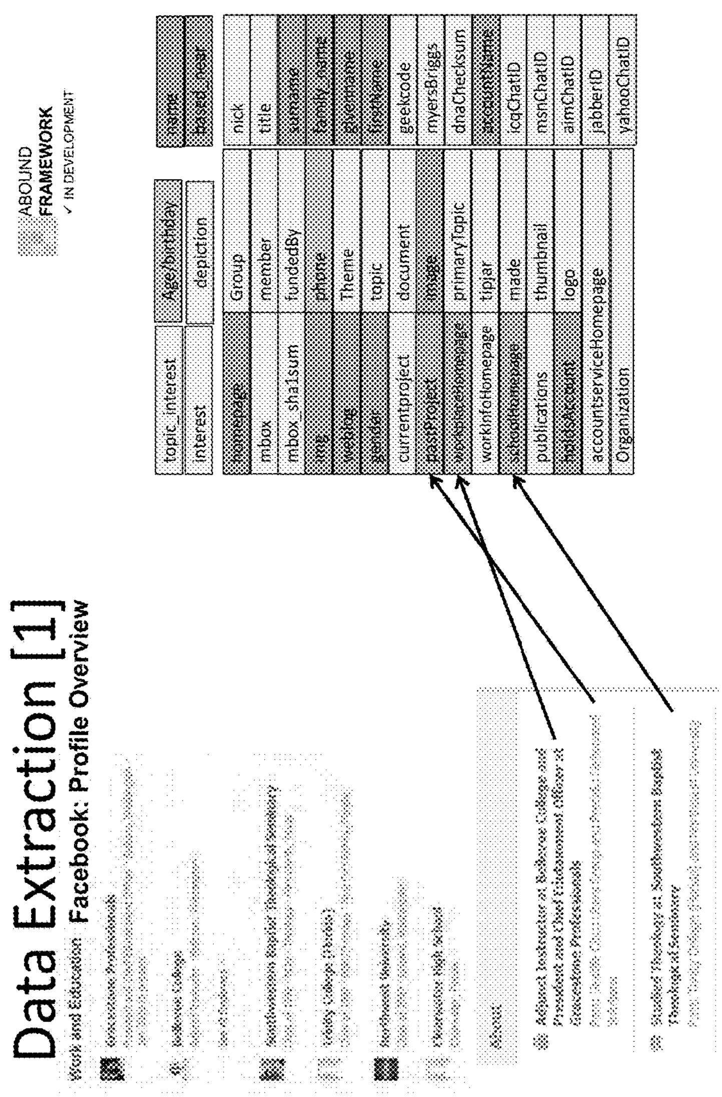
Figure 48:
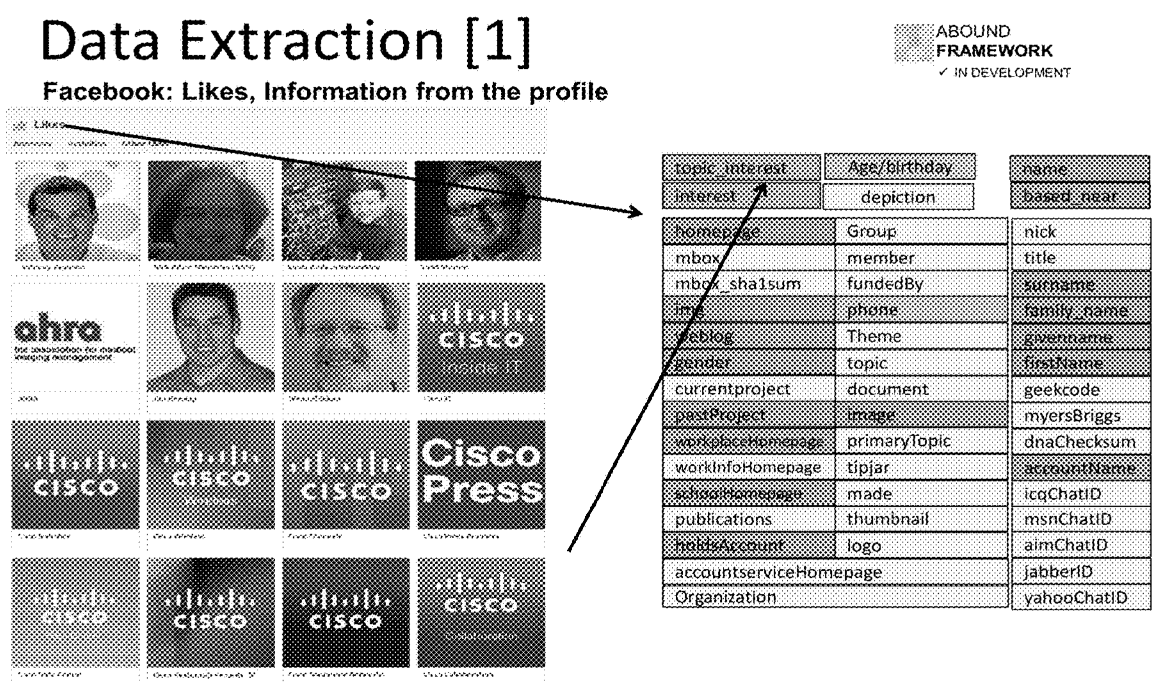
Figure 49:
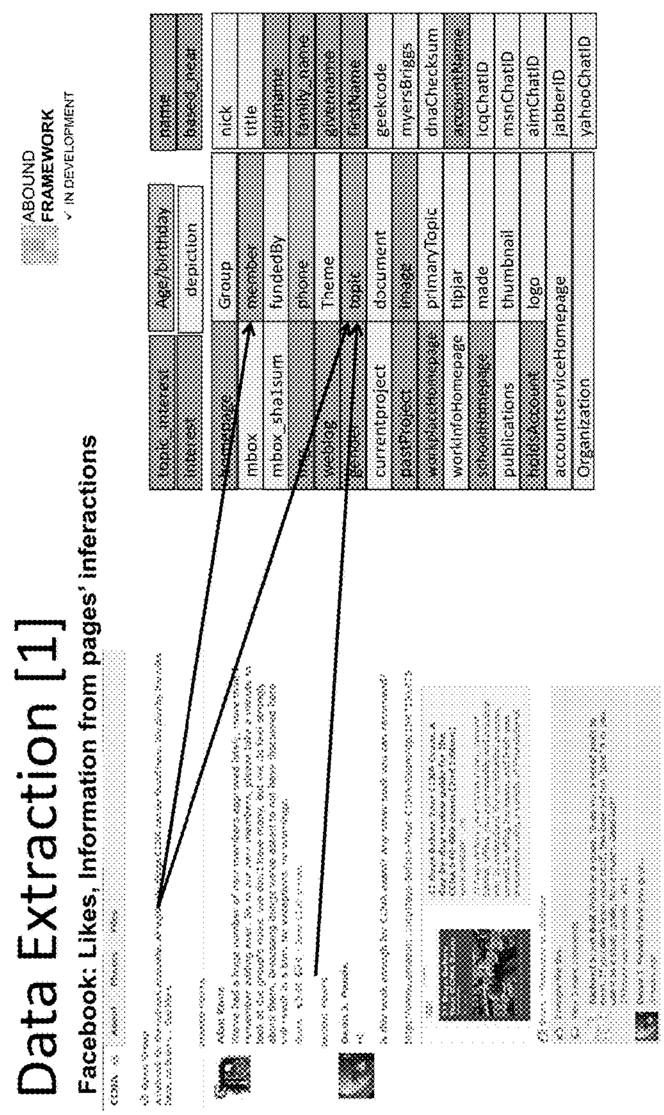
Figure 50:
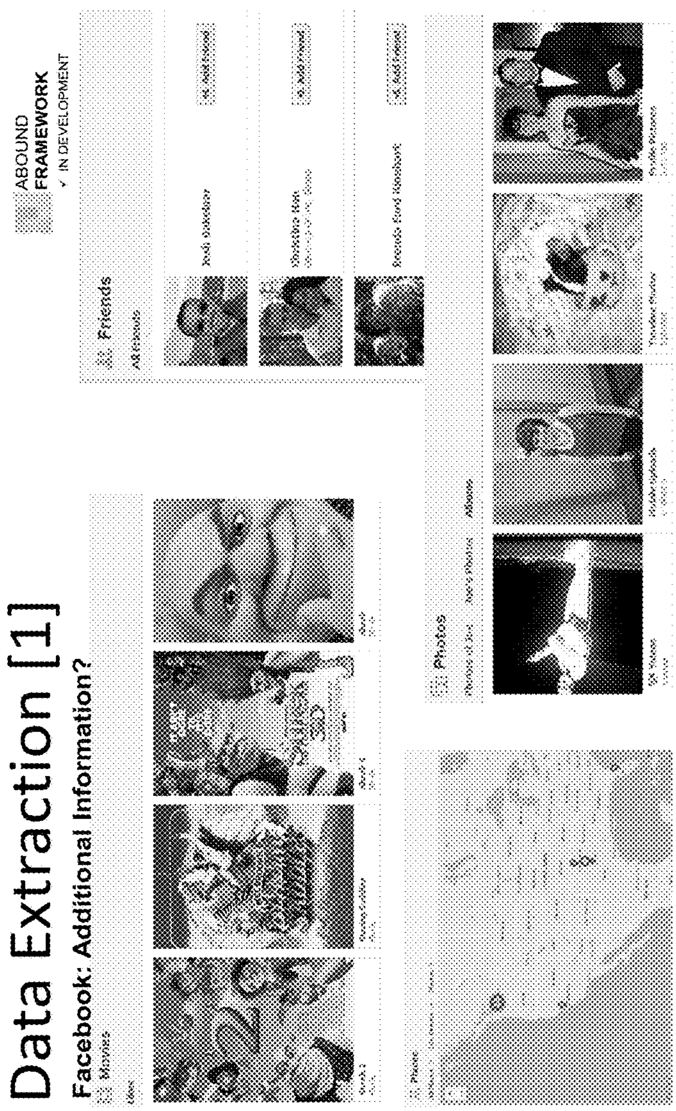
Figure 51:
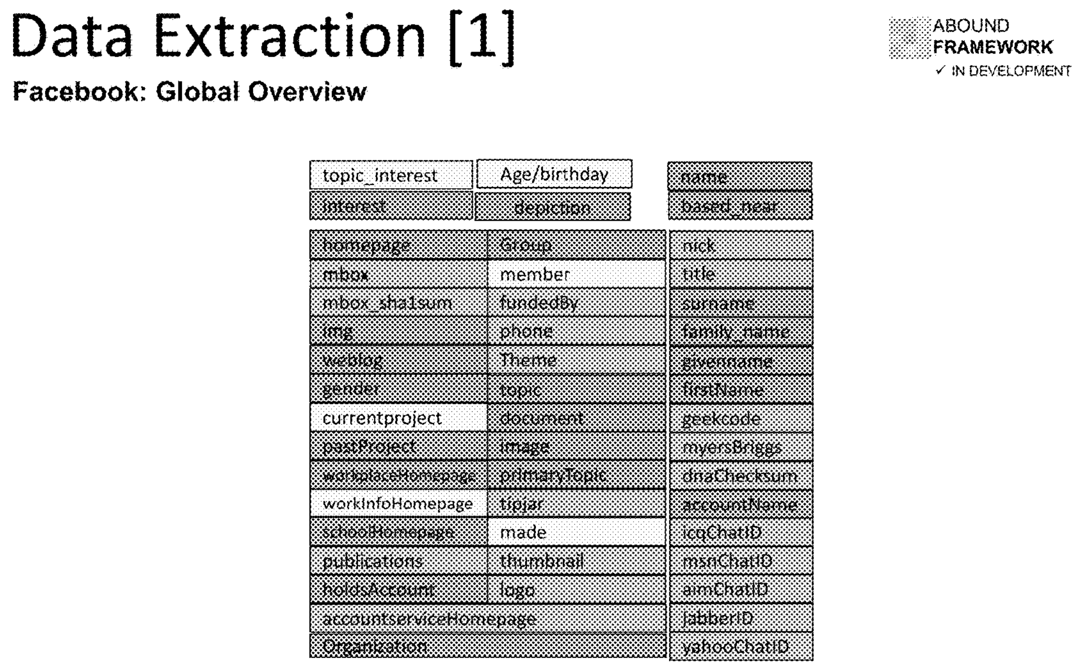
Figure 53:
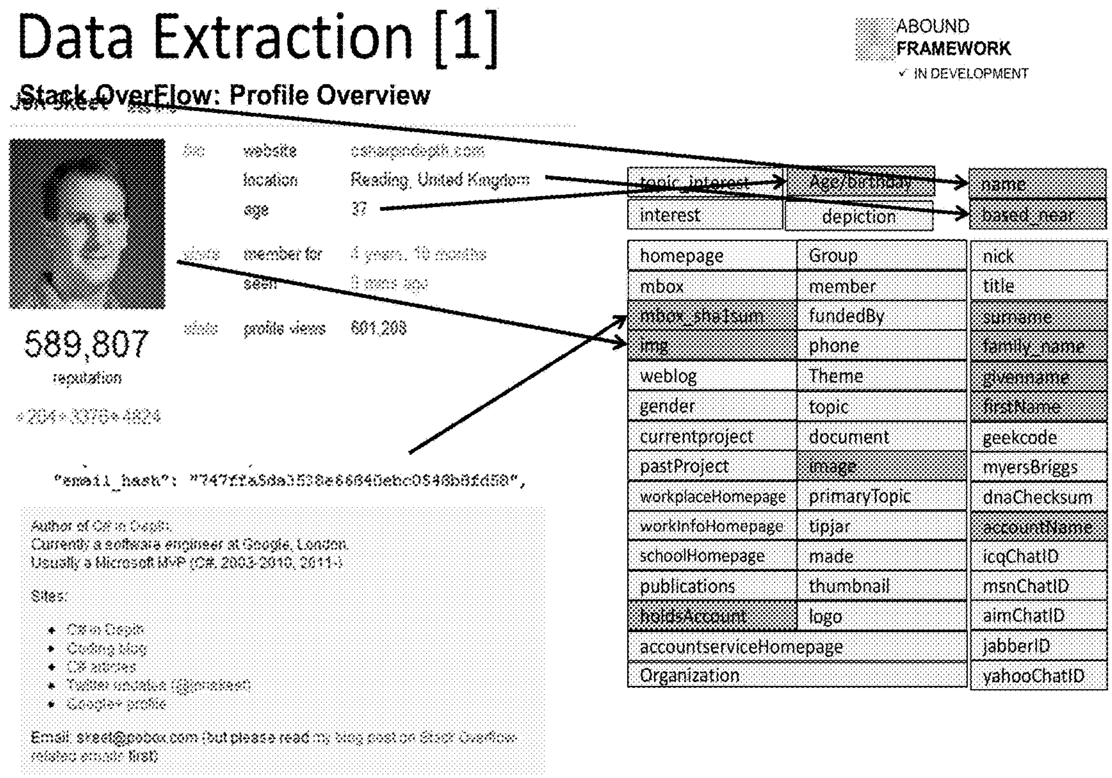
Figure 54:
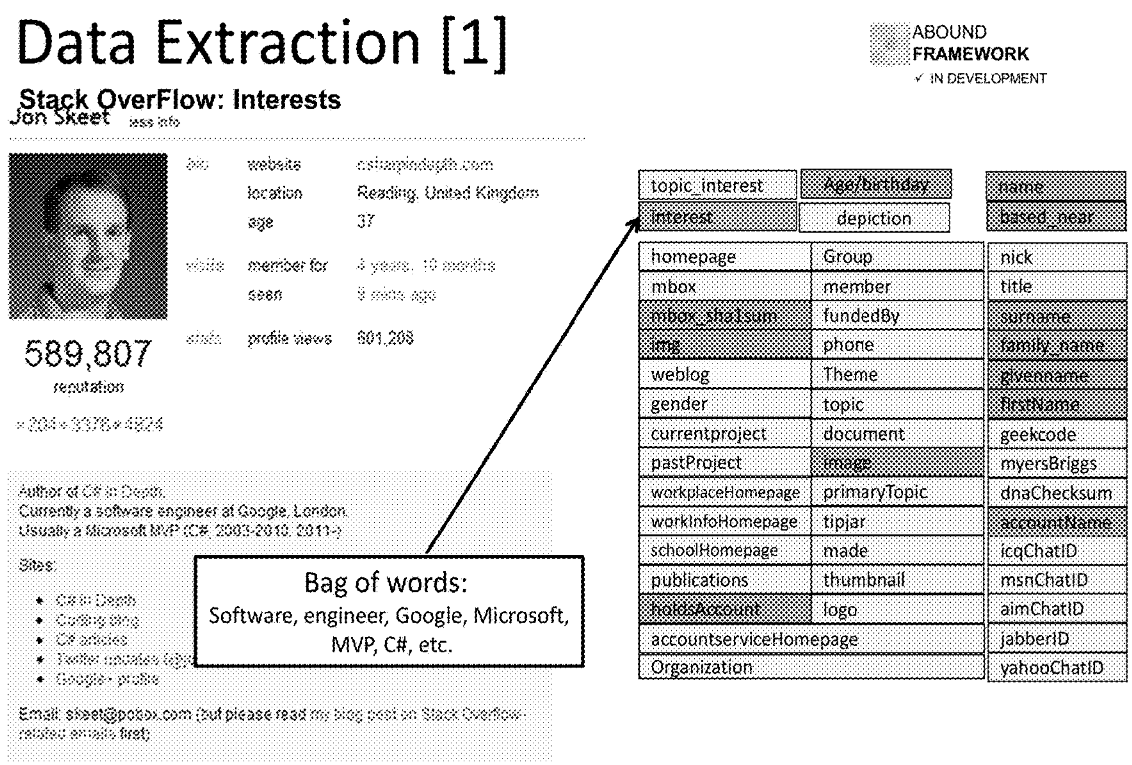
Figure 55:
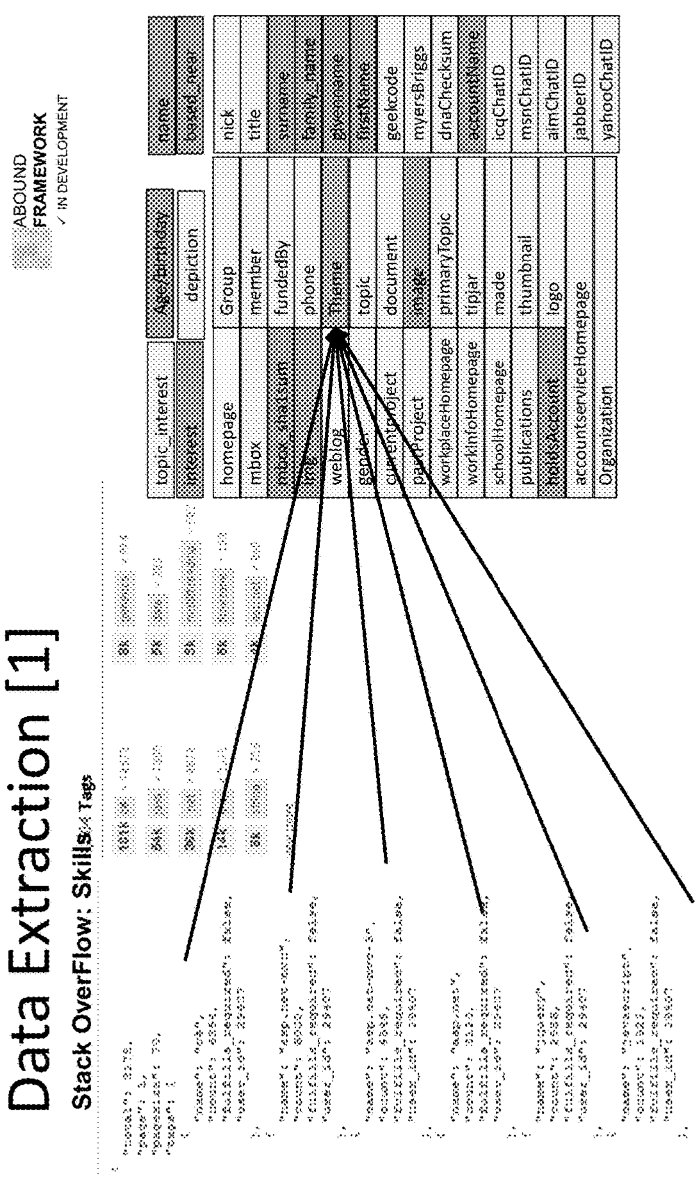
Figure 56:
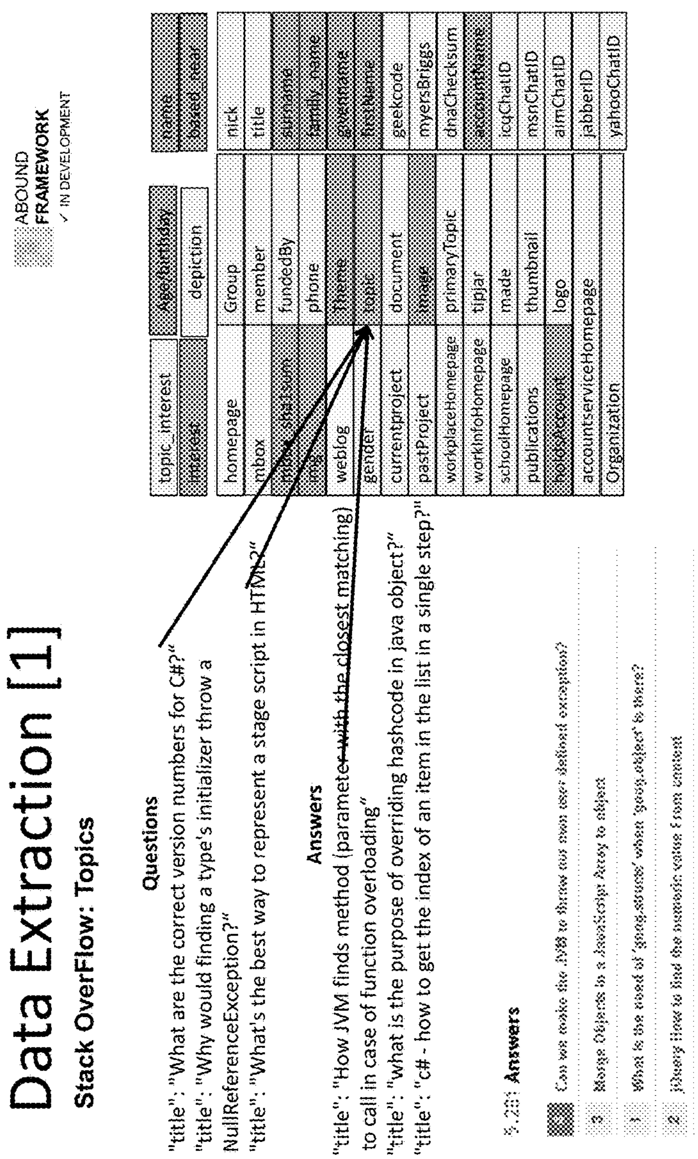

FIG. 18 shows a block diagram illustrating profile representation embodiments for Abound.

FIGS. 19-25 show block data extraction diagrams illustrating embodiments of a Twitter Data Extraction for Abound.

FIGS. 26-32 show block data extraction diagrams illustrating embodiments of a LinkedIn Data Extraction for Abound.

FIGS. 33-37 show block data extraction diagrams illustrating embodiments of a Github Data Extraction for Abound.

FIGS. 38-43 show block data extraction diagrams illustrating embodiments of a Google+ Data Extraction for Abound.

FIGS. 44-51 show block data extraction diagrams illustrating embodiments of a Facebook Data Extraction for Abound.

FIGS. 52-57 show block data extraction diagrams illustrating embodiments of a Stack OverFlow Data Extraction for Abound.

FIGS. 58-59 shows exemplary diagrams illustrating embodiments of an Attributes' Extraction Summary for various social networks for Abound.

Figure 60:
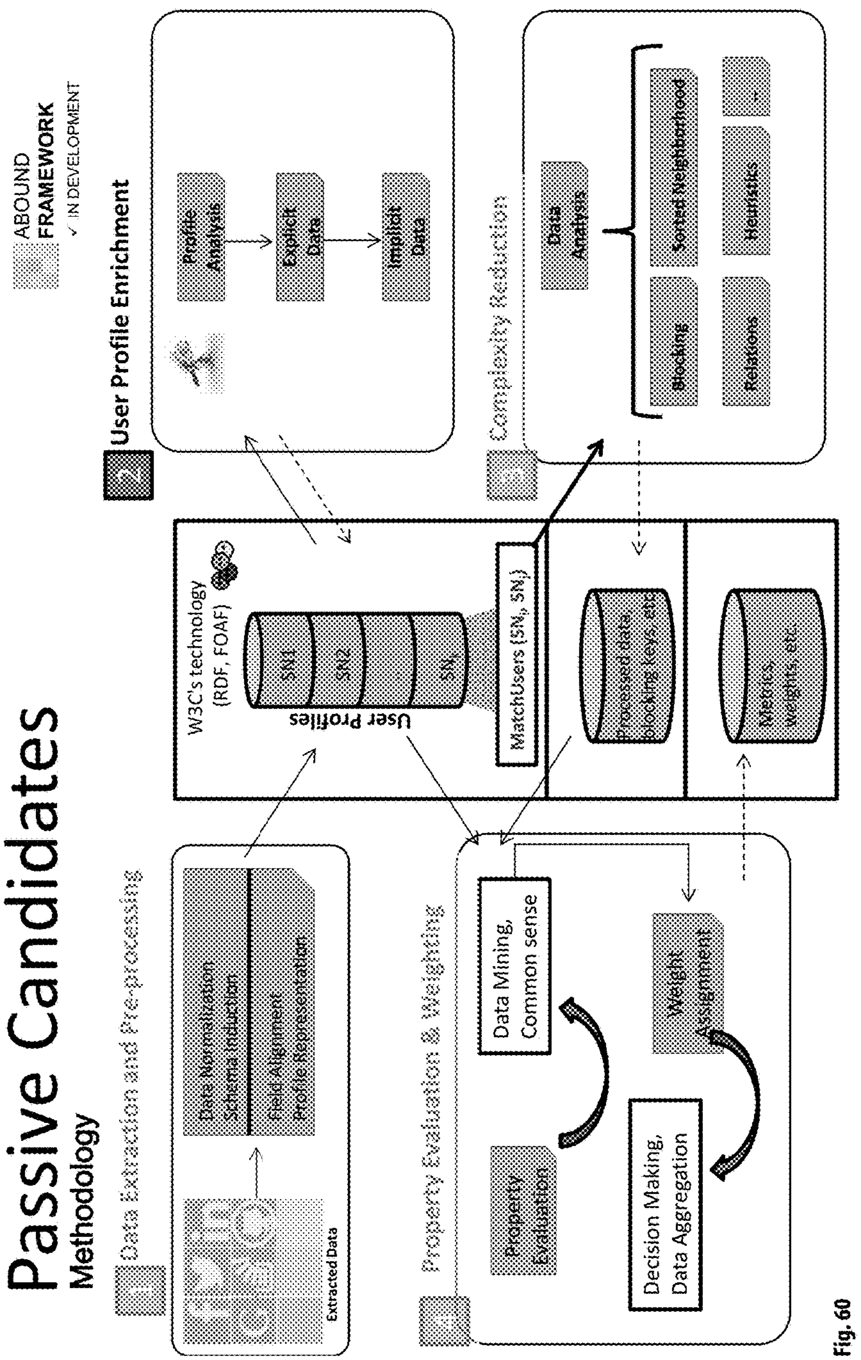
FIGS. 60-61 show user profile enrichment block diagrams of embodiments for Abound.
Figure 61:
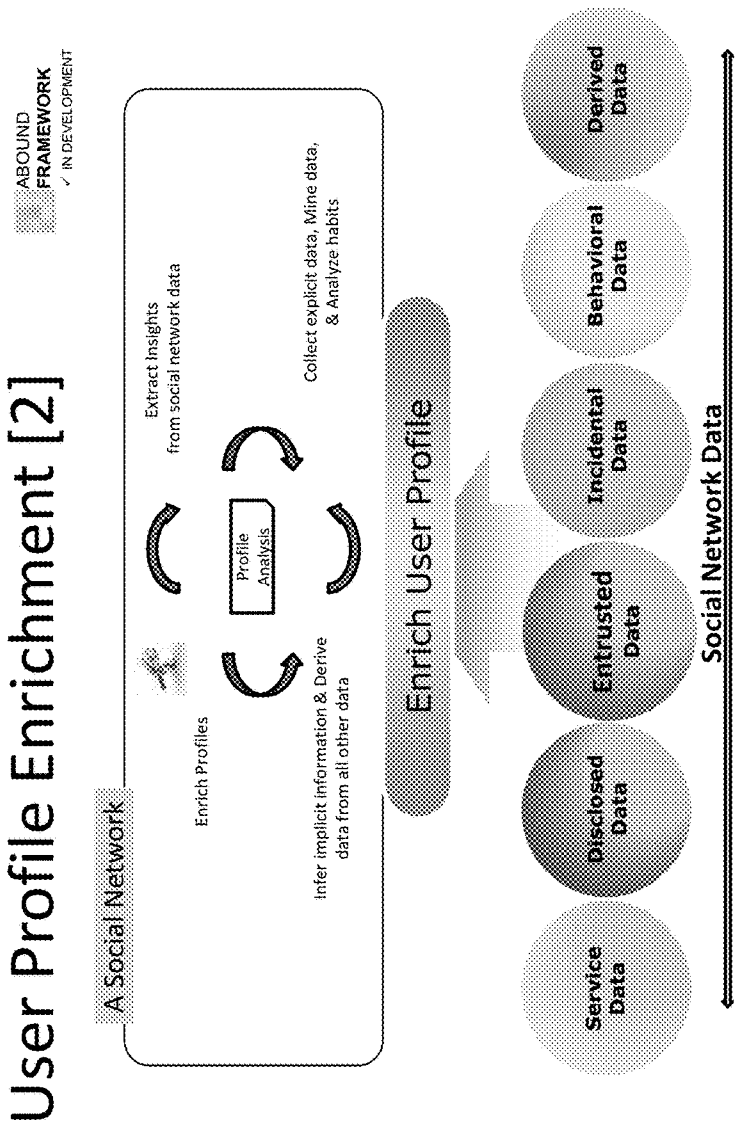
Figure 62:
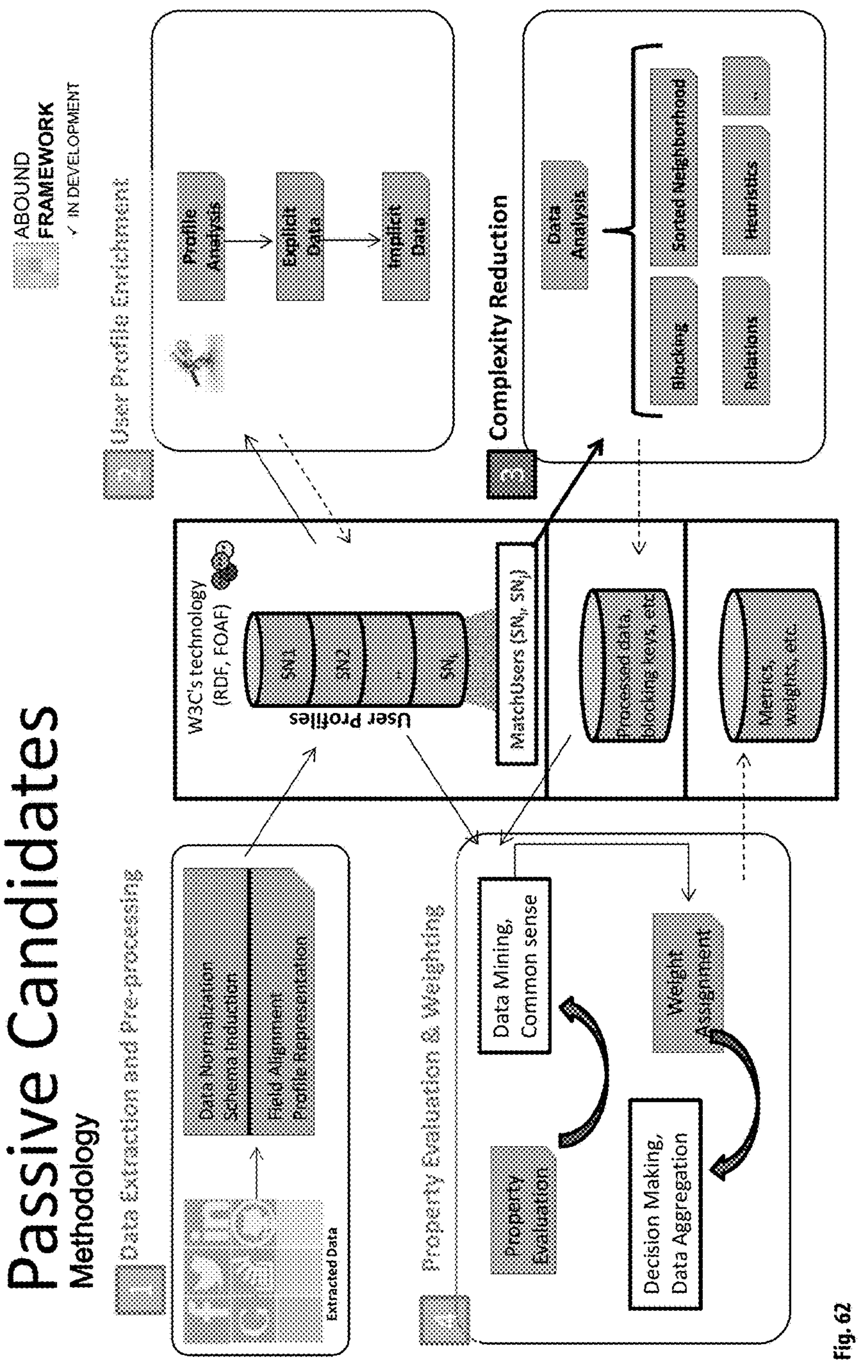
Figure 66:
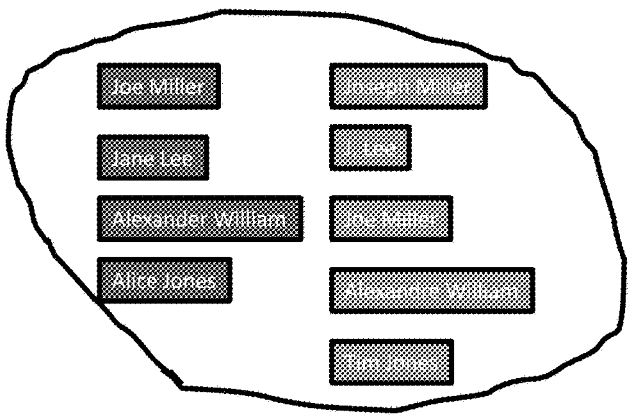
Figure 68:
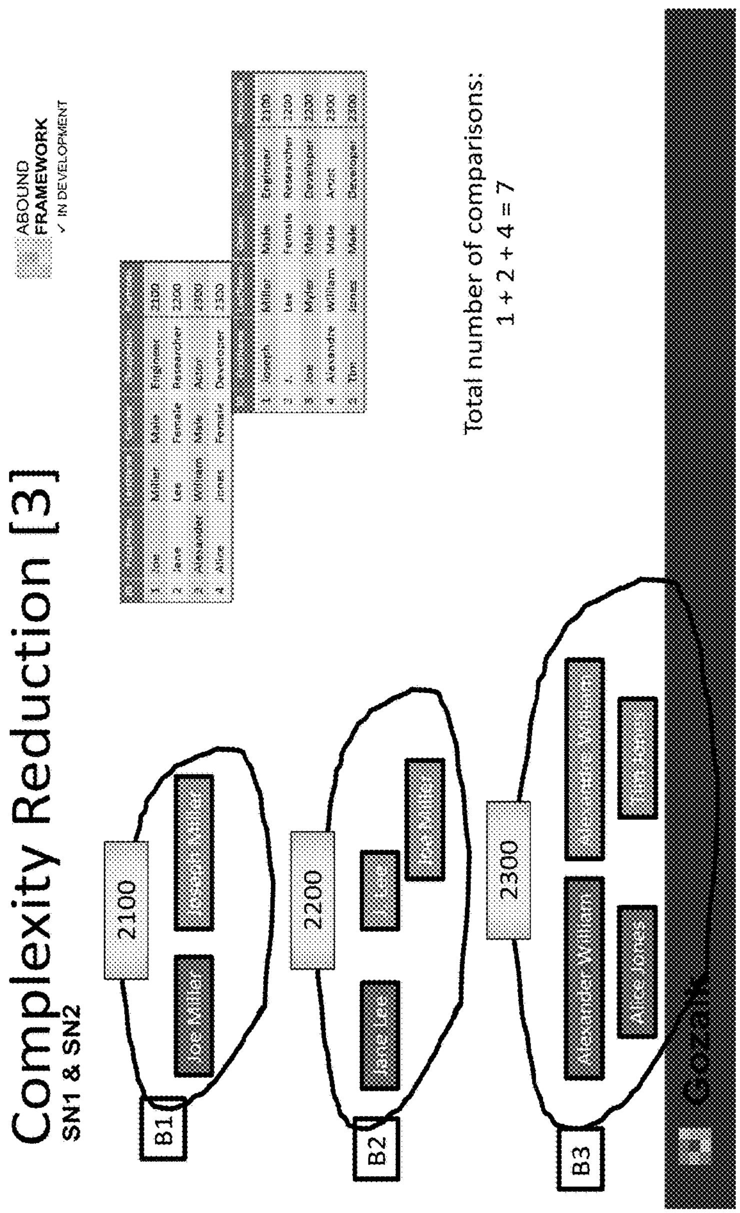
Figure 71:
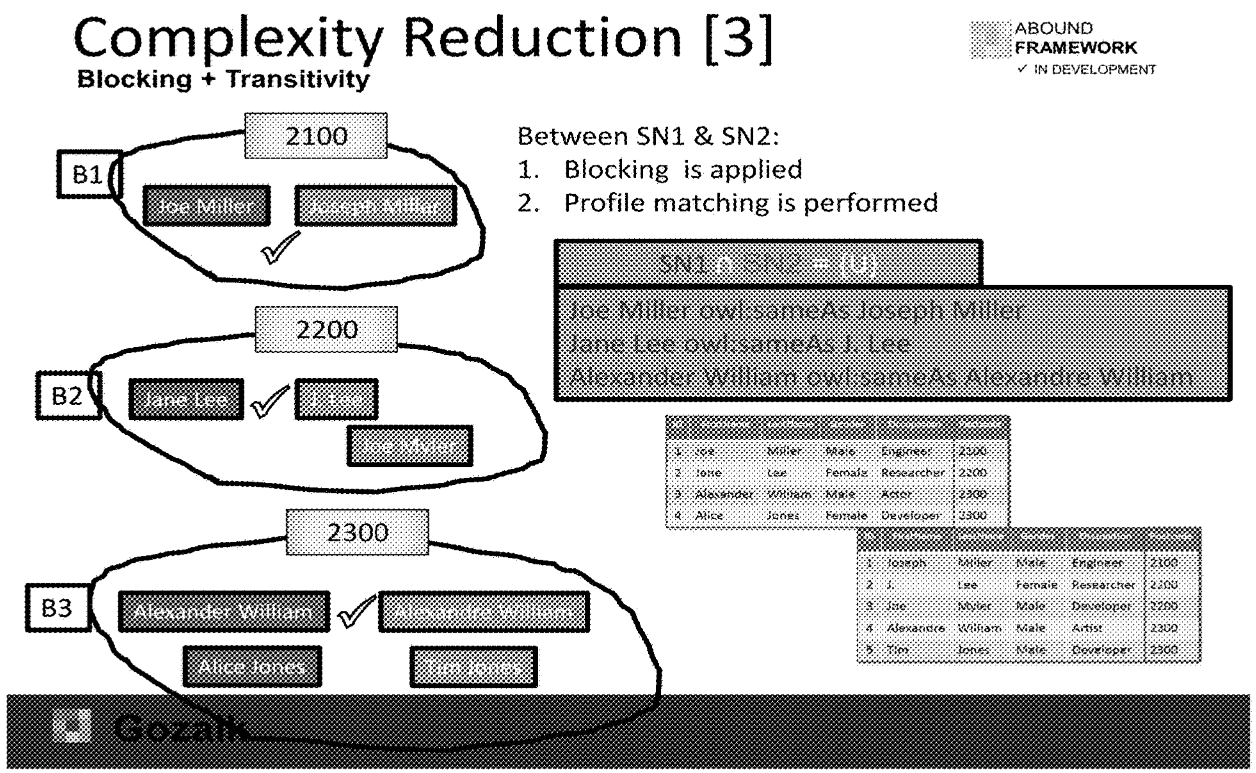
Figure 73:
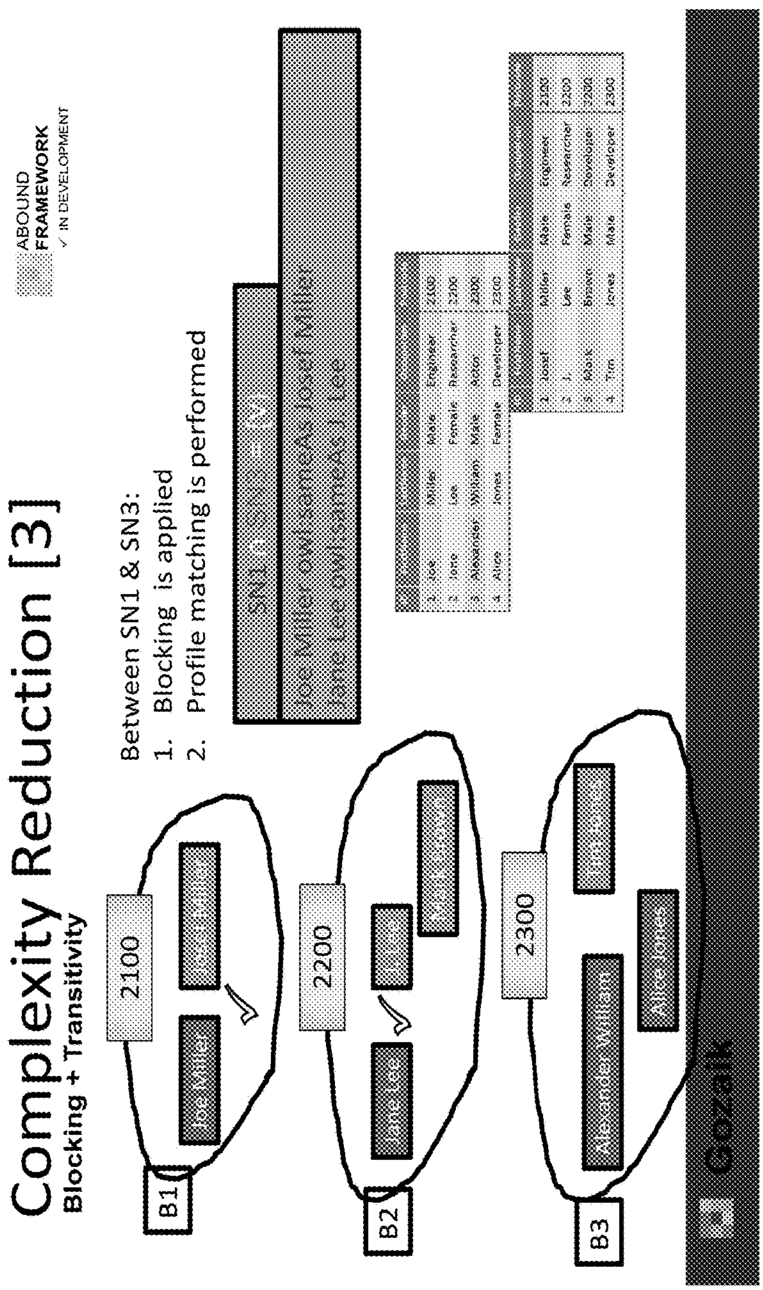
Figure 75:
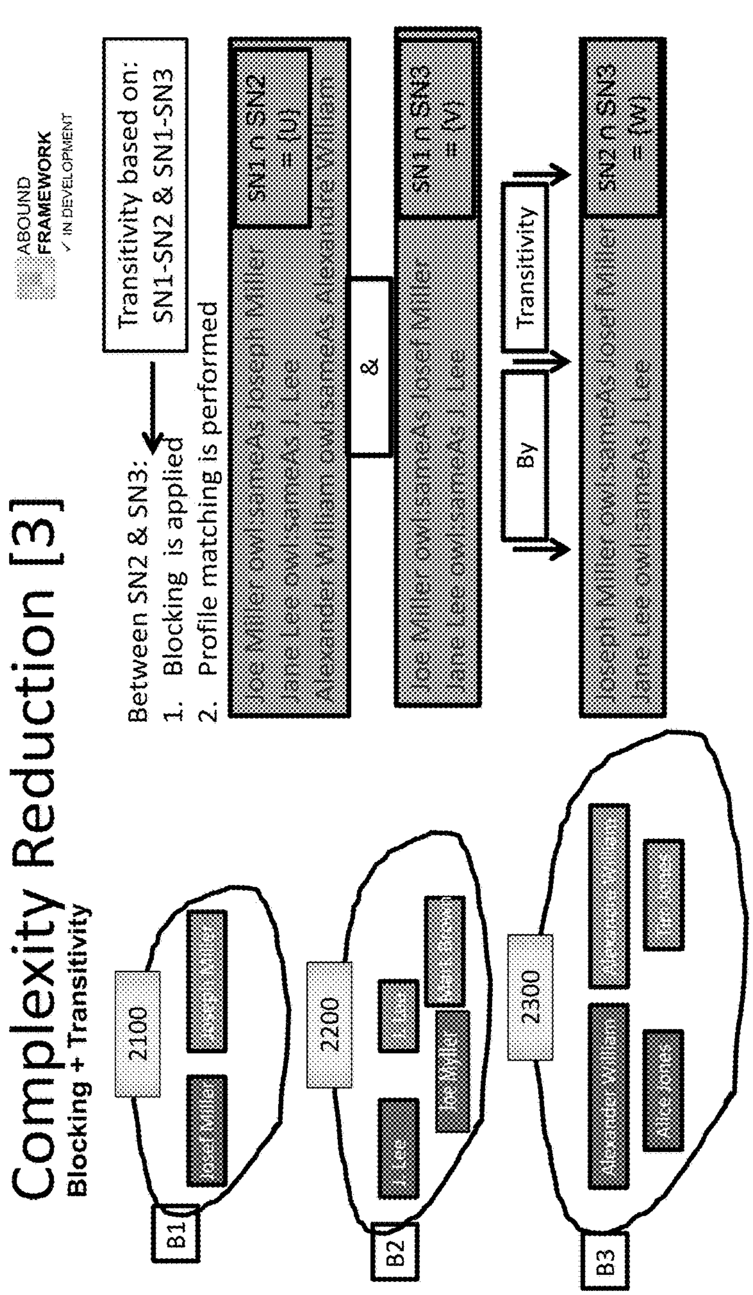
Figure 76:
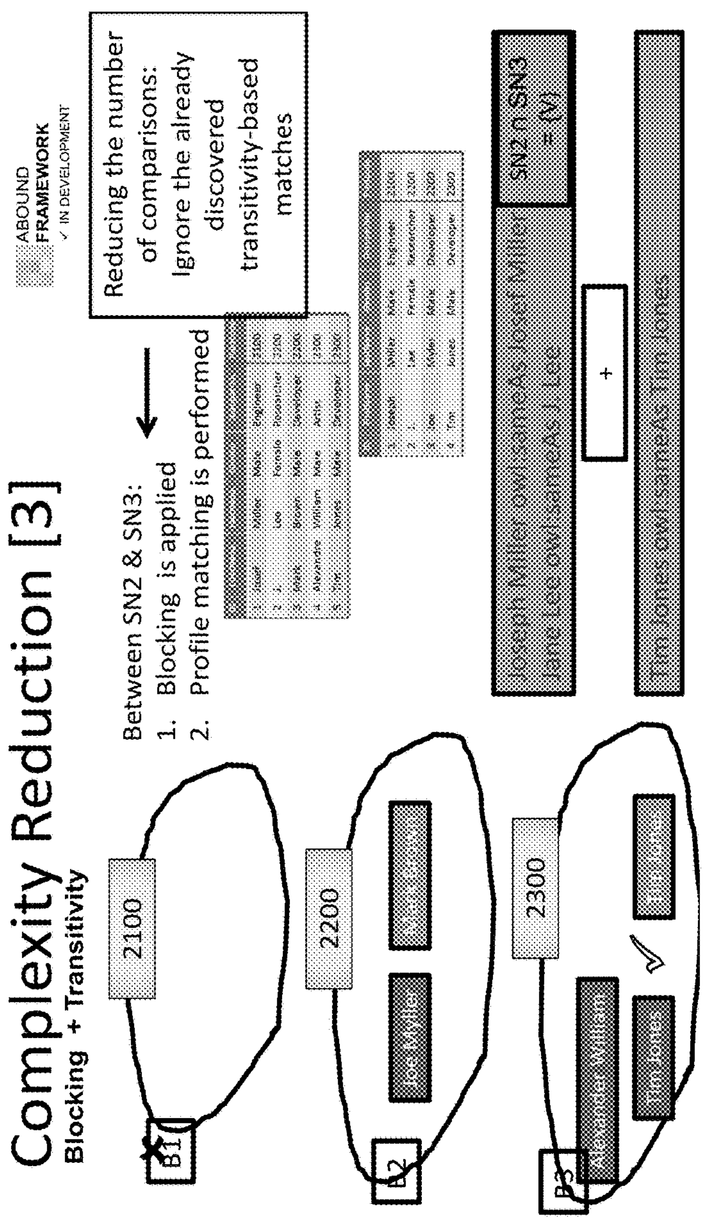
Figure 77:
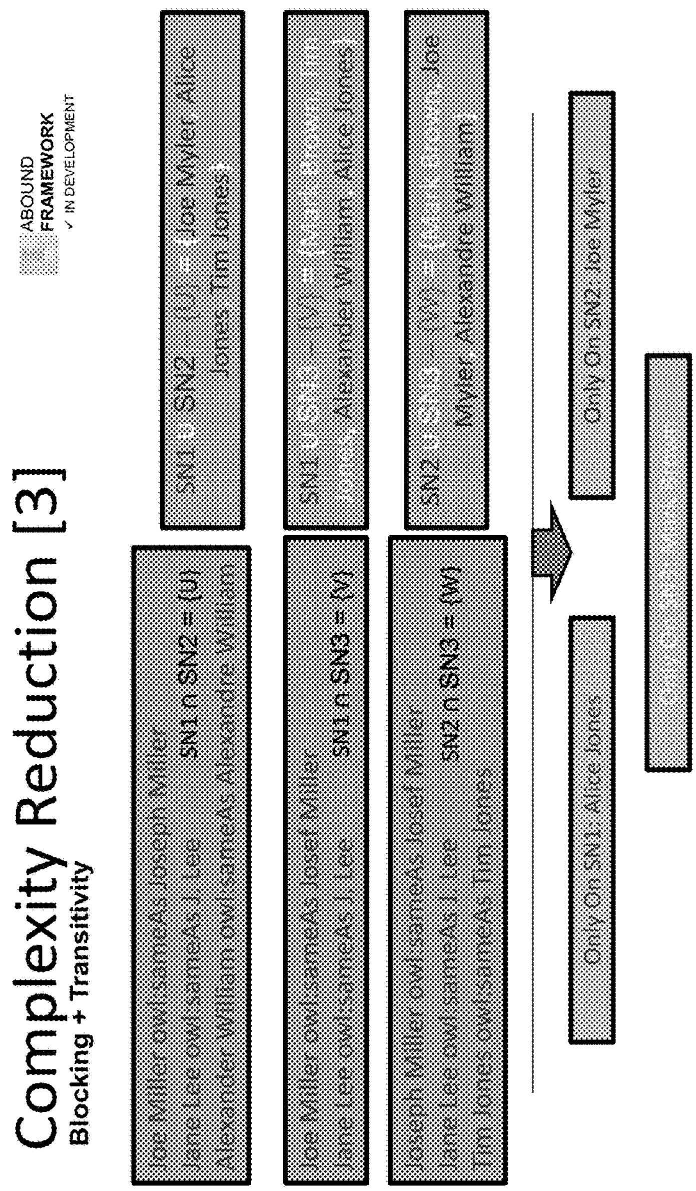
Figure 79:
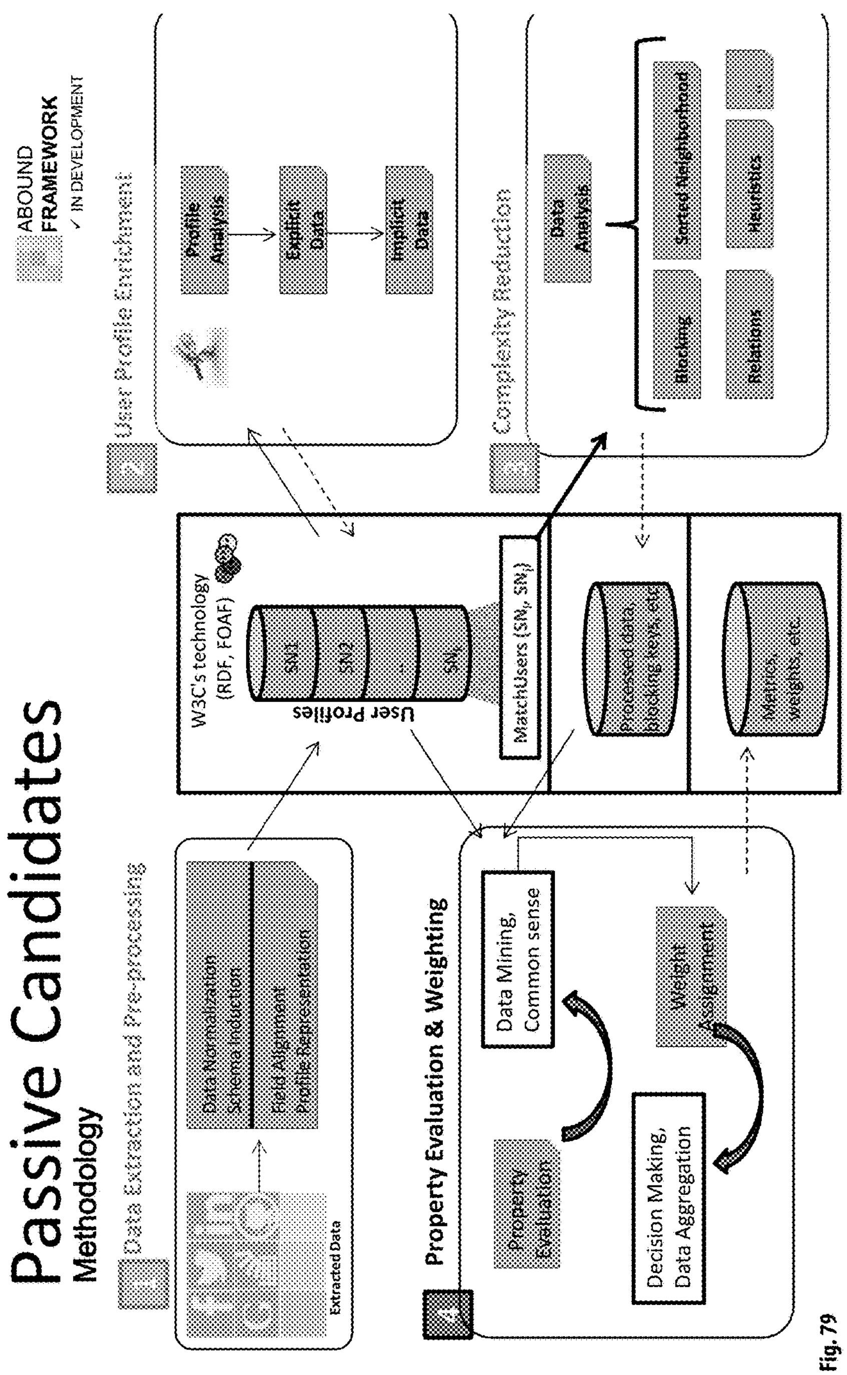
FIGS. 79-83 show property weighting block diagrams of embodiments for Abound.
Figure 80:
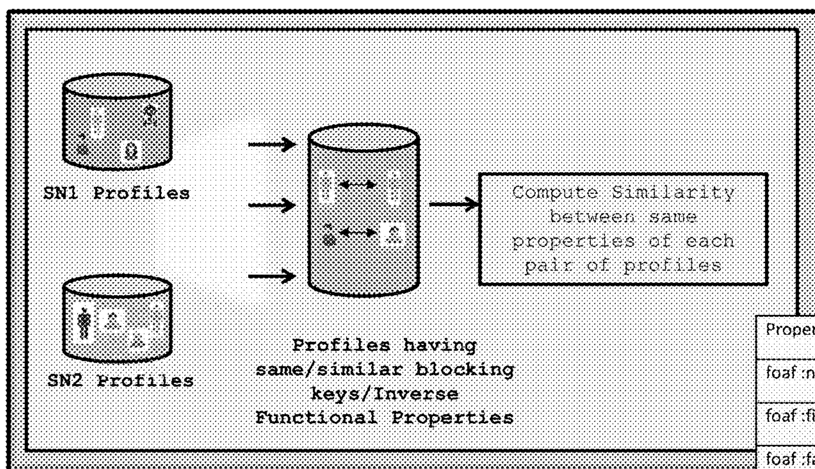
Figure 81:
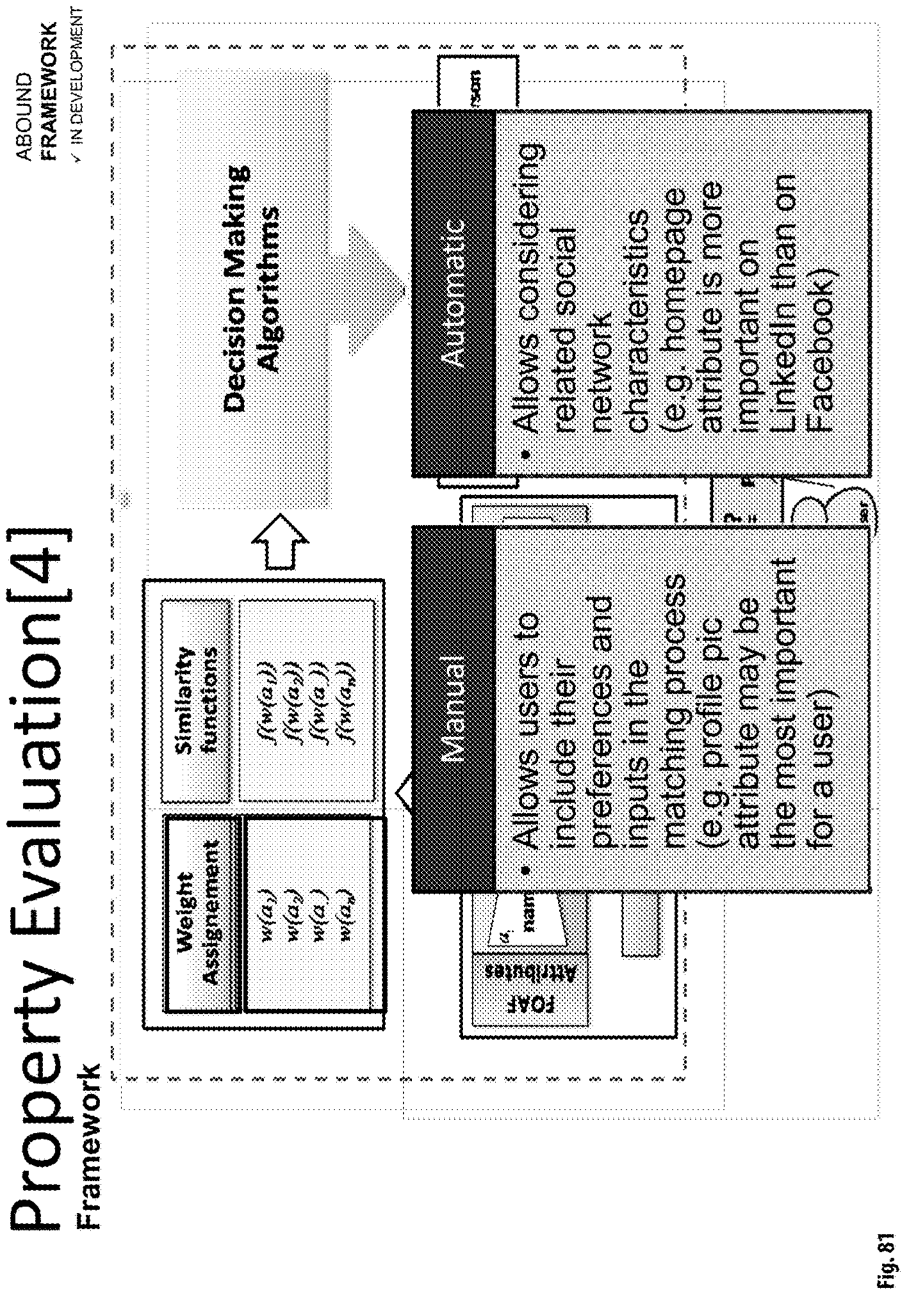
Figure 82:
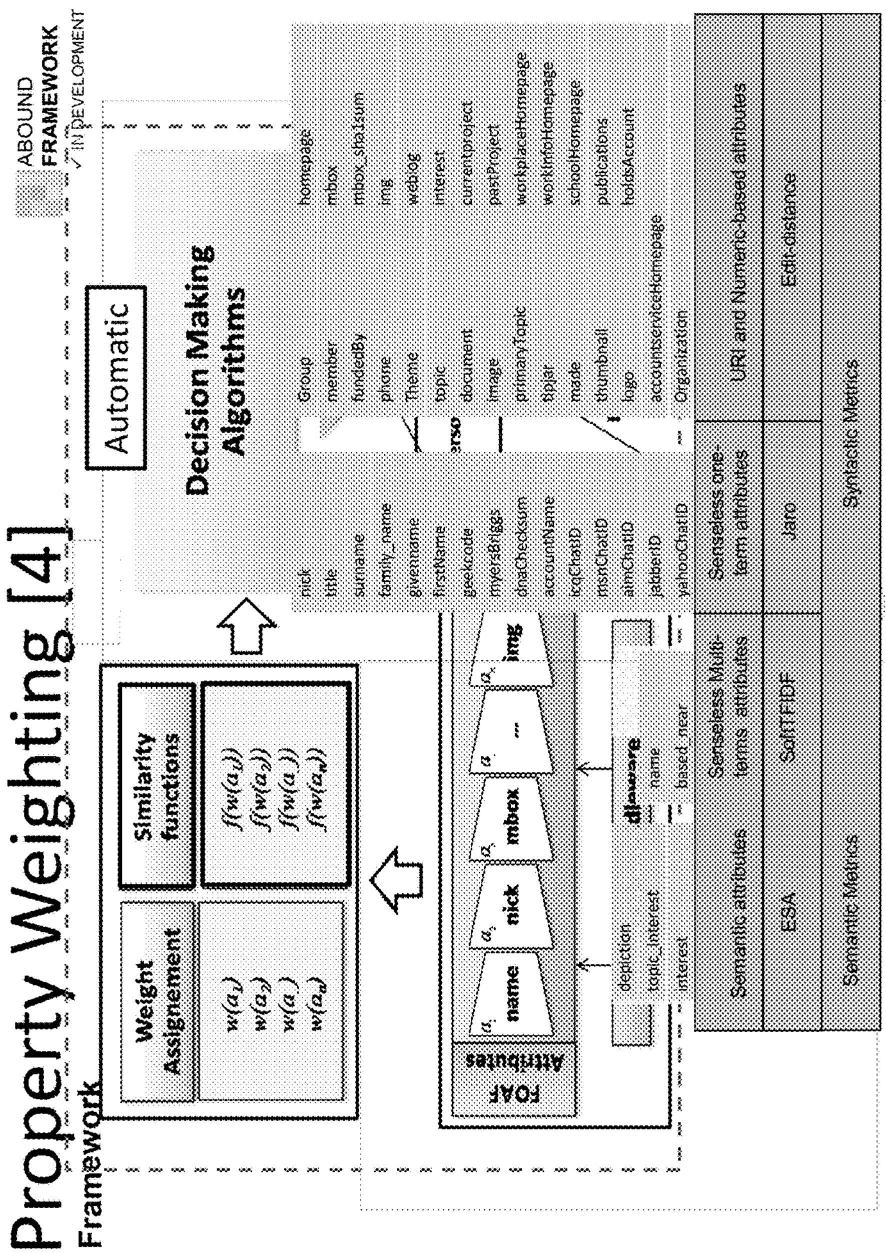
Figure 83:
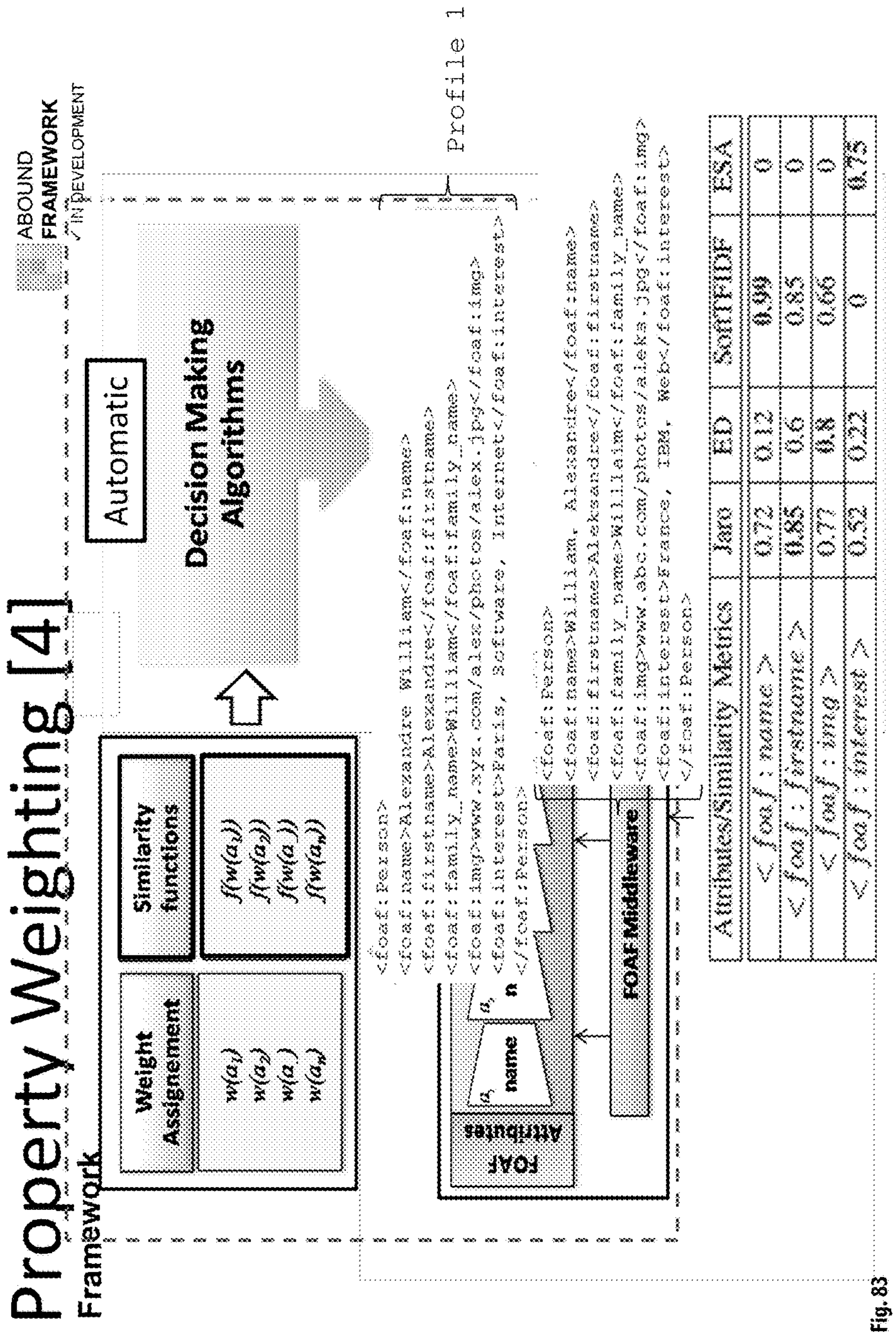

FIGS. 60-61 show user profile enrichment block diagrams of embodiments for Abound.

FIGS. 62-78 show complexity reduction block diagrams of embodiments for Abound.

FIGS. 79-83 show property weighting block diagrams of embodiments for Abound.

Figure 84:
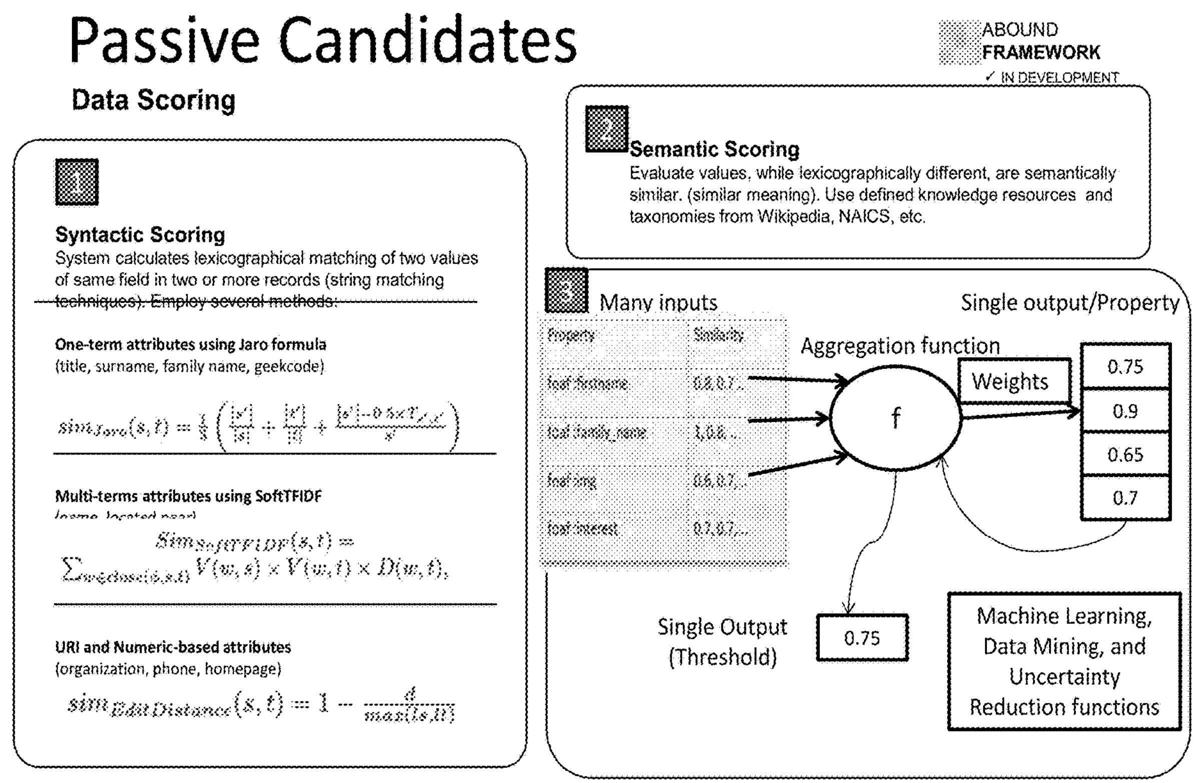
FIG. 84 shows a data scoring block diagram of embodiments for Abound.
Figure 85:
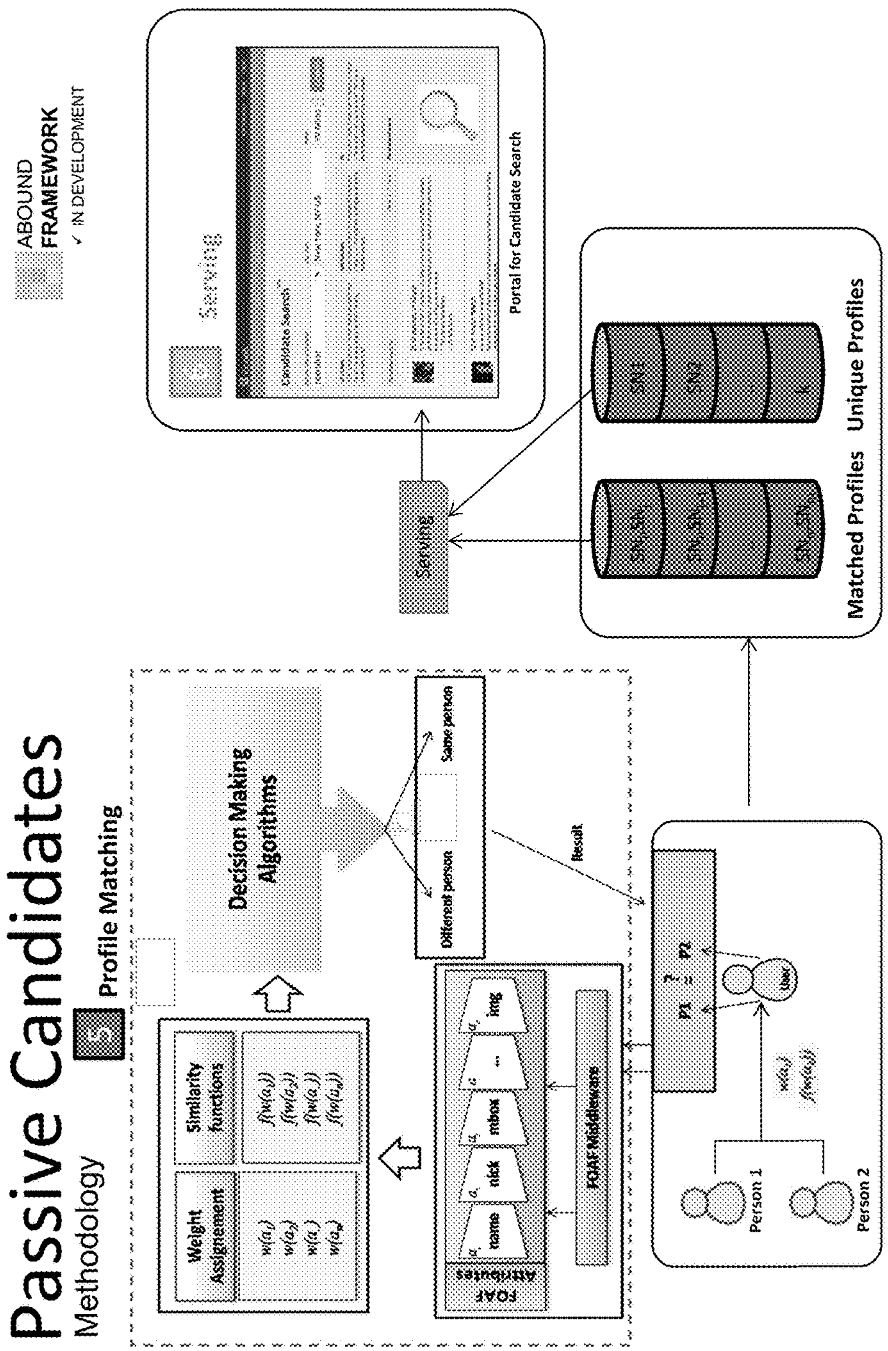
Figure 86:
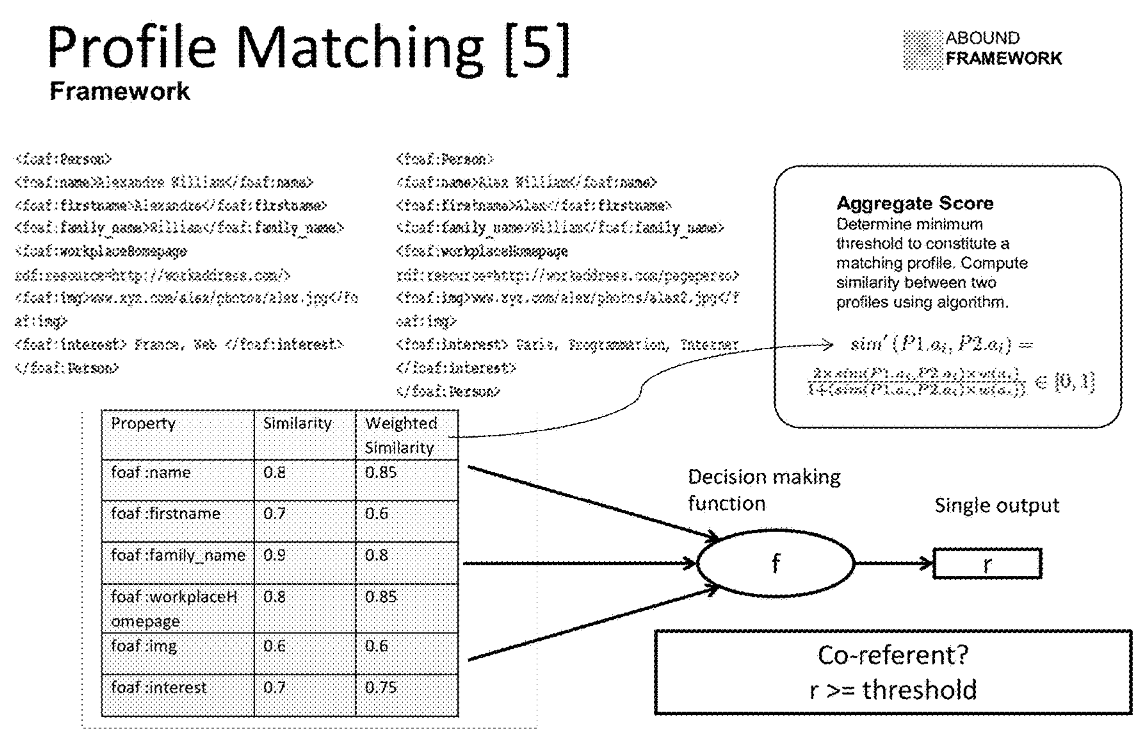
Figure 92:
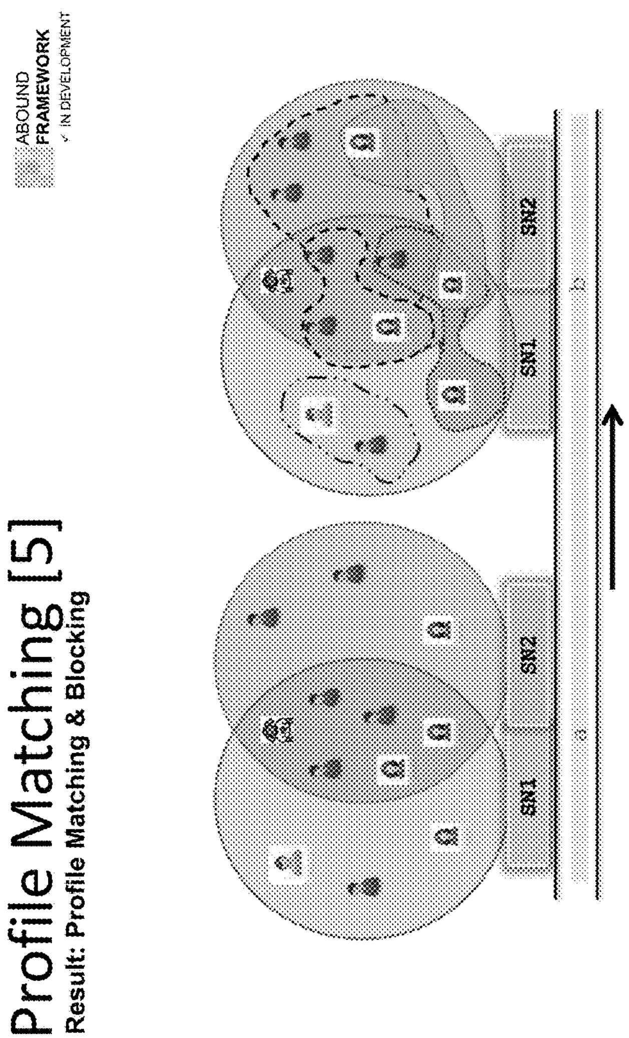

FIG. 84 shows a data scoring block diagram of embodiments for Abound.

FIGS. 85-92 shows profile matching block diagrams of embodiments for Abound.

Figure 93:
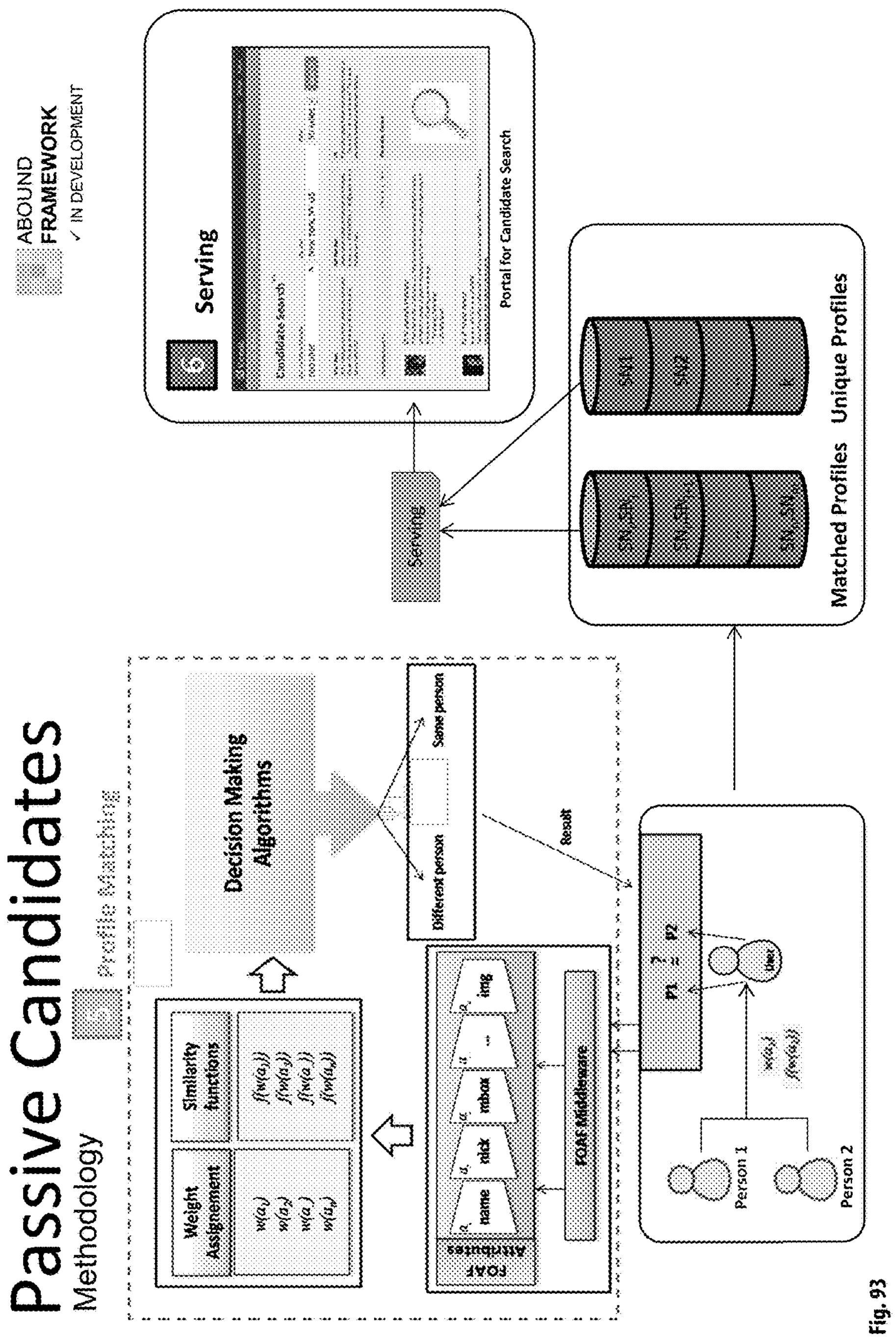
FIG. 93 shows a serving block diagram of embodiments for Abound.

FIG. 93 shows a serving block diagram of embodiments for Abound.

Figure 94:
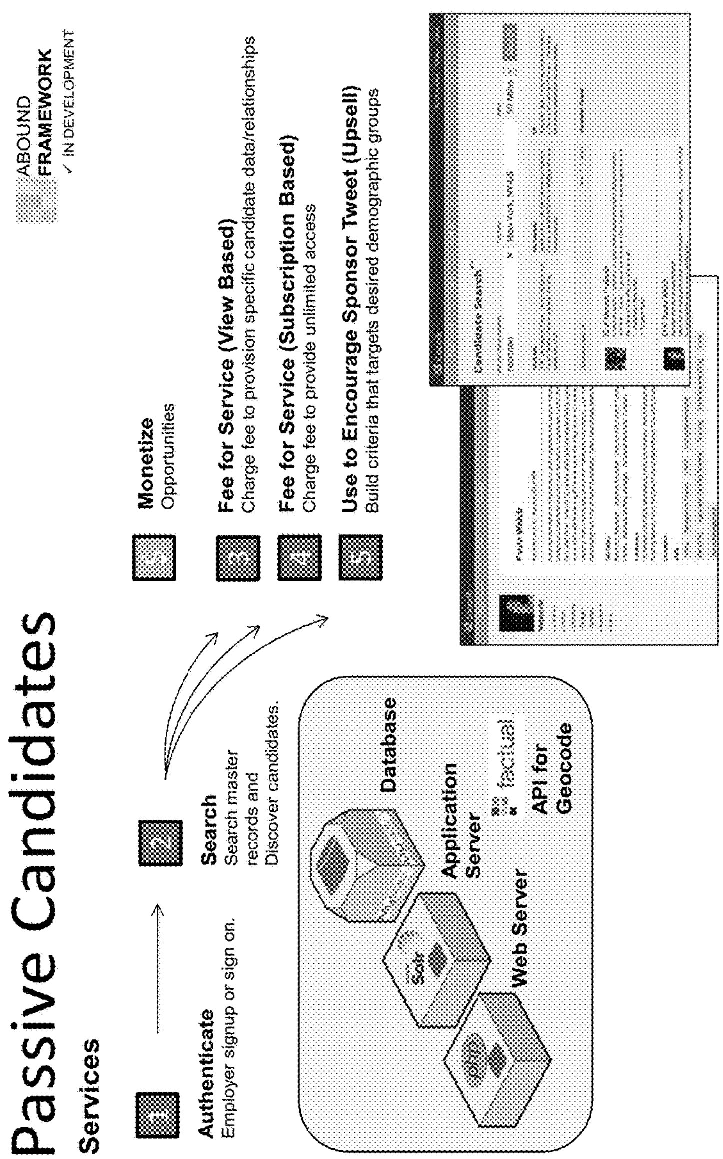
FIG. 94 shows various services of embodiments for Abound.

FIG. 94 shows various services of embodiments for Abound.

FIG. 95 shows data polling considerations of embodiments for Abound.

Abound Controller

FIG. 96 shows a block diagram illustrating embodiments of a Abound controller. In this embodiment, Abound controller 9601 may serve to aggregate, process, store, search, serve, identify, instruct, generate, match, and/or facilitate interactions with a computer through database and search technologies, and/or other related data.

Typically, users, which may be people and/or other systems, may engage information technology systems (e.g., computers) to facilitate information processing. In turn, computers employ processors to process information; such processors 9603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 9629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, Abound controller 9601 may be connected to and/or communicate with entities such as, but not limited to: one or more users from user input devices 9611; peripheral devices 9612; an optional cryptographic processor device 9628; and/or a communications network 9613.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

Abound controller 9601 may be based on computer systems that may comprise, but are not limited to, components such as: a computer systemization 9602 connected to memory 9629.

Computer Systemization

A computer systemization 9602 may comprise a clock 9630, central processing unit ("CPU(s)" and/or "processor(s)" (these terms are used interchangeable throughout the disclosure unless noted to the contrary)) 9603, a memory 9629 (e.g., a read only memory (ROM) 9606, a random access memory (RAM) 9605, etc.), and/or an interface bus 9607, and most frequently, although not necessarily, are all interconnected and/or communicating through a system bus 9604 on one or more (mother)board(s) 9602 having conductive and/or otherwise transportive circuit pathways through which instructions (e.g., binary encoded signals) may travel to effectuate communications, operations, storage, etc. The computer systemization may be connected to a power source 9686; e.g., optionally the power source may be internal. Optionally, a cryptographic processor 9626 may be connected to the system bus. In another embodiment, the cryptographic processor and/or transceivers (e.g., ICs) 9674 may be connected as either internal and/or external peripheral devices 9612 via the interface bus I/O 9608 (not pictured) and/or directly via the interface bus 9607. In turn, the transceivers may be connected to antenna(s) 9675, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4750IUB8 receiver chip (e.g., GPS); a Broadcom BCM4335 transceiver chip (e.g., providing 2G, 3G, and 4G long-term evolution (LTE) cellular communications; 802.11 ac, Bluetooth 4.0 low energy (LE) (e.g., beacon features)); an Infineon Technologies X-Gold 618-PMB9800 transceiver chip (e.g., providing 2G/3G HSDPA/HSUPA communications); a MediaTek MT6620 transceiver chip (e.g., providing 802.11a/b/g/n, Bluetooth 4.0 LE, FM, global positioning system (GPS) (thereby allowing Abound controller to determine its location); a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large mainframe computers, down to mini computers, servers, desktop computers, laptops, netbooks, tablets (e.g., iPads, Android and Windows tablets, etc.), mobile smartphones (e.g., iPhones, Android and Windows phones, etc.), wearable devise (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 9629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within Abound controller and beyond through various interfaces. Should processing requirements dictate a greater amount speed and/or capacity, distributed processors (e.g., Distributed Abound), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of Abound may be achieved by implementing a microcontroller such as CAST's R8051XC2 microcontroller; Intel's MCS 51 (i.e., 8051 microcontroller); and/or the like. Also, to implement certain features of Abound, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of Abound component collection (distributed or otherwise) and/or features may be implemented via the microprocessor and/or via embedded components; e.g., via ASIC, coprocessor, DSP, FPGA, and/or the like. Alternately, some implementations of Abound may be implemented with embedded components that are configured and used to achieve a variety of features or signal processing.

Depending on the particular implementation, the embedded components may include software solutions, hardware solutions, and/or some combination of both hardware/software solutions. For example, Abound features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of Abound features. A hierarchy of programmable interconnects allow logic blocks to be interconnected as needed by Abound system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, Abound may be developed on regular FPGAs and then migrated into a fixed version that more resembles ASIC implementations. Alternate or coordinating implementations may migrate Abound controller features to a final ASIC instead of or in addition to FPGAs. Depending on the implementation all of the aforementioned embedded components and microprocessors may be considered the "CPU" and/or "processor" for Abound.

Power Source

The power source 9686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 9686 is connected to at least one of the interconnected subsequent components of Abound thereby providing an electric current to all subsequent components. In one example, the power source 9686 is connected to the system bus component 9604. In an alternative embodiment, an outside power source 9686 is provided through a connection across the I/O 9608 interface. For example, a USB and/or IEEE 1394 connection carries both data and power across the connection and is therefore a suitable source of power.

Interface Adapters

Interface bus(ses) 9607 may accept, connect, and/or communicate to a number of interface adapters, conventionally although not necessarily in the form of adapter cards, such as but not limited to: input output interfaces (I/O) 9608, storage interfaces 9609, network interfaces 9610, and/or the like. Optionally, cryptographic processor interfaces 9627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X), PCI Express, Personal Computer Memory Card International Association (PCMCIA), and/or the like.

Storage interfaces 9609 may accept, communicate, and/or connect to a number of storage devices such as, but not limited to: storage devices 9614, removable disc devices, and/or the like. Storage interfaces may employ connection protocols such as, but not limited to: (Ultra) (Serial) Advanced Technology Attachment (Packet Interface) ((Ultra) (Serial) ATA(PI)) (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 9610 may accept, communicate, and/or connect to a communications network 9613. Through a communications network 9613, Abound controller is accessible through remote clients 9633*b* (e.g., computers with web browsers) by users 9633*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., Distributed Abound), architectures may similarly be employed to pool, load balance, and/or otherwise decrease/increase the communicative bandwidth required by Abound controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 9610 may be used to engage with various communications network types 9613. For example, multiple network interfaces may be employed to allow for the communication over broadcast, multicast, and/or unicast networks.

Input Output interfaces (I/O) 9608 may accept, communicate, and/or connect to user input devices 9611, peripheral devices 9612, cryptographic processor devices 9628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 9611 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 9612 may be connected and/or communicate to I/O and/or other facilities of the like such as network interfaces, storage interfaces, directly to the interface bus, system bus, the CPU, and/or the like. Peripheral devices may be external, internal and/or part of Abound controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, Abound controller may be embodied as an embedded, dedicated, and/or monitor-less (i.e., headless) device, wherein access would be provided over a network interface connection.

Cryptographic units such as, but not limited to, microcontrollers, processors 9626, interfaces 9627, and/or devices 9628 may be attached, and/or communicate with Abound controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 9629. However, memory is a fungible technology and resource, thus, any number of memory embodiments may be employed in lieu of or in concert with one another. It is to be understood that Abound controller and/or a computer systemization may employ various forms of memory 9629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 9629 will include ROM 9606, RAM 9605, and a storage device 9614. A storage device 9614 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 9629 may contain a collection of program and/or database components and/or data such as, but not limited to: operating system component(s) 9615 (operating system); information server component(s) 9616 (information server); user interface component(s) 9617 (user interface); Web browser component(s) 9618 (Web browser); database(s) 9619; mail server component(s) 9621; mail client component(s) 9622; cryptographic server component(s) 9620 (cryptographic server); Abound component(s) 9635; and/or the like (i.e., collectively a component collection). These components may be stored and accessed from the storage devices and/or from storage devices accessible through an interface bus. Although non-conventional program components such as those in the component collection, typically, are stored in a local storage device 9614, they may also be loaded and/or stored in memory such as:

peripheral devices, RAM, remote storage facilities through a communications network, ROM, various forms of memory, and/or the like.

Operating System

The operating system component 9615 is an executable program component facilitating the operation of Abound controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow Abound controller to communicate with other entities through a communications network 9613. Various communication protocols may be used by Abound controller as a subcarrier transport mechanism for interaction, such as, but not limited to: multicast, TCP/IP, UDP, unicast, and/or the like.

Information Server

An information server component 9616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on Abound controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with Abound database 9619, operating systems, other program components, user interfaces, Web browsers, and/or the like.

Access to Abound database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by Abound. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to Abound as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome; Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 9617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 9618 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from Abound enabled nodes. The combined application may be nugatory on systems employing standard Web browsers.

Mail Server

A mail server component 9621 is a stored program component that is executed by a CPU 9603. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to Abound.

Access to Abound mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 9622 is a stored program component that is executed by a CPU 9603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 9620 is a stored program component that is executed by a CPU 9603, cryptographic processor 9626, cryptographic processor interface 9627, cryptographic processor device 9628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, Abound may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable Abound component to engage in secure transactions if so desired. The cryptographic component facilitates the secure accessing of resources on Abound and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

Abound Database

Abound database component 9619 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, Abound database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If Abound database is implemented as a data-structure, the use of Abound database 9619 may be integrated into another component such as Abound component 9635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 9619 includes several tables 9619*a-h:*

An accounts table 9619*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 9619*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a Abound);

An devices table 9619*c* includes fields such as, but not limited to: deviceID, accountID, assetIDs, paymentIDs, deviceType, deviceName, deviceModel, deviceVersion, deviceSerialNo, deviceIPaddress, deviceMACaddress, deviceUUID, deviceLocation, deviceCertificate, deviceOS, appIDs, deviceResources, deviceSession, authKey, deviceSecureKey, walletAppinstalledFlag, deviceAccessPrivileges, device Preferences, deviceRestrictions, and/or the like;

An apps table 9619*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions and/or the like;

An assets table 9619*e* includes fields such as, but not limited to: assetID, distributorAccountID, distributorPaymentID, distributorOnwerID, assetType, assetName, assetCode, assetQuantity, assetCost, assetPrice, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, and/or the like;

A payments table 9619*f* includes fields such as, but not limited to: paymentID, accountID, userID, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An normalized_data table 9619*a* includes fields such as, but not limited to: normalizedDataID, consumerKey, consumerSecret, accessToken, accessTokenSecret, socialNetworkURL, userID, screenName, creationDate, followerCount, friendCount, timeZone, lastUpdate, insertDate, firstName, lastName, username, geoEnabled, location, place, coordinates, Description, homePageURL, listedCount, favoriteCount, verified, statusCount, language, id, idString, source, truncated, contributors, inReplyToStatus, inReplyToStatusIDSTR, inReplyToUserID, inReplyToUserIDSTR, inReplyToScreenName, retweetCount, and/or the like;

An attributized_profiles table 9619*b* includes fields such as, but not limited to: attributizedProfileID, SNUsers, SNData, location, description, followersCount, friends, statusesCount, timeZone, lastUpdate, FOAF, account, screenName, firstName, lastName, img, region, homepage, skills, person, tweets, skillTags, and/or the like;

A profileEnrichment table 9619*c* includes fields such as, but not limited to: profileEnrichmentID, screen_name, socialNetworkURL, disName, foaf, account, name, firstName, lastName, profile_image_url, img, addr:region, homepage, IntersectionOfSkillsTags, theme, followersCount, friendsCount, statusesCount, timeZone, lastUpdate, indexId, handleid, person, bag, and/or the like;

A complexityReductionFactors table 9619*d* includes fields such as, but not limited to: complexityReductionFactorsID, blockingKey, postcode, attributes, sortedNeighbors, sortOrder, userProfile, pairs, ensaredPairs, heuristic, and/or the like;

An attributized_weights table 9619*e* includes fields such as, but not limited to: attributeWeightsID, weights, preferences, and/or the like;

A matchingProfileTuples table 9619*f* includes fields such as, but not limited to: matchingProfileTuplesID, normalizedDataID, attributizedProfileID, pro fileEnrichmentID, tupleConfidenceValue, and/or the like;

A matchThreshold table 9619*g* includes fields such as, but not limited to: matchThresholdID, thresholdPreference, threshold, systemThreshold, matchingProfileTuplesThreshold, and/or the like;

An profilesMatchIndicators table 9619*h* includes fields such as, but not limited to: profilesMatchIndicatorsID, queryID, query, queryResult, and/or the like;

An accounts table 9619*i* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 9619*j* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a Abound);

An devices table 9619*k* includes fields such as, but not limited to: deviceID, accountID, assetIDs, paymentIDs, deviceType, deviceName, deviceModel, deviceVersion, deviceSerialNo, deviceIPaddress, deviceMACaddress, deviceUUID, deviceLocation, deviceCertificate, deviceOS, appIDs, deviceResources, deviceSession, authKey, deviceSecureKey, walletAppinstalledFlag, deviceAccessPrivileges, device Preferences, deviceRestrictions, and/or the like; and An apps table 96191 includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions and/or the like.

In one embodiment, Abound database may interact with other database systems. For example, employing a distributed database system, queries and data access by search Abound component may treat the combination of Abound database, an integrated data security layer database as a single database entity.

In one embodiment, user programs may contain various user interface primitives, which may serve to update Abound. Also, various accounts may require custom database tables depending upon the environments and the types of clients Abound may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 9619*a*-1. Abound may be configured to keep track of various settings, inputs, and parameters via database controllers.

Abound database may communicate to and/or with other components in a component collection, including itself, and/or facilities of the like. Most frequently, Abound database communicates with Abound component, other program components, and/or the like. The database may contain, retain, and provide information regarding other nodes and data.

Abounds

Abound component 9635 is a stored program component that is executed by a CPU. In one embodiment, Abound component incorporates any and/or all combinations of the aspects of Abound that was discussed in the previous figures.

As such, Abound affects accessing, obtaining and the provision of information, services, transactions, and/or the like across various communications networks. The features and embodiments of Abound discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support Abound's features and facilities, and in many cases reduce the costs, energy consumption/requirements, and extend the life of Abound's underlying infrastructure; this has the added benefit of making Abound more reliable. Similarly, many of the features and mechanisms are designed to be easier for users to use and access, thereby broadening the audience that may enjoy/employ and exploit the feature sets of Abound; such ease of use also helps to increase the reliability of Abound. In addition, the feature sets include heightened security as noted via the Cryptographic components 9620, 9626, 9628 and throughout, making access to the features and data more reliable and secure Abound transforms data normalization support request and candidate criteria inputs, via Abound components (e.g., data normalizer, attributized profile, profile enricher, complexity reduction, weighting, matching), into criteria matching candidate indication outputs.

Abound component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, Abound server employs a cryptographic server to encrypt and decrypt communications. Abound component may communicate to and/or with other components in a component collection, including itself, and/or facilities of the like. Most frequently, Abound component communicates with Abound database, operating systems, other program components, and/or the like. Abound may contain, communicate, generate, obtain, and/or provide program component, system, user, and/or data communications, requests, and/or responses.

Distributed Abounds

The structure and/or operation of any of Abound node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of Abound controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, Abound controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Additional Abound embodiments include:

1. A disparate-network candidate criteria matching apparatus, comprising:
a memory;
a component collection in the memory, including:
a data normalizer component;
an attributized profile component;
a profile enrichment component;
a complexity reduction component;
a weighting component; and
a matching component;
a processor disposed in communication with the memory, and configured to issue a plurality of processing instructions from the component collection stored in the memory,
wherein the processor issues instructions from the data normalizer component, stored in the memory, to:
provide a candidate profile data extraction request to a network server,
obtain a candidate data normalization support responses from the network server,
normalize the candidate data normalization support responses;
wherein the processor issues instructions from the attributized profile component, stored in the memory, to:
create a candidate attributized profile from the normalized candidate normalization responses;
wherein the processor issues instructions from the profile enrichment component, stored in the memory, to:
determine attributed profile attributes for the candidate attributized profile, which are targets of no mapping,
identify related normalized data tags from the normalized candidate data normalization support responses,
analyze the normalized data tags to yield population results of under consideration attributes,
enrich the candidate attributized profile with the yield population results;
wherein the processor issues instructions from the complexity reduction component, stored in the memory, to:
apply complexity reduction approach to the enriched candidate attributized profile;
wherein the processor issues instructions from the weighting component, stored in the memory, to:
determine attribute-wise similarity set for social network pair,
determine and set attribute weights based on the determine attribute-wise similarity set;
wherein the processor issues instructions from the matching component, stored in the memory, to:
obtain a candidate criteria query from a requestor,
identify attributized user profiles matching the candidate criteria query;
place matching identified attributized user profiles in a profile bucket, wherein application of complexity reduction factors generates disparate profile buckets,
prune attributized user profiles from the profile bucket, wherein transitivity is employed to remove attributized user profiles not corresponding to a same individual,
identify attributized user profile with sameness match to the candidate criteria query from the profile bucket,
provide criteria-matching candidate results from the identified atributized user profile to the requestor.

2. A processor-readable disparate-network candidate criteria non-transitory matching medium storing components, the components, comprising:
a component collection in the medium, including:
a data normalizer component;
an attributized profile component;
a profile enrichment component;
a complexity reduction component;
a weighting component; and
a matching component;
wherein the data normalizer component, stored in the medium, includes processor-issuable instructions to:
provide a candidate profile data extraction request to a network server,
obtain a candidate data normalization support responses from the network server,
normalize the candidate data normalization support responses;
wherein the data attributized profile component, stored in the medium, includes processor-issuable instructions to:

create a candidate attributized profile from the normalized candidate normalization responses;

wherein the profile enrichment component, stored in the medium, includes processor-issuable instructions to:

determine attributed profile attributes for the candidate attributized profile, which are targets of no mapping, identify related normalized data tags from the normalized candidate data normalization support responses, analyze the normalized data tags to yield population results of under consideration attributes, enrich the candidate attributized profile with the yield population results;

wherein the complexity reduction component, stored in the medium, includes processor-issuable instructions to:

apply complexity reduction approach to the enriched candidate attributized profile;

wherein the weighting component, stored in the medium, includes processor-issuable instructions to:

determine attribute-wise similarity set for social network pair, determine and set attribute weights based on the determine attribute-wise similarity set;

wherein the matching component, stored in the medium, includes processor-issuable instructions to:

obtain a candidate criteria query from a requestor, identify attributized user profiles matching the candidate criteria query;

place matching identified attributized user profiles in a profile bucket, wherein application of complexity reduction factors generates disparate profile buckets, prune attributized user profiles from the profile bucket, wherein transitivity is employed to remove attributized user profiles not corresponding to a same individual, identify attributized user profile with sameness match to the candidate criteria query from the profile bucket, provide criteria-matching candidate results from the identified atributized user profile to the requestor.

3. A processor-implemented disparate-network candidate criteria matching system, comprising: data normalizer component means to:

provide a candidate profile data extraction request to a network server, obtain a candidate data normalization support responses from the network server, normalize the candidate data normalization support responses;

attributized profile component means to:

create a candidate attributized profile from the normalized candidate normalization responses;

profile enrichment component means to:

determine attributed profile attributes for the candidate attributized profile, which are targets of no mapping, identify related normalized data tags from the normalized candidate data normalization support responses, analyze the normalized data tags to yield population results of under consideration attributes, enrich the candidate attributized profile with the yield population results;

complexity reduction component means to:

apply complexity reduction approach to the enriched candidate attributized profile;

weighting component means to:

determine attribute-wise similarity set for social network pair, determine and set attribute weights based on the determine attribute-wise similarity set;

matching component means to:

obtain a candidate criteria query from a requestor, identify attributized user profiles matching the candidate criteria query;

place matching identified attributized user profiles in a profile bucket, wherein application of complexity reduction factors generates disparate profile buckets, prune attributized user profiles from the profile bucket, wherein transitivity is employed to remove attributized user profiles not corresponding to a same individual, identify attributized user profile with sameness match to the candidate criteria query from the profile bucket, provide criteria-matching candidate results from the identified atributized user profile to the requestor.

4. A processor-implemented disparate-network candidate criteria matching method, comprising:

executing processor-implemented data normalizer component instructions to:

provide a candidate profile data extraction request to a network server, obtain a candidate data normalization support responses from the network server, normalize the candidate data normalization support responses;

executing processor-implemented attributized profile component instructions to:

create a candidate attributized profile from the normalized candidate normalization responses;

executing processor-implemented profile enrichment component instructions to:

determine attributed profile attributes for the candidate attributized profile, which are targets of no mapping, identify related normalized data tags from the normalized candidate data normalization support responses, analyze the normalized data tags to yield population results of under consideration attributes, enrich the candidate attributized profile with the yield population results;

executing processor-implemented complexity reduction component instructions to:

apply complexity reduction approach to the enriched candidate attributized profile;

executing processor-implemented weighting component instructions to:

determine attribute-wise similarity set for social network pair, determine and set attribute weights based on the determine attribute-wise similarity set;

executing processor-implemented matching component instructions to:

obtain a candidate criteria query from a requestor, identify attributized user profiles matching the candidate criteria query;

place matching identified attributized user profiles in a profile bucket, wherein application of complexity reduction factors generates disparate profile buckets, prune attributized user profiles from the profile bucket, wherein transitivity is employed to remove attributized user profiles not corresponding to a same individual, identify attributized user profile with sameness match to the candidate criteria query from the profile bucket, provide criteria-matching candidate results from the identified atributized user profile to the requestor.

5. A processor-implemented method for sourcing active and passive jobseekers through jobseeker social media data, comprising:

extracting jobseeker data from a plurality of social media sources;

normalizing said jobseeker data to develop initial user profiles;

enriching said initial user profile with third party data to form enriched user profiles;

performing a complexity reduction process on said enriched user profiles to reduce comparisons of said enriched user profiles; and evaluating and weighting said enriched user profiles to match said enriched user profiles to source available jobseekers.

6. A processor-implemented method for sourcing active and passive jobseekers through jobseeker social media data, comprising:

extracting jobseeker data from a plurality of social media sources, said extracting comprising:

obtaining jobseeker data from at least one of: various social media API's or crawling said social media sources;

utilizing extracted schemas to analyze said jobseeker data;

performing a link resolving and schema merging process to eliminate duplicates from the schemas;

transforming non-categorical schema data to conform with a master schema standard;

reconciling variations in categorical schemas to said master schema standard; and loading jobseeker data into a master schema;

normalizing said jobseeker data to develop initial user profiles;

enriching said initial user profile with third party data to form enriched user profiles;

performing a complexity reduction process on said enriched user profiles to reduce comparisons of said enriched user profiles;

evaluating and weighting said enriched user profiles; and matching said enriched user profiles to source available jobseekers.

7. The processor-implemented method of embodiment 6 wherein said extracting comprises:

extracting jobseeker data from one or more of: explicitly from a jobseeker's social media account, activities or profile, implicitly from user data concerning said jobseeker, explicitly and implicitly from other user social media activities or accounts, and implicitly from social media groups that a jobseeker has joined.

8. The processor-implemented method of embodiment 6 wherein said enriching comprises:

extracting insights from social media data;

collecting explicit data and analyzing habits of potential jobseekers; and determining inferred implicit information from various social media data sources.

9. The processor-implemented method of embodiment 6 wherein said complexity reduction process comprises using one or more blocking techniques to partition a dataset of jobseeker data into multiple blocks that are likely to contain duplicate jobseeker records.

10. The processor-implemented method of embodiment 9 wherein said complexity reduction process further comprises a profile matching process.

11. The processor-implemented method of embodiment 6 wherein said weighting comprises giving weights to each of a plurality of attributes corresponding to an attribute importance level with a defined context.

12. The processor-implemented method of embodiment 6 further comprising a data scoring process including a syntactic scoring process and a semantic scoring process.

13. The processor-implemented method of embodiment 6 wherein said matching comprises:

determining a minimum threshold for determining a matching profile; and determining an aggregate score of each profile; and computing a similarity score between two or more profiles to determine said matching profile.

14. An apparatus for sourcing active and passive jobseekers through jobseeker social media data, comprising:

a memory;

a processor disposed in communication with said memory, and configured to issue a plurality of processing instructions stored in the memory, wherein the processor issues instructions to:

extract seeker data from a plurality of social media sources;

normalize said jobseeker data to develop initial user profiles;

enrich said initial user profile with third party data to form enriched user profiles;

perform a complexity reduction process on said enriched user profiles to reduce comparisons of said enriched user profiles; and evaluate and weighting said enriched user profiles to match said enriched user profiles to source available jobseekers.

15. An apparatus for sourcing active and passive jobseekers through jobseeker social media data, comprising:

a memory;

a processor disposed in communication with said memory, and configured to issue a plurality of processing instructions stored in the memory, wherein the processor issues instructions to:

extract jobseeker data from a plurality of social media sources, comprising:

obtain jobseeker data from at least one of: various social media API's or crawl said social media sources;

utilize extracted schemas to analyze said jobseeker data;

perform a link resolving and schema merging process to eliminate duplicates from the schemas;

transform non-categorical schema data to conform with a master schema standard;

reconcile variations in categorical schemas to said master schema standard; and load jobseeker data into a master schema;

normalize said jobseeker data to develop initial user profiles;

enrich said initial user profile with third party data to form enriched user profiles;

perform a complexity reduction process on said enriched user profiles to reduce comparisons of said enriched user profiles;

evaluate and weight said enriched user profiles; and match said enriched user profiles to source available jobseekers.

16. The apparatus of embodiment 15 wherein said extract comprises:

extract jobseeker data from one or more of: explicitly from a jobseeker's social media account, activities or profile, implicitly from user data concerning said jobseeker, explicitly and implicitly from other user social media activities or accounts, and implicitly from social media groups that a jobseeker has joined.

17. The apparatus of embodiment 15 wherein said enrich comprises:

extract insights from social media data;

collect explicit data and analyzing habits of potential jobseekers; and determine inferred implicit information from various social media data sources.

18. The apparatus of embodiment 15 wherein said complexity reduction process comprises using one or more blocking techniques to partition a dataset of jobseeker data into multiple blocks that are likely to contain duplicate jobseeker records.

19. The apparatus of embodiment 18 wherein said complexity reduction process further comprises a profile matching process.

20. The apparatus of embodiment 15 wherein said evaluate and weight comprises giving weights to each of a plurality of attributes corresponding to an attribute importance level with a defined context.

21. The apparatus of embodiment 15 further comprising a data scoring process including a syntactic scoring process and a semantic scoring process.

22. The apparatus of embodiment 15 wherein said matching comprises:

determine a minimum threshold for determining a matching profile; and determine an aggregate score of each profile; and compute a similarity score between two or more profiles to determine said matching profile.

23. A processor-readable non-transient medium storing processor-issuable instructions, for access by a processor-executable program component to provide an interface for sourcing active and passive jobseekers through jobseeker social media data, comprising instructions for:

extracting jobseeker data from a plurality of social media sources, said extracting comprising:

obtaining jobseeker data from at least one of: various social media API's or crawling said social media sources;

utilizing extracted schemas to analyze said jobseeker data;

performing a link resolving and schema merging process to eliminate duplicates from the schemas;

transforming non-categorical schema data to conform with a master schema standard;

reconciling variations in categorical schemas to said master schema standard; and loading jobseeker data into a master schema;

normalizing said jobseeker data to develop initial user profiles;

enriching said initial user profile with third party data to form enriched user profiles;

performing a complexity reduction process on said enriched user profiles to reduce comparisons of said enriched user profiles;

evaluating and weighting said enriched user profiles; and matching said enriched user profiles to source available jobseekers.

24. A memory for access by a processor-executable program component, comprising:

a processor-operable data structure stored in the memory, the data structure having interrelated data types, wherein processor instructions embody the data types and associated data, including:

a data type to extract jobseeker data from a plurality of social media sources, comprising:

obtain jobseeker data from at least one of: various social media API's or crawl said social media sources;

utilize extracted schemas to analyze said jobseeker data;

perform a link resolving and schema merging process to eliminate duplicates from the schemas;

transform non-categorical schema data to conform with a master schema standard;

reconcile variations in categorical schemas to said master schema standard; and load jobseeker data into a master schema;

a data type to normalize said jobseeker data to develop initial user profiles;

a data type to enrich said initial user profile with third party data to form enriched user profiles;

a data type to perform a complexity reduction process on said enriched user profiles to reduce comparisons of said enriched user profiles;

a data type to evaluate and weight said enriched user profiles; and a data type to match said enriched user profiles to source available jobseekers.

25. An apparatus for sourcing active and passive jobseekers through jobseeker social media data, comprising:

means for extracting jobseeker data from a plurality of social media sources, comprising:

obtaining jobseeker data from at least one of: various social media API's or crawl said social media sources;

utilizing extracted schemas to analyze said jobseeker data;

performing a link resolving and schema merging process to eliminate duplicates from the schemas;

transforming non-categorical schema data to conform with a master schema standard;

reconciling variations in categorical schemas to said master schema standard; and loading jobseeker data into a master schema;

means for normalizing said jobseeker data to develop initial user profiles;

means for enriching said initial user profile with third party data to form enriched user profiles;

means for performing a complexity reduction process on said enriched user profiles to reduce comparisons of said enriched user profiles;

means for evaluating and weight said enriched user profiles; and means for matching said enriched user profiles to source available jobseekers.

In order to address various issues and advance the art, the entirety of this application for Sourcing Abound Candidates Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as “lower,” “upper,” “horizontal,” “vertical,” “above,” “below,” “up,” “down,” “top” and “bottom” as well as derivative thereof (e.g., “horizontally,” “downwardly,” “upwardly,” etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as “attached,” “affixed,” “connected,” “coupled,” “interconnected,” and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a Abound individual and/or enterprise user, database configuration and/or relational model, data type, data transmission and/or network framework, syntax structure, and/or the like, various embodiments of Abound, may be implemented that enable a great deal of flexibility and customization. For example, aspects of Abound may be adapted for broader account consolidation. While various embodiments and discussions of Abound have included candidate job searching, however, it is to be understood that the embodiments described herein may be readily configured and/or customized for a wide variety of other applications and/or implementations.

What is claimed is:

1. A disparate-network candidate criteria matching apparatus, comprising:

a memory;

a component collection in the memory, including:

a data normalizer component;

an attributized profile component; a profile enrichment component;

a complexity reduction component; a weighting component; and a matching component;

a processor disposed in communication with the memory, and issues a plurality of processing instructions from the component collection stored in the memory, wherein the processor issues instructions from the data normalizer component, stored in the memory, to:

provide a candidate profile data extraction request to a network server, obtain a candidate data normalization support responses from the network server, normalize the candidate data normalization support responses;

wherein the processor issues instructions from the attributized profile component, stored in the memory, to: create a candidate attributized profile from the normalized candidate normalization responses;

wherein the processor issues instructions from the profile enrichment component, stored in the memory, to: determine attributed profile attributes for the candidate attributized profile, which are targets of no mapping, identify related normalized data tags from the normalized candidate data normalization support responses, analyze the normalized data tags to yield population results of under consideration attributes, enrich the candidate attributized profile with the yield population results;

wherein the processor issues instructions from the complexity reduction component, stored in the memory, to: apply complexity reduction approach to the enriched candidate attributized profile;

wherein the processor issues instructions from the weighting component, stored in the memory, to: determine attribute-wise similarity set for social network pair, determine and set attribute weights based on the determine attribute-wise similarity set;

wherein the processor issues instructions from the matching component, stored in the memory, to:

obtain a candidate criteria query from a requestor, identify attributized user profiles matching the candidate criteria query;

place matching identified attributized user profiles in a profile bucket, wherein application of complexity reduction factors generates disparate profile buckets, prune attributized user profiles from the profile bucket, wherein transitivity is employed to remove attributized user profiles not corresponding to a same individual, identify attributized user profile with sameness match to the candidate criteria query from the profile bucket, provide criteria-matching candidate results from the identified atributized user profile to the requestor.

2. A processor-readable non-transitory matching medium storing components, the components, comprising:

a component collection in the medium, including:

a data normalizer component;

an attributized profile component;

a profile enrichment component;

a complexity reduction component;

a weighting component; and a matching component;

wherein the data normalizer component, stored in the medium, includes processor-issuable instructions to:

provide a candidate profile data extraction request to a network server, obtain a candidate data normalization support responses from the network server, normalize the candidate data normalization support responses;

wherein the data attributized profile component, stored in the medium, includes processor-issuable instructions to:

create a candidate attributized profile from the normalized candidate normalization responses;

wherein the profile enrichment component, stored in the medium, includes processor-issuable instructions to:

determine attributed profile attributes for the candidate attributized profile, which are targets of no mapping, identify related normalized data tags from the normalized candidate data normalization support responses, analyze the normalized data tags to yield population results of under consideration attributes, enrich the candidate attributized profile with the yield population results;

wherein the complexity reduction component, stored in the medium, includes processor-issuable instructions to:

apply complexity reduction approach to the enriched candidate attributized profile;

wherein the weighting component, stored in the medium, includes processor-issuable instructions to:

determine attribute-wise similarity set for social network pair, determine and set attribute weights based on the determine attribute-wise similarity set;

wherein the matching component, stored in the medium, includes processor-issuable instructions to:

obtain a candidate criteria query from a requestor, identify attributized user profiles matching the candidate criteria query;

place matching identified attributized user profiles in a profile bucket, wherein application of complexity reduction factors generates disparate profile buckets, prune attributized user profiles from the profile bucket, wherein transitivity is employed to remove attributized user profiles not corresponding to a same individual, identify attributized user profile with sameness match to the candidate criteria query from the profile bucket, provide criteria-matching candidate results from the identified atributized user profile to the requestor.

3. A processor-implemented disparate-network candidate criteria matching system, comprising:

data normalizer component means to:

provide a candidate profile data extraction request to a network server, obtain a candidate data normalization support responses from the network server, normalize the candidate data normalization support responses;

attributized profile component means to:

create a candidate attributized profile from the normalized candidate normalization responses;

profile enrichment component means to:

determine attributed profile attributes for the candidate attributized profile, which are targets of no mapping, identify related normalized data tags from the normalized candidate data normalization support responses, analyze the normalized data tags to yield population results of under consideration attributes, enrich the candidate attributized profile with the yield population results;

complexity reduction component means to:

apply complexity reduction approach to the enriched candidate attributized profile;

weighting component means to:

determine attribute-wise similarity set for social network pair, determine and set attribute weights based on the determine attribute-wise similarity set;

matching component means to:

obtain a candidate criteria query from a requestor, identify attributized user profiles matching the candidate criteria query;

place matching identified attributized user profiles in a profile bucket, wherein application of complexity reduction factors generates disparate profile buckets, prune attributized user profiles from the profile bucket, wherein transitivity is employed to remove attributized user profiles not corresponding to a same individual, identify attributized user profile with sameness match to the candidate criteria query from the profile bucket, provide criteria-matching candidate results from the identified atributized user profile to the requestor.

* * * * *